US 6,636,234 B2

(12) United States Patent
Endo et al.

(10) Patent No.: US 6,636,234 B2
(45) Date of Patent: Oct. 21, 2003

(54) IMAGE PROCESSING APPARATUS FOR INTERPOLATING AND GENERATING IMAGES FROM AN ARBITRARY VIEW POINT

(75) Inventors: Takaaki Endo, Yokohama (JP); Akihiro Katayama, Yokosuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/376,329

(22) Filed: Aug. 18, 1999

(65) Prior Publication Data

US 2002/0171666 A1 Nov. 21, 2002

(30) Foreign Application Priority Data

Feb. 19, 1999 (JP) .......................................... 11-041354
Jul. 15, 1999 (JP) .......................................... 11-202300

(51) Int. Cl.[7] ................................................. G06T 3/00
(52) U.S. Cl. ........................ 345/646; 345/649; 345/427
(58) Field of Search .............................. 345/437, 438, 345/427, 646, 649, 656, 672, 682

(56) References Cited

U.S. PATENT DOCUMENTS 5,613,048 A * 3/1997 Chen et al.

OTHER PUBLICATIONS

"View Morphing", by S.M. Seitz, et al., Proc. SIGGRA—U '96, p 1–10 (1966).
"Image Interpolation Method for Building Image–Based Cybercities", proceedings of the Third Virtual Reality Society of Japan, Aug. 19, 1998.
Michael Halle, "Multiple Viewpoint Rendering", Proceedings of the 25th annual conference on Computer Graphics, Jul. 19–24, 1998, pp. 243–254.*

Jonathan Shade, et al., "Layered Depth Images", Proceedings of the 25th annual conference on Computer Graphics, Jul. 19–24, 1998, pp. 231–242.*

Ho–Chao Huang et al., "Disparity–Based View Morphing—A New Technique for Image–Based Rendering", Proceedings of the ACM Symposium on Virtual Reality Software and Technology 1998, Nov. 2–5, 1998, pp. 9–16.*

Apostolos Lerios, "Feature–Based Volume Metamorphosis", Proceedings of the 22nd annual ACM conference on Computer Graphics, Aug. 6–11, 1995, pp. 449–456.*

* cited by examiner

*Primary Examiner*—Jeffery Brier
(74) *Attorney, Agent, or Firm*—Fitzpatrick, Cella, Harper & Scinto

(57) ABSTRACT

There is provided a method of generating an interpolated image without any constraint even in a wide moving range. When two real images have an inclusive relationship, the two images are rotated to make their optical axes coincide with each other. Nonlinear interpolation processing is performed for the two images after the rotations, and the interpolated image is rotated in the line of sight direction of a user.

67 Claims, 45 Drawing Sheets

FIG. 33
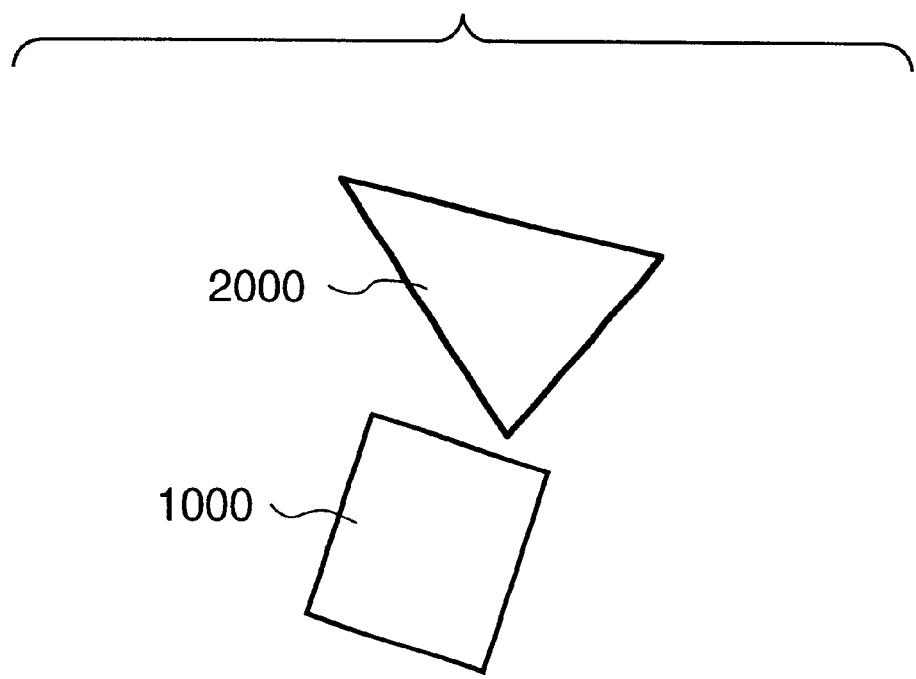
E1
E2
E3

FIG. 35
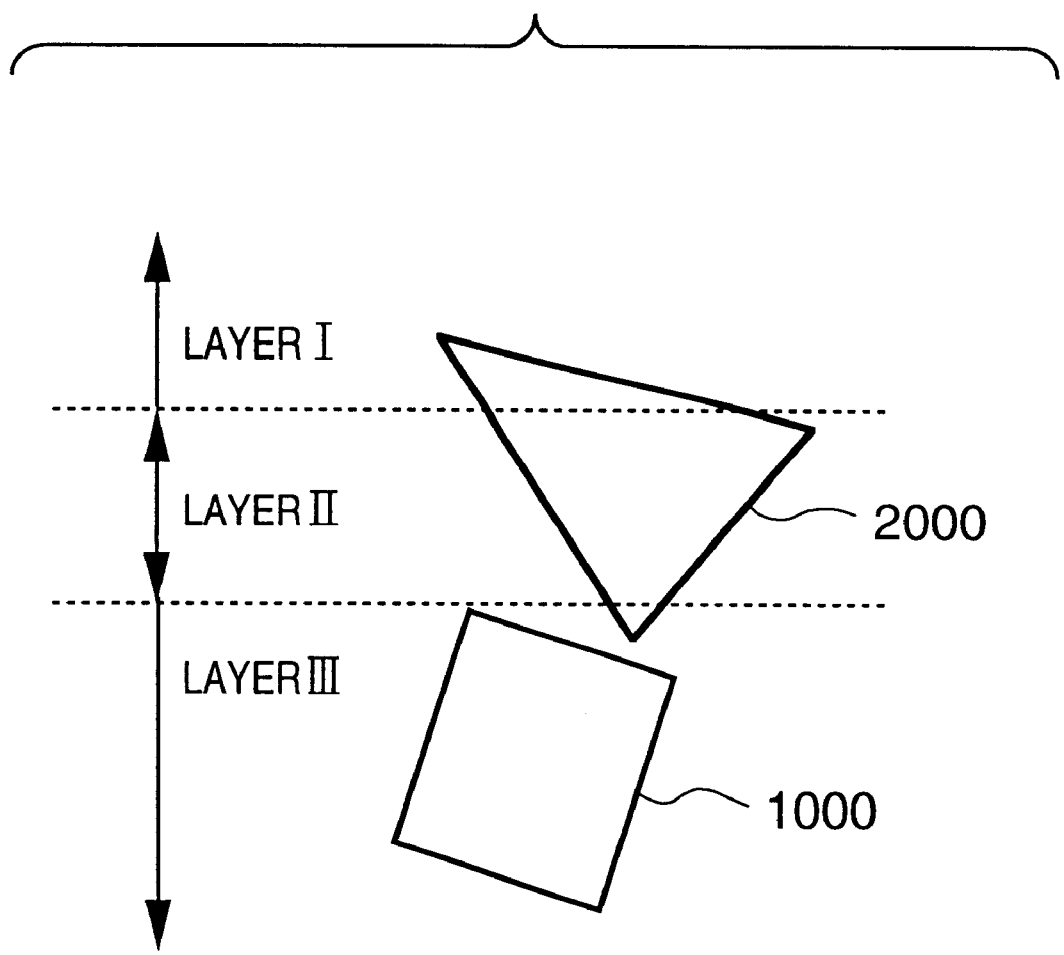

FIG. 42

| IMAGE ID | VIEWPOINT POSITION | LAYER NUMBER (i) | OBJECT 1 (k=1) | OBJECT 2 (k=2) | ...... | OBJECT K (k=K) |
|---|---|---|---|---|---|---|
| RI1 | E1 | I | $P_{i=I}(k=1)$ | $P_{i=I}(k=1)$ (NONE) | | $P_{i=I}(k=K)$ (NONE) |
| | | II | $P_{i=II}(k=1)$ | $P_{i=II}(k=1)$ (NONE) | | $P_{i=II}(k=K)$ (NONE) |
| | | III | $P_{i=III}(k=1)$ | $P_{i=III}(k=1)$ (NONE) | | $P_{i=III}(k=K)$ (NONE) |
| RI2 | E2 | I | $P_{i=I}(k=1)$ | $P_{i=I}(k=1)$ (NONE) | | $P_{i=I}(k=K)$ (NONE) |
| | | II | $P_{i=II}(k=1)$ | $P_{i=II}(k=1)$ (NONE) | | $P_{i=II}(k=K)$ (NONE) |
| | | III | $P_{i=III}(k=1)$ | $P_{i=III}(k=1)$ (NONE) | | $P_{i=III}(k=K)$ (NONE) |
| RI3 | E3 | I | $P_{i=I}(k=1)$ | $P_{i=I}(k=1)$ (NONE) | | $P_{i=I}(k=K)$ (NONE) |
| | | II | $P_{i=II}(k=1)$ | $P_{i=II}(k=1)$ (NONE) | | $P_{i=II}(k=K)$ (NONE) |
| | | III | $P_{i=III}(k=1)$ | $P_{i=III}(k=1)$ (NONE) | | $P_{i=III}(k=K)$ (NONE) |

FIG. 44

| FILE | EDITING | DISPLAY | FORMAT | TOOL |
|---|---|---|---|---|
| CREATE | CUT | | | |
| OPEN | COPY | | | |
| STORE | PASTE | | | |
| PRINT | SEARCH / REPLACE | | | |
| END | SET LAYER | | | |
| | SET OBJECT | | | |
| | CANCEL LAYER | | | |
| | CANCEL OBJECT | | | |
| | RETOUCH SOURCE | | | |
| | RETOUCH DESTINATION | | | |

FIG. 45

| CURRENTLY DESIGNATED LAYER | LL |
|---|---|
| CURRENTLY DESIGNATED OBJECT | OB |

IMAGE PROCESSING APPARATUS FOR INTERPOLATING AND GENERATING IMAGES FROM AN ARBITRARY VIEW POINT

BACKGROUND OF THE INVENTION

The present invention relates to an image interpolation method, image processing method, and image display method of interpolating and generating images at the viewpoint position of a user from existing images, apparatuses therefor, and computer program storage medium.

When a large-scale virtual environment is to be constructed, a technique based on real images is more advantageous in reality than geometric-model-based CG representation. Real images at a plurality of viewpoints are obtained by image-picking up an environment at a plurality of positions by using a camera having a position/posture sensor. Virtual images at arbitrary viewpoints are generated from these real images by using, for example, a morphing technique. In other words, the use of the morphing technique allows a user to experience a virtual space at arbitrary viewpoint positions beyond the viewpoint positions (assume that viewpoint positions include line of sight directions in the following description) at which image-picking up was performed.

In morphing, first of all, areas of two original images (e.g., images A and B) in which images of the same object are presented are made to correspond to each other in the form of, e.g., rectangles. That is, two partial image areas (e.g., areas A' and B') recognized by the user as identical areas are set as corresponding areas. The shapes and colors of the insides of the two areas are linearly interpolated to construct a virtual image Q. As described above, linear interpolation is used for the generation of this virtual image Q. With regard to this linear interpolation, it is proposed that both the optical axes of the cameras at viewpoint positions $P_{CA}$ and $P_{CB}$ where the cameras sensed the two images A and B should be perpendicular to the base line (the straight line connecting the centers of the cameras) to effectively generate an interpolated image without any distortion.

S. M. Seitz and C. R. Dyer have proposed a technique of generating an interpolated image without any distortion even in a case wherein the optical axes at the two viewpoint positions $P_{CA}$ and $P_{CB}$ do not satisfy the above condition in "View Morphing", Proc. SIGGRAPH '96, pp. 21–30 (1996). The principle of this technique will be described below.

Assume that the images A and B are respectively obtained at the viewpoint positions $P_{CA}$ and $P_{CB}$ in FIG. 1. The optical axes of the cameras at the two viewpoint positions are neither parallel to each other nor perpendicular to the base line. Referring to FIG. 1, coordinates $x_1$ and $x_2$ indicate corresponding points with respect to one target point. When the virtual image Q at an arbitrary viewpoint position $P_e$ is generated by linear interpolation, distortion occurs. According to S. M. Seitz and C. R. Dyer, therefore, as shown in FIG. 2, the two images are rotated as if images were obtained by performing image sensing operation in a state wherein both the optical axes are rotated to become perpendicular to the base line, and linear interpolation is performed for images A' and B' after the rotations, thereby obtaining a virtual image Q'. This virtual image has no distortion.

S. M. Seitz and C. R. Dyer, however, point out that one significant constraint is set for this technique in the prior art, and interpolation itself cannot be executed if this constraint is not satisfied. More specifically, as shown in FIG. 3, in a case wherein the field of view of the camera at one viewpoint position includes the field of view of the camera at the other viewpoint position, when the images are rotated to make the optical axes become perpendicular to the base line and parallel to each other, no corresponding points exist on the two images after the rotations. Therefore, an image having no distortion cannot be generated by linear interpolation.

SUMMARY OF THE INVENTION

It is an object of the present invention to provide an image interpolation method which can eliminate the above constraint and generate a virtual image even at an arbitrary viewpoint position by interpolation.

In order to achieve the above object, according to one aspect of the present invention, there is provided a method of generating an interpolated image at a user viewpoint position different from first and second viewpoint positions on the basis of first and second images obtained at the first and second viewpoint positions, is characterized by comprising:

the first rotation step of rotating the first and second images about the first and second viewpoint positions, respectively, such that optical axes of cameras which respectively took the first and second images coincide with a first direction substantially coinciding with a direction of a base line connecting the first and second viewpoint positions;

the first coordinate interpolation step of calculating coordinates of a corresponding point of an interpolated image having the first direction as a line of sight direction at the user viewpoint position by performing nonlinear proportional distribution for coordinates of a first corresponding point in the first image with respect to a predetermined feature point and coordinates of a second corresponding point in the second image with respect to the feature point; and the second rotation step of rotating the interpolated image from the first direction to the line of sight direction at the user viewpoint position, and outputting the image after rotation as an interpolated image.

According to this interpolation method, by making the optical axes of two images coincide with each other, nonlinear proportional distribution can be performed, and an interpolated image at the user viewpoint position can be generated. If this interpolated image is rotated in accordance with the line of sight direction of the user, the rotated image becomes an image interpolated in the line of sight direction at the user viewpoint position.

The above nonlinear proportional distribution processing should be performed for only images satisfying a predetermined relationship. According to another aspect of the present invention, therefore, the method further comprises the determination step of determining whether a field of view of the first image includes a lens center of the second image or a field of view of the second image includes a lens center of the first image, and the first rotation step is executed when YES is obtained in the determination step.

According to yet another aspect of the present invention, the method is characterized by further comprising: the determination step of determining whether a field of view of the first image includes a lens center of the second image or a field of view of the second image includes a lens center of the first image;

the third rotation step of rotating the first and second images about the first and second viewpoint positions, respectively, such that optical axes of the images become substantially perpendicular to the direction of the base line, when NO is obtained in the determination step;

the second coordinate interpolation step of calculating coordinates of a corresponding point of an interpolated image having the second direction perpendicular to the direction of the base line at the user viewpoint position as a line of sight direction by performing linear proportional distribution for coordinates of a first corresponding point of the first image and coordinates of a second corresponding point of the second image; and the fourth rotation step of rotating the interpolated image from the second direction to the line of sight direction at the user viewpoint position, and outputting the image after rotation as an interpolated image.

According to still another aspect of the present invention, the method is characterized in that when the user viewpoint position internally divides an interval between the first and second viewpoint positions at t:1−t, the nonlinear proportional distribution processing in the first coordinate interpolation step is executed by making a reciprocal value $1/x_e$ of a coordinate of the interpolated image divide an interval between a reciprocal value $1/x_A$ of the coordinate of the first corresponding point and a reciprocal value $1/x_B$ of the coordinate of the second corresponding point at t:1−t.

According to still another aspect of the present invention, the method is characterized in that when the user viewpoint position internally divides an interval between the first and second viewpoint positions at t:1−t, the linear proportional distribution processing in the second coordinate interpolation processing is executed by making a coordinate value $x_e$ of the interpolated image divide an interval between a coordinate value $x_A$ of the first corresponding point and a coordinate value $x_B$ of the second corresponding point at t:1−t.

The above nonlinear interpolation processing should be performed for images satisfying a predetermined relationship. According to still another aspect of the present invention, therefore, the method further comprises the step of determining whether the first and second images have at least image data of corresponding points derived from the same object.

According to still another aspect of the present invention, the method further comprises the step of searching an image database for another image having at least a corresponding point when the first and second images do not have at least image data of corresponding points derived from the same object.

According to still another aspect of the present invention, the first and second viewpoint positions are defined by viewpoint positions and optical axis directions of the cameras in image sensing operation, and the user viewpoint position is defined by a viewpoint position and line of sight direction of the user.

According to still another aspect of the present invention, the interpolated image output in the first or fourth rotation step is presented as a panoramic image to the user.

It is another object of the present invention to provide an image interpolation method which has no limitation to allow a user to move in a wide range.

In order to achieve this object, according to another aspect of the present invention, there is provided a method of generating an interpolated image at a user viewpoint position different from first, second, and third viewpoint positions on the basis of first, second, and third images respectively obtained at the first, second, and third viewpoint positions, characterized by comprising:

the determination step of determining whether any two of the first to third images have an inclusive relationship;

internal ratio calculation step of obtaining first and second internal ratios on the basis of a relationship between the user viewpoint position and the first to third viewpoint positions;

the first coordinate interpolation step of performing nonlinear proportional distribution processing for two arbitrary images having viewpoint positions having an inclusive relationship to interpolate/generate a temporary virtual image having a base line direction as a line of sight direction at an internal dividing point position between the two viewpoint positions;

the second coordinate interpolation step of performing linear proportional distribution processing for two arbitrary images having viewpoint positions having no inclusive relationship to interpolate/generate a temporary virtual image having a line of sight direction perpendicular to the base line direction at an internal dividing point position between the two viewpoint positions;

the first image interpolation step of generating a temporary virtual image at an internal dividing point position corresponding to the first internal ratio by performing one of first morphing processing and second morphing processing for the first and second images by using the first internal ratio depending on whether the first and second images have an inclusive relationship;

the second image interpolation step of generating an interpolated image at the user viewpoint position corresponding to the second internal ratio by performing one of the first morphing processing and second morphing processing for the temporary virtual image and third image by using the second internal ratio depending on whether the temporary virtual image and third image have an inclusive relationship; and the rotation step of rotating the interpolated image, obtained in the second image interpolation step, in a line of sight direction at the user viewpoint position, and outputting the image after rotation as an interpolated image.

According to this method, images can be interpolated regardless of whether the images have an inclusive relationship or not.

According to still another aspect of the present invention, the first coordinate interpolation step comprises the step of rotating the two arbitrary images at viewpoint positions in the base line direction to make optical axes of the images coincide with each other, and the interpolation processing is performed for the two rotated images.

According to still another aspect of the present invention, the method is characterized in that the second coordinate interpolation step comprises the step of rotating the two arbitrary images at viewpoint positions in a direction perpendicular to the base line direction to make the two arbitrary images become parallel to each other, and the interpolation processing is performed for the two rotated images.

According to still another aspect of the present invention, the method is characterized in that the determination step comprises determining whether a field of view of one image includes a lens center of the other image.

According to still another aspect of the present invention, the method is characterized in that a viewpoint position which divides, at a second internal ratio, an interval between the third viewpoint position and a temporary virtual position $P_T$ which divides an interval between the first and second viewpoint positions at a first internal ratio coincides with the user viewpoint position.

According to still another aspect of the present invention, the method is characterized in that the first coordinate interpolation step comprises obtaining a reciprocal value $1/x_e$ of a coordinate of the temporary virtual image by internally dividing an interval between a reciprocal value $1/x_A$ of a coordinate of a first corresponding point of one of the two images and a reciprocal value $1/x_B$ of a coordinate of a second corresponding point of the other image at the first internal ratio.

According to still another aspect of the present invention, the method is characterized in that the second coordinate interpolation step comprises obtaining a coordinate value $x_e$ of the temporary virtual image by internally dividing an interval between a coordinate value $x_A$ of a first corresponding point of one of the two images and a coordinate value $x_B$ of a second corresponding point of the other image at the second internal ratio.

According to still another aspect of the present invention, the method further comprises the step of searching an image database for another image having at least a corresponding point when the first to third images do not have at least image data of corresponding points derived from the same object.

It is still another object of the present invention to provide an image processing apparatus which has no limitation on image interpolation and allows a user to move an image in a two-dimensionally wide space.

In order to achieve this problem, according to another aspect hereinafter aspect A of the present invention, there is provided an image processing apparatus characterized by comprising: an image database storing a plurality of images together with pieces of viewpoint position information corresponding thereto in advance;

means for detecting both a line of sight direction and viewpoint position of a user;

means for searching the image database for the first to third images including corresponding points in the line of sight direction of the user;

determination means for determining whether any two of the first to third images have an inclusive relationship;

internal ratio calculation means for obtaining first and second internal ratios on the basis of a relationship between the user viewpoint position and the first to third viewpoint positions;

first coordinate interpolation means for performing non-linear proportional distribution processing for two arbitrary images having viewpoint positions having an inclusive relationship to interpolate/generate a temporary virtual image having a base line direction as a line of sight direction at an internal dividing point position between the two viewpoint positions;

second coordinate interpolation means for performing linear proportional distribution processing for two arbitrary images having viewpoint positions having no inclusive relationship to interpolate/generate a temporary virtual image having a line of sight direction perpendicular to the base line direction at an internal dividing point position between the two viewpoint positions;

first image interpolation means for generating a temporary virtual image at an internal dividing point position corresponding to the first internal ratio by performing one of first morphing processing and second morphing processing for the first and second images by using the first internal ratio depending on whether the first and second images have an inclusive relationship;

second image interpolation means for generating an interpolated image at the user viewpoint position corresponding to the second internal ratio by performing one of the first morphing processing and second morphing processing for the temporary virtual image and third image by using the second internal ratio depending on whether the temporary virtual image and third image have an inclusive relationship; and rotation means for rotating the interpolated image, obtained in the second image interpolation step, in a line of sight direction at the user viewpoint position, and outputting the image after rotation as an interpolated image.

According to still another aspect of the present invention, the apparatus is characterized in that the first coordinate interpolation means comprises means for rotating the two arbitrary images at viewpoint positions in the base line direction to make optical axes of the images coincide with each other, and the interpolation processing is performed for the two rotated images.

According to still another aspect of the present invention, the apparatus is characterized in that the second coordinate interpolation means comprises means for rotating the two arbitrary images at viewpoint positions in a direction perpendicular to the base line direction to make the two arbitrary images become parallel to each other, and the interpolation processing is performed for the two rotated images.

According to still another aspect of the present invention, the apparatus is characterized by further comprising means for searching an image database for another image having at least a corresponding point when the first to third images do not have at least image data of corresponding points derived from the same object.

In order to expand the range in which the user can move an image, according to another aspect of the present invention, the apparatus is characterized by further comprising means for storing a temporary virtual image generated by the first image interpolation means in the image database, together with corresponding viewpoint position information.

In order to expand the range in which the user can move, according to still another aspect of the present invention, the apparatus is characterized by further comprising means for storing a temporary virtual image generated by the second image interpolation means in the image database, together with corresponding viewpoint position information.

It is still another object of the present invention to provide an image processing apparatus for processing an image for morphing processing, and more specifically, an image obtained by sensing an object having uneven portions into an image suited to morphing.

In the interpolation processing according to the preceding aspects, a user viewpoint position for interpolation is set between the first and second viewpoint positions (and the third viewpoint position) or an arbitrary position inside a given range. It is therefore expected that the relative front/rear relationship between sensed objects remains unchanged in original images suited to the interpolation processing in the preceding aspects even if the user viewpoint position is set at an arbitrary intermediate position between the first and second viewpoint positions (and the third viewpoint position) or an arbitrary position inside a given range. This means that original images suited to the interpolation processing in the preceding aspects must be generated in advance.

In order to achieve the above object, according to another aspect of the present invention, there is provided an image processing apparatus for generating a morphed image by processing first and second two-dimensional images respectively obtained by sensing an object at first and second viewpoint positions, characterized by comprising:

segmentation means for segmenting the first two-dimensional image into a plurality of first two-dimensional partial images in accordance with a plurality of depths from the first viewpoint position, and also segmenting the second two-dimensional image into a plurality of second two-dimensional partial images in accordance with a plurality of depths from the second viewpoint position.

The front/rear relationship between objects reflected in a plurality of two-dimensional partial images segmented and generated in accordance with depths is held at an arbitrary intermediate viewpoint position between the first and second viewpoint positions. When, therefore, such two-dimensional partial images are subjected to morphing processing afterward, morphing in which the front/rear relationship is correctly reflected is guaranteed. When the user sees two objects having a front/rear relationship while moving, part of one object must be occluded by part of the other object from time to time. If morphing is performed on the basis of the two images without giving any consideration to the front/rear relationship, an interpolated image is generated such that a portion which should not be seen can be seen or a portion which should be seen cannot be seen. Partial images generated by segmentation in consideration of the front/rear relationship between objects can be presented to the user such that portions which should be seen can be seen, and portions which should be occluded can be occluded. By visualizing an occluded portion which should be seen to the user, he/she can add image data (retouch operation) to the portion.

Two-dimensional images essentially have no depth information. Segmentation/generation of two-dimensional partial images from such two-dimensional images in accordance with depths must be easy and user-friendly. According to another aspect of the present invention, therefore, the segmentation means comprises:

display means for displaying the first and second two-dimensional images; and first designation means for designating partial areas in the displayed first and second two-dimensional images as a pair of two-dimensional partial images by adding hierarchical information corresponding to a depth to each of the partial images.

The user can determine the front/rear relationship between objects in a displayed picture by seeing displayed images, and hence can correctly designate a partial area.

When morphing processing is performed from an arbitrary viewpoint position, an occluded portion needs to be set in the field of view in some case. For such a case, in the image processing apparatus according to another aspect of the present invention, the first designation means comprises:

second designation means for designating, on the display means, a partial area in which a two-dimensional partial image belonging to a layer farther from the arbitrary viewpoint position is occluded by a two-dimensional partial image belonging to a layer nearer to the arbitrary viewpoint position; and retouch means for allowing a user to retouch a pixel value of the occluded partial area.

Even if an occluded partial area is set in the field of view as a result of morphing processing, since this area is retouched, no problem is posed.

According to another aspect of the present invention, the first designation means is characterized by comprising rewrite means for rewriting pixel values of one or a plurality of pairs of two-dimensional partial images having a second hierarchical information value other than a first hierarchical information value into a predetermined fixed value with respect to one pair of two-dimensional partial images having the first hierarchical information value. According to another aspect of the present invention, the predetermined fixed value is a pixel value representing black.

A partial image may include images of a plurality of objects located close to each other. According to still another aspect of the present invention, therefore, the segmentation means comprises third designation means for designating a plurality of partial areas (objects) in one pair of first and second two-dimensional partial images corresponding to a given layer.

Note that image data can be stored in various forms. According to still another aspect of the present invention, the segmentation means stores first and second original two-dimensional images and a plurality of pairs of two-dimensional partial images, together with hierarchical information.

The image processing apparatus according to the preceding seven aspects of the present invention is used to generate and store images suited to interpolation processing (morphing processing). Preferably, therefore, there is provided an image display apparatus for reading out a plurality of pairs of two-dimensional partial images generated and stored by the image processing apparatus defined in any of the preceding seven aspects, and performing morphing processing to generate an image from an arbitrary viewpoint position. The image display apparatus according to another aspect of the present invention (aspect B) is characterized by comprising:

first morphing processing means for performing, for pairs of two-dimensional partial images corresponding to all depths, processing of generating a partial morphed image from an arbitrary viewpoint position on the basis of one pair of first and second two-dimensional partial images corresponding to each depth; and display means for synthesizing partial morphed images corresponding to the respective depths and generated by the first morphing processing means, and displaying a synthesized image on a predetermined display unit.

According to still another aspect of the present invention, the apparatus is characterized by being applied to a walk-through application.

According to still another aspect of the present invention, the apparatus further comprises input means for inputting information about the arbitrary viewpoint position.

According to still another aspect of the present invention, the input means is characterized by virtually changing a viewpoint position value.

All images are not necessarily suited to morphing to be performed in consideration of depths. This is because morphing to be performed in consideration of depths takes much time. The image display apparatus according to another aspect is therefore characterized by further comprising: second morphing processing means for generating a morphed image directly based on the first and second two-dimensional images; and switching means for selectively switching the first morphing processing means and the second morphing processing means.

The image display apparatus according to still another aspect of the present invention provides practical switching means and is characterized in that the apparatus further comprises:

input means for inputting information about the arbitrary viewpoint position; and a memory for determining that one of the first morphing processing and the second morphing processing is to be applied to an arbitrary walkthrough route in a walkthrough virtual space when a viewpoint position of the user exists in the walkthrough route, and storing information indicating a determination result together with a position of the walkthrough route, and the switching means extracts determination result information corresponding to viewpoint position information input by the input means from the memory, and selects and operates one of the first morphing processing means and the second morphing processing means on the basis of the information.

The image display apparatus according to aspect B of the present invention can be effectively combined with the image processing apparatus according to aspect A of the present invention. The image display apparatus according to this aspect to the present invention is characterized in that the first morphing means comprises:

an image database storing a plurality of images together with pieces of viewpoint position information corresponding thereto in advance;

means for detecting both a line of sight direction and viewpoint position of a user;

means for searching the image database for the first to third images including corresponding points in the line of sight direction of the user;

determination means for determining whether any two of the first to third images have an inclusive relationship;

internal ratio calculation means for obtaining first and second internal ratios on the basis of a relationship between the user viewpoint position and the first to third viewpoint positions;

first coordinate interpolation means for performing nonlinear proportional distribution processing for two arbitrary images having viewpoint positions having an inclusive relationship to interpolate/generate a temporary virtual image having a base line direction as a line of sight direction at an internal dividing point position between the two viewpoint positions;

second coordinate interpolation means for performing linear proportional distribution processing for two arbitrary images having viewpoint positions having no inclusive relationship to interpolate/generate a temporary virtual image having a line of sight direction perpendicular to the base line direction at an internal dividing point position between the two viewpoint positions;

first image interpolation means for generating a temporary virtual image at an internal dividing point position corresponding to the first internal ratio by performing one of first morphing processing and second morphing processing for the first and second images by using the first internal ratio depending on whether the first and second images have an inclusive relationship;

second image interpolation means for generating an interpolated image at the user viewpoint position corresponding to the second internal ratio by performing one of the first morphing processing and second morphing processing for the temporary virtual image and third image by using the second internal ratio depending on whether the temporary virtual image and third image have an inclusive relationship; and rotation means for rotating the interpolated image, obtained in the second image interpolation step, in a line of sight direction at the user viewpoint position, and outputting the image after rotation as an interpolated image.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 33 is a view for explaining a case wherein objects have a front/rear relationship in the second embodiment;

FIG. 35 is a view for explaining the principle of a technique of segmenting a space into a plurality of layers while referring to depths;

FIG. 42 is a view for explaining the structure of hierarchical image data generated by pre-processing in the second embodiment;

FIG. 44 is a view for explaining a pull-down menu displayed by a hierarchical application program in the second embodiment; and FIG. 45 is a view for explaining a window for displaying currently designated layer and object numbers displayed on the CRT screen of the controller 300 in pre-processing in the second embodiment.

DETAILED DESCRIPTION OF THE INVENTION

A mode of the present invention will be described below with reference to the accompanying drawings.

<Principle>

Figure 1:
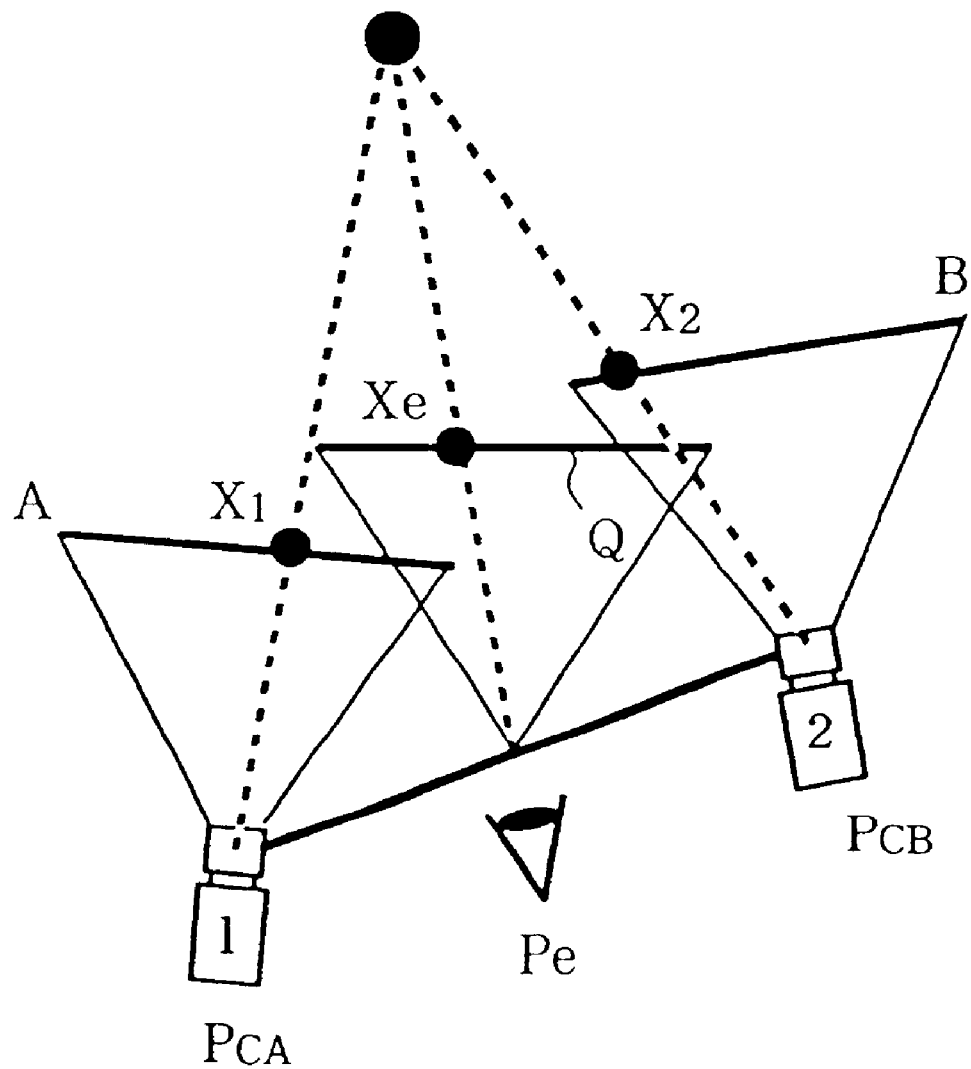
FIG. 1 is a view for explaining the reason why distortion occurs in linear interpolation in the prior art.
Figure 2:
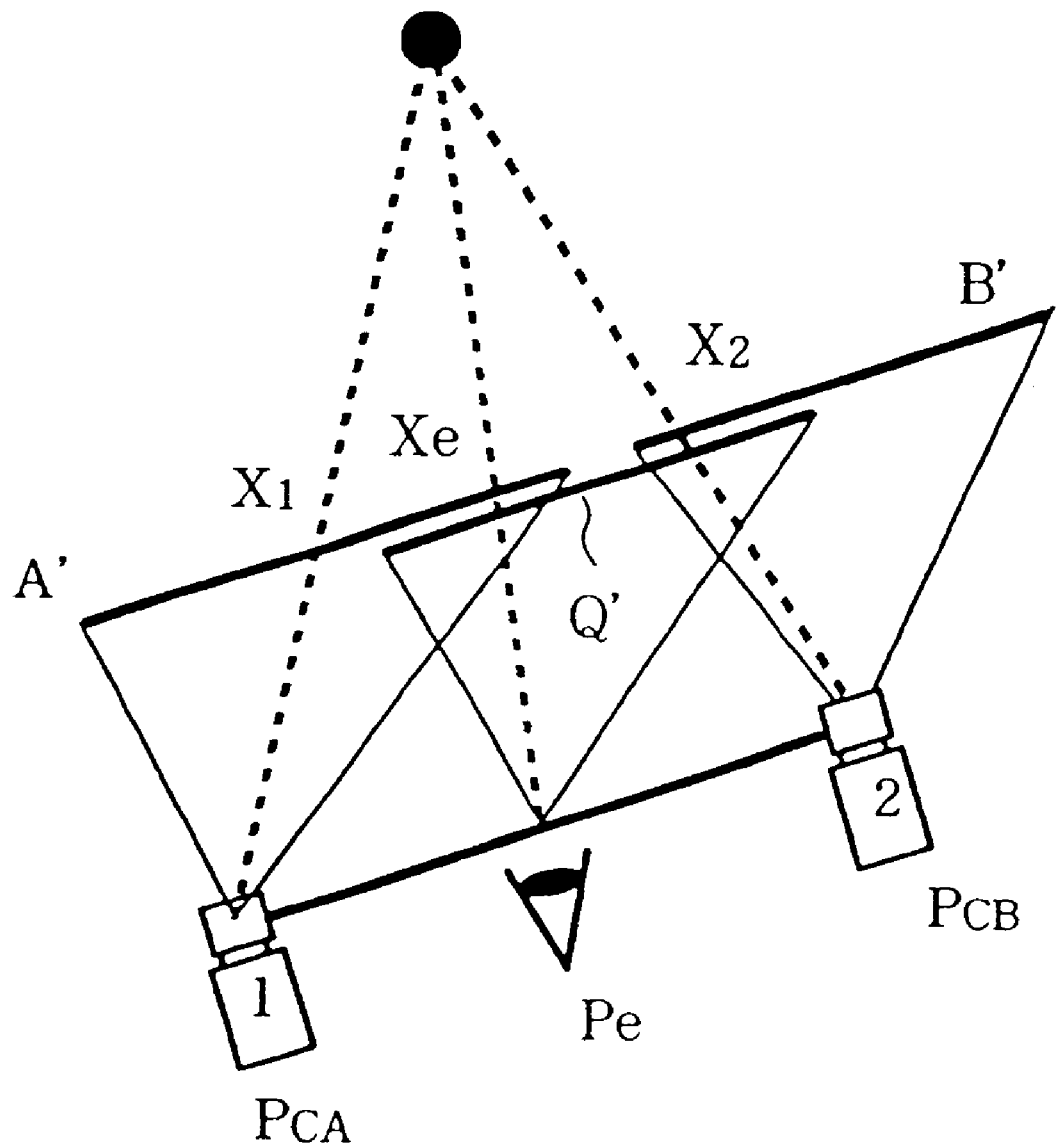
FIG. 2 is a view for explaining the reason why no distortion occurs when the line of sight directions of images are made to become perpendicular to the base line in the prior art.
Figure 3:
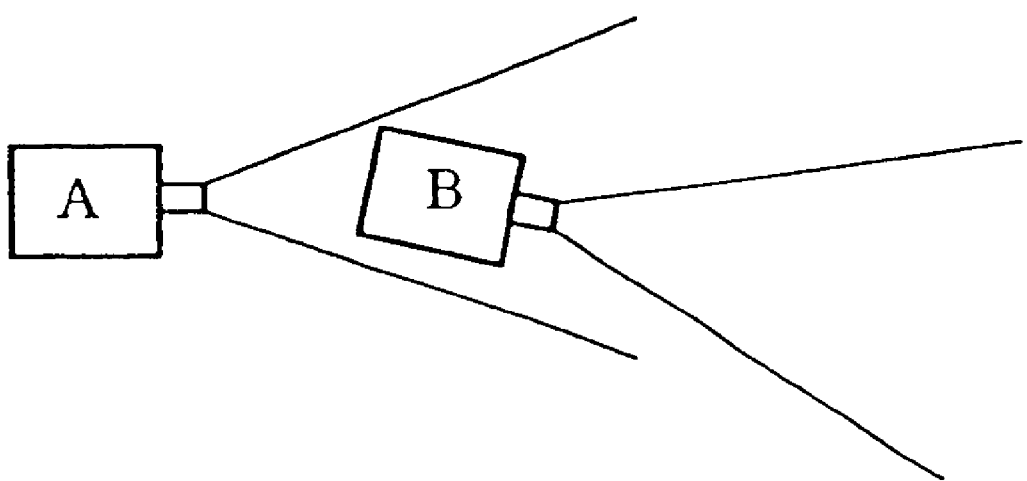
FIG. 3 is a view for explaining the reason why distortion cannot be eliminated in the prior art.
Figure 4:
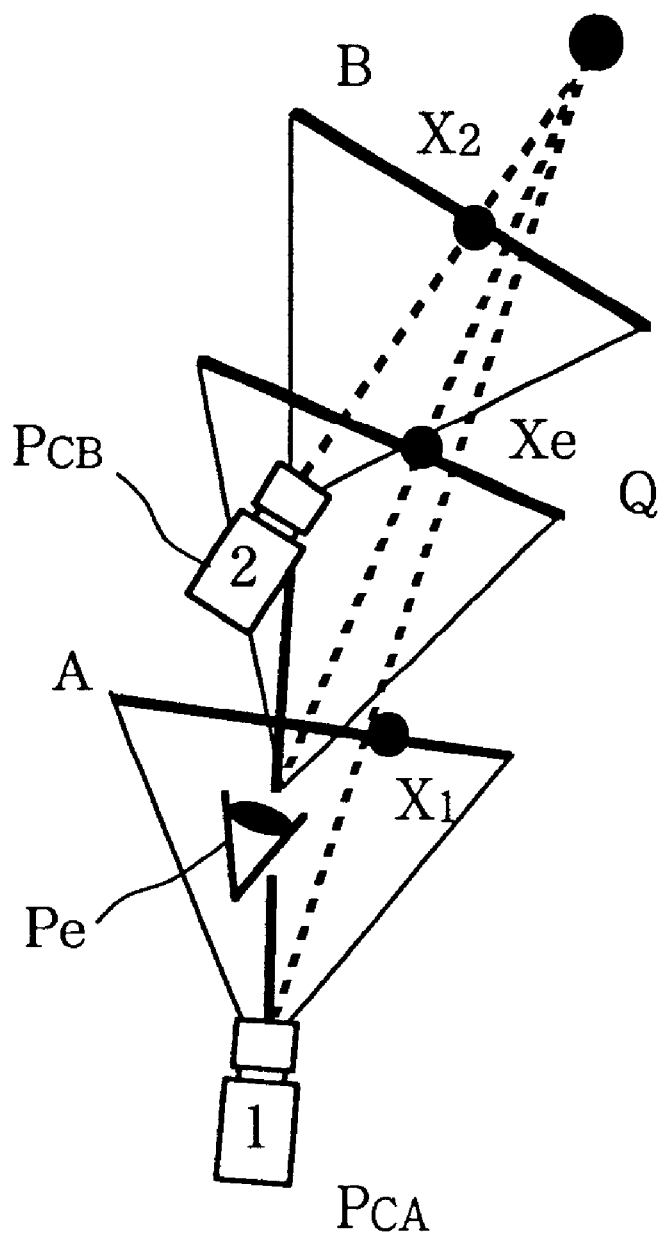
FIG. 4 is a view for explaining the principle of nonlinear interpolation in the mode of present invention.
Figure 5:
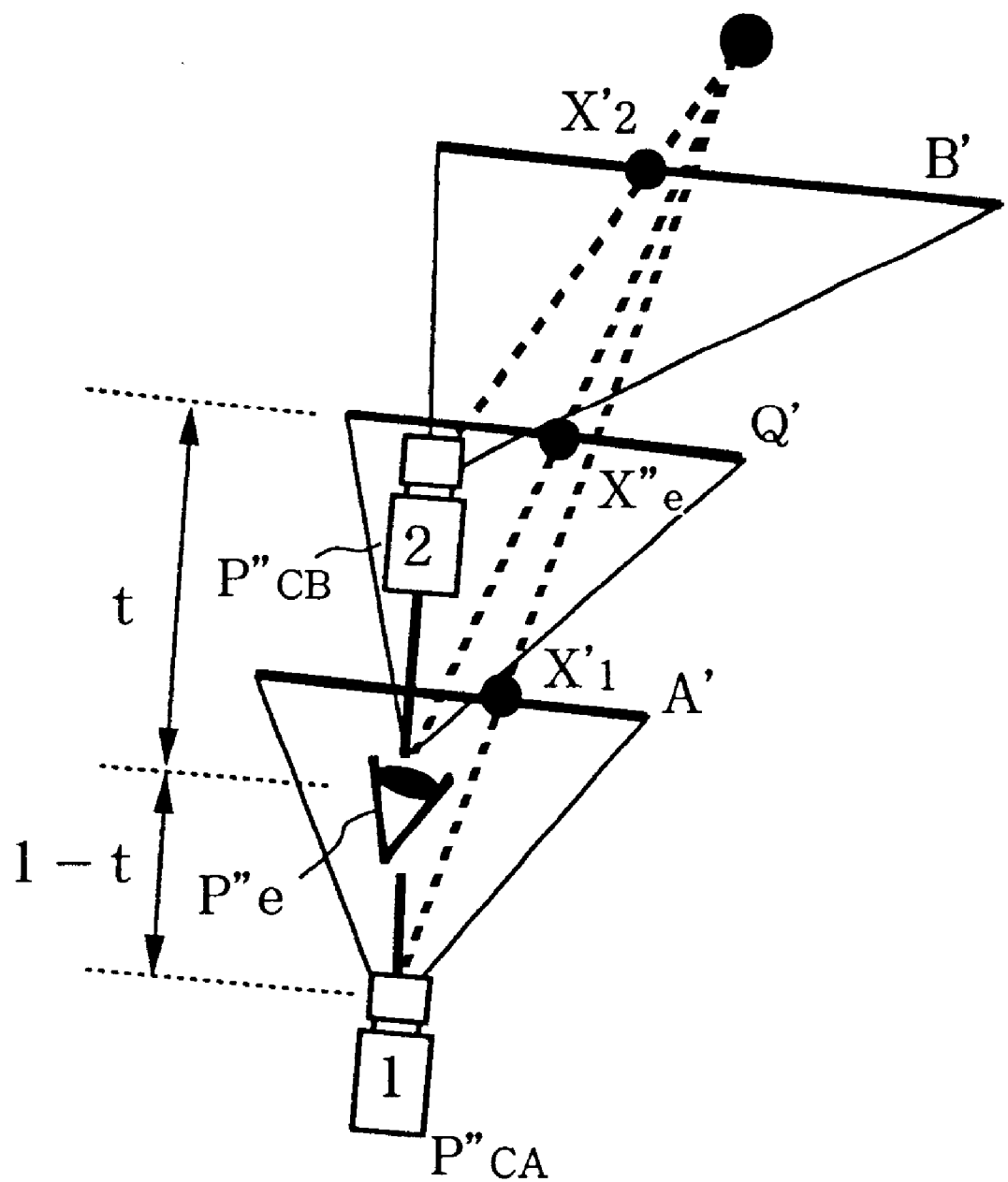
FIG. 5 is a view for explaining processing of making the optical axes of image coincide with each other as pre-processing for nonlinear interpolation in the mode.

FIG. 4 shows a case characterized in that the field of view of one camera (viewpoint position $P_{CA}$) includes the field of view of the other camera (viewpoint position $P_{CB}$). In this case, according to the prior art, linear interpolation cannot be performed. As shown in FIG. 5, therefore, the cameras (i.e., the images) are rotated such that the optical axes of the two cameras substantially coincide with each other (are substantially superimposed on the same straight line), thereby obtaining images A' and B' after the rotations. A virtual image Q' is then obtained from these images by linear interpolation. For the sake of descriptive convenience, assume that a viewpoint position includes not only a viewpoint position but also a line of sight direction in the following description of this mode and embodiments.

The principle of this mode will be further described below with reference to FIG. 6.

Figure 6:
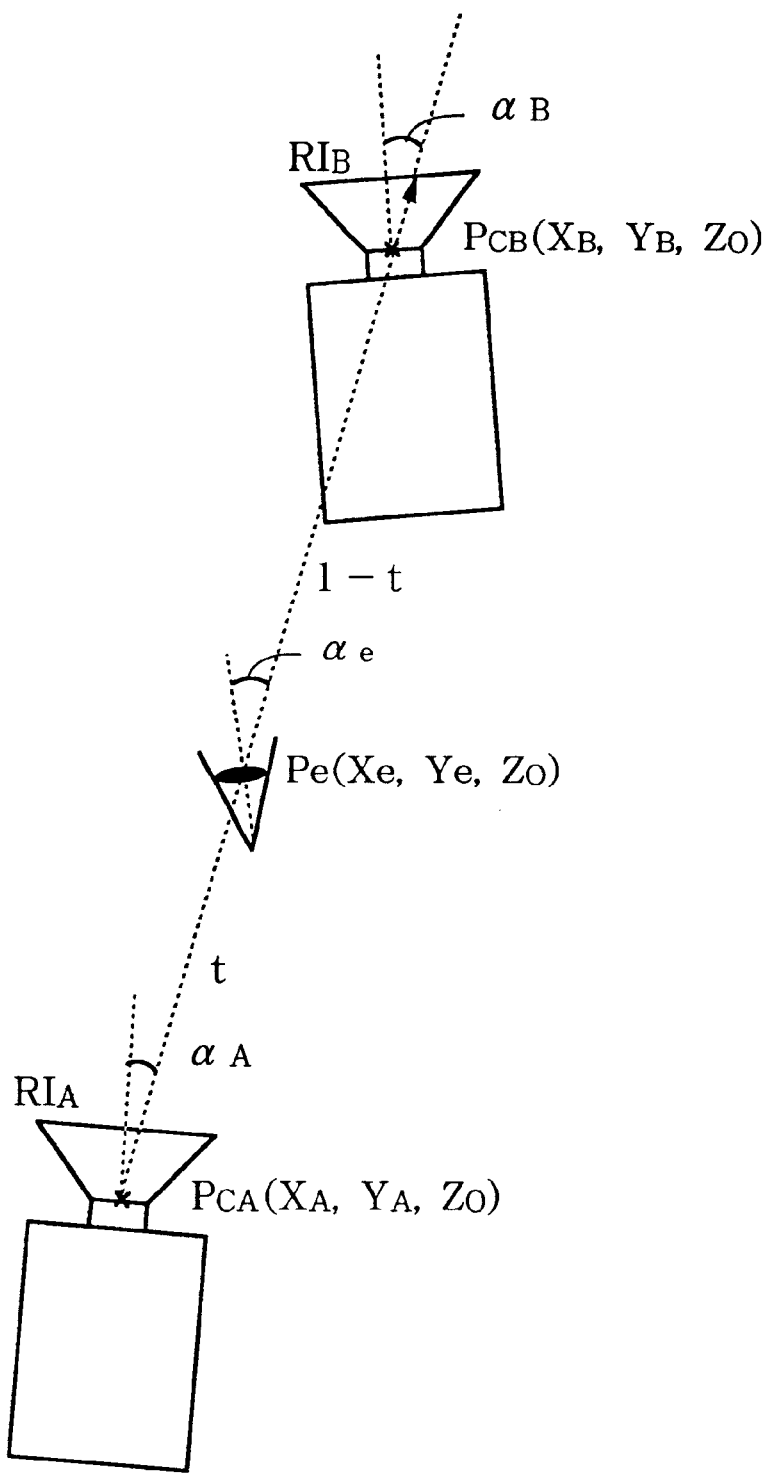
FIG. 6 is a view for explaining a case wherein nonlinear interpolation processing is required.

Assume that real images $RI_A$ and $RI_B$ are obtained at two camera viewpoints $P_{CA}$ and $P_{CB}$, as shown in FIG. 6. Assume that the optical axis at the camera viewpoint $P_{CA}$ offsets from the base line by an angle $\alpha_A$, and the optical axis at the camera viewpoint $P_{CB}$ offsets from the base line by angle $\alpha_B$. In addition, assume that a viewpoint position $P_e$ of the user is located at a position on the base line at which the line is internally divided at an internal ratio of t:(1−t), as shown in FIG. 6. As will be described later, this assumption can be generalized even when the viewpoint position of the user is not located on the base line.

Figure 7:
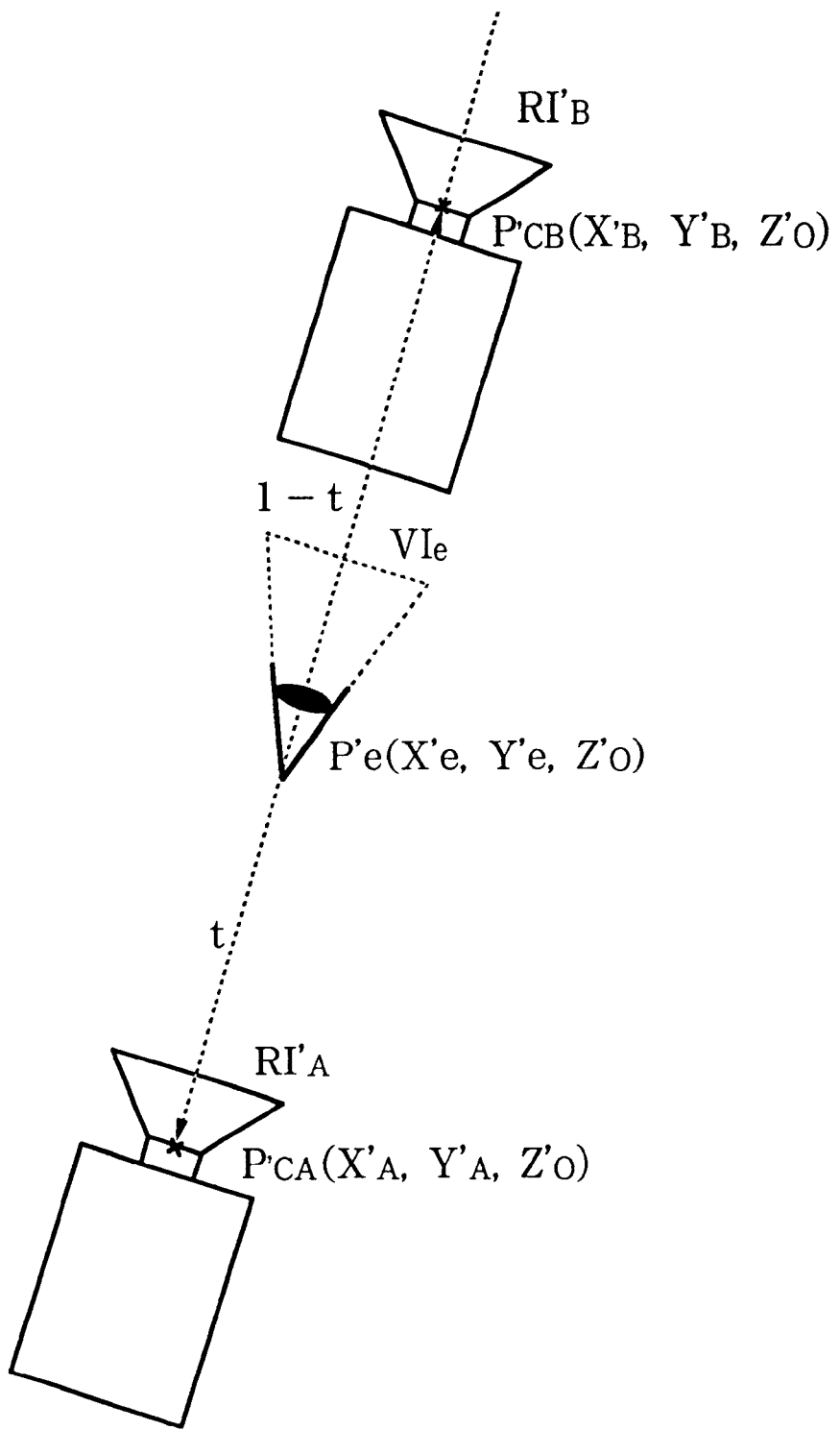
FIG. 7 is a view for explaining nonlinear interpolation processing in the mode.

In the case shown in FIG. 6, the field of view at the viewpoint position $P_{CA}$ includes the field of view at the viewpoint position $P_{CB}$, no corresponding points can be calculated by any technique in the prior art. According to the technique of this mode, however, the real images having the positional relationship shown in FIG. 6 are rotated at the respective viewpoint positions to make their optical axes coincide with each other, thereby obtaining rotational images $RI'_A$ and $RI'_B$, as shown in FIG. 7.

Figure 8:
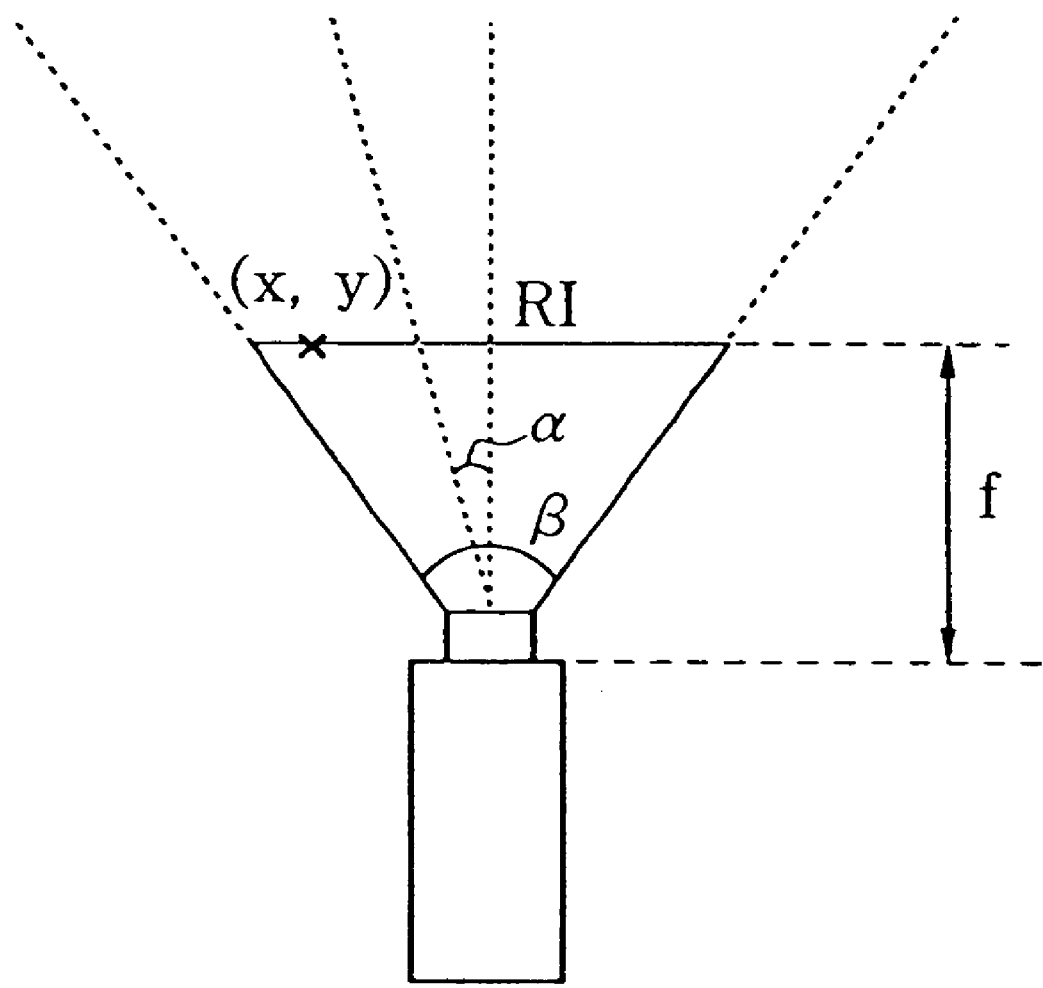
FIG. 8 is a view for explaining processing of making the optical axes of images coincide with each other as pre-processing for nonlinear interpolation.
Figure 9:
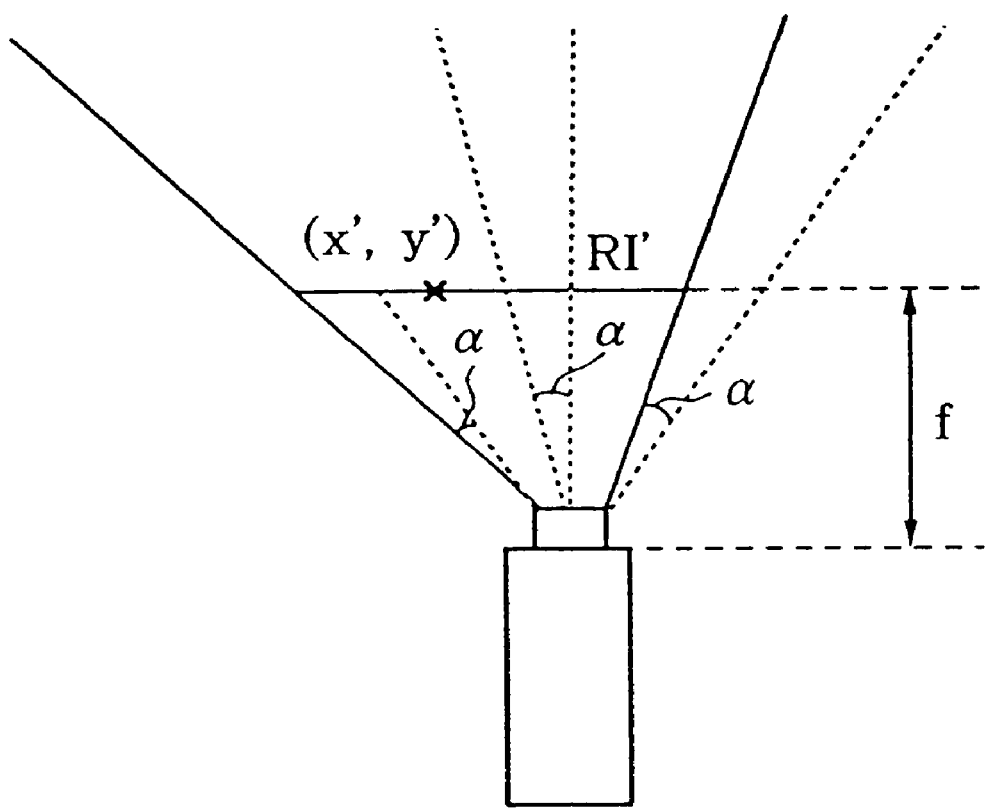
FIG. 9 is a view for explaining processing of making the optical axes of images coincide with each other as pre-processing for nonlinear interpolation.

The rotational images $RI'_A$ and $RI'_B$ can be obtained by the known technique shown in FIGS. 8 and 9. More specifically, as shown in FIG. 8, let β be the field angle of an image before rotation (if identical cameras are used, $\beta_A = \beta_B$), f be the focal length of the camera, and W be the number of pixels in the horizontal direction. In general, making the optical axis of a camera separated from the base line by the angle $\alpha_A$ (or $\alpha_B$) coincide with the base line is equivalent to obtaining the rotational image $RI'_A$ (or $RI'_B$) by rotating the image $RI_A$ (or $RI_B$) by the angle $\alpha_A$ or $(\alpha_B)$. With this rotation, arbitrary coordinates $(x_A, y_B)$ (or $(x_B, y_A)$) of the original image $RI_A$ (or $RI_B$) is rotated by the angle $\alpha_A$ or (or $\alpha_B$), and hence the coordinates become $(x'_A, y'_A)$ $((x'_B, y'_B))$ given by the following equations:

$$x'_A = f \cdot \tan(\phi_A - \alpha_A) \qquad \text{[EQ1A]}$$

$$y'_A = \frac{\cos\phi_A}{\cos(\phi_A - \alpha_A)} \qquad \text{[EQ2A]}$$

$$x'_B = f \cdot \tan(\phi_B - \alpha_B) \qquad \text{[EQ1B]}$$

$$y'_B = \frac{\cos\phi_B}{\cos(\phi_B - \alpha_B)} \quad \text{[EQ2B]}$$

for $$\phi_A = \tan(x_A/f) \quad \text{[EQ3A]}$$

$$\phi_B = \tan(x_B/f) \quad \text{[EQ3B]}$$

$$f = \frac{W}{2}\tan\left(\frac{\beta}{2}\right) \quad \text{[EQ3C]}$$

In this mode, a virtual image $VI_e$ at the user viewpoint position is generated on the basis of the images $RI'_A$ and $RI'_B$ whose optical axes coincide with each other after the above rotations.

Figure 10:
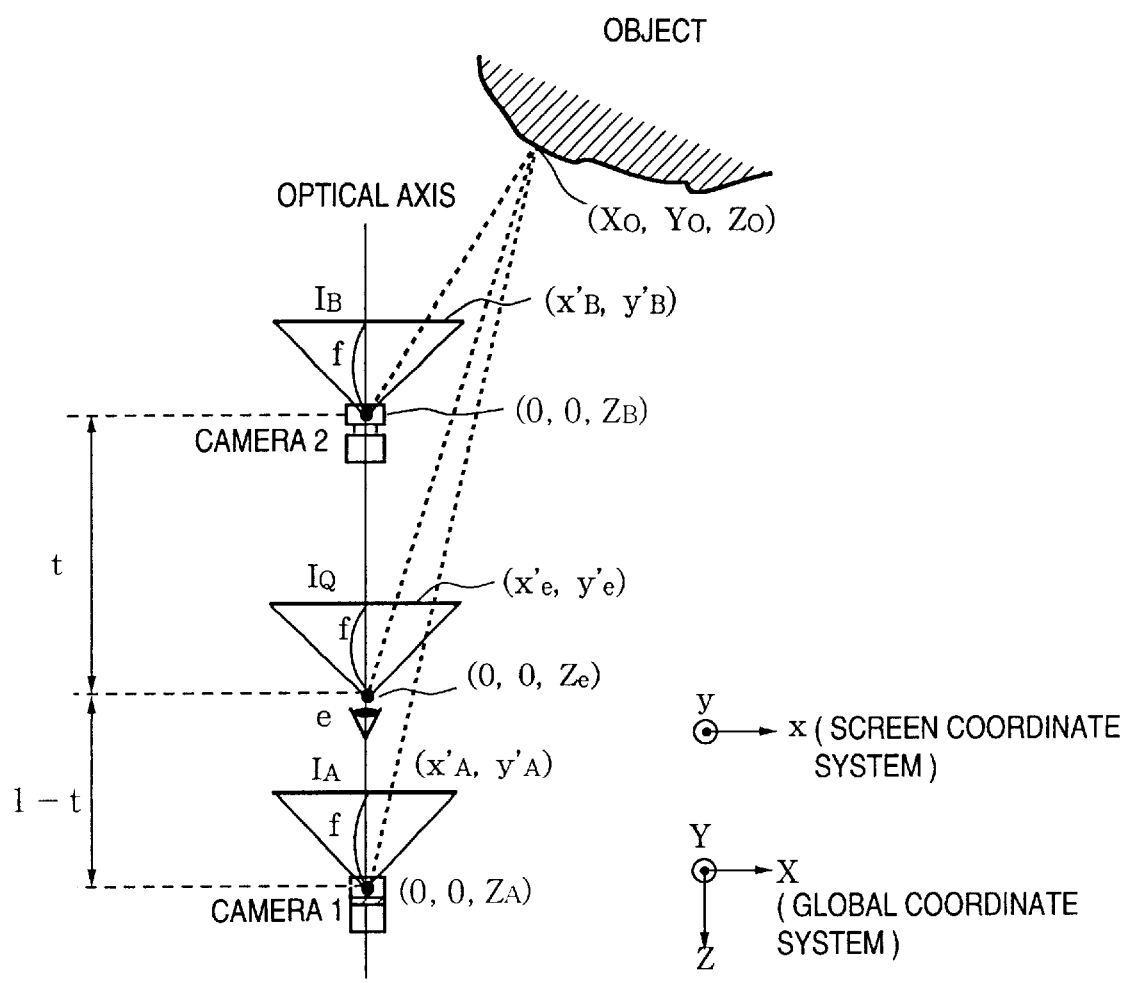
FIG. 10 is a view for explaining the principle of nonlinear interpolation processing in the mode.

According to the present inventors, in general, for example, in the arrangement shown in FIG. 10, letting $x_A$ and $x_B$ be the coordinates of given corresponding points on the two images $RI'_A$ and $RI'_B$ of the same object, whose optical axes $I'_A$ and $I'_B$ coincide with each other, the coordinates $(x_e, y_e)$ of a corresponding point at an arbitrary viewpoint position $P'_e$ are expressed as:

$$x_e = \frac{x'_A \cdot x'_B}{(1-t) \cdot x'_A - t \cdot x'_B} \quad \text{[EQ4]}$$

$$y_e = \frac{y'_A \cdot y'_B}{(1-t) \cdot y'_A - t \cdot y'_B} \quad \text{[EQ5]}$$

That is, equations EQ4 and EQ5 are established between the two corresponding point coordinates on the two real images $RI'_A$ and $RI'_B$ and one corresponding point on a virtual image VR. In other words, a virtual image can be generated by nonlinear interpolation like that represented by equations EQ4 and EQ5.

Equations EQ4 and EQ4 given above can be calculated as follows with reference to FIG. 10. Letting $(x, y)$ be the coordinate system of the camera, and $(X, Y, Z)$ be the global coordinate system, X axis=x axis, Y axis=y axis, and Z axis=optical axis are set. In addition, let $(x_0, Y_0, Z_0)$ be the global coordinates of a given point on the object, and f be the focal length of the camera.

Since all the corresponding points on the above three images must be located on the same optical axis, $$\frac{x'_A}{f} = \frac{X_0}{Z_A - Z_0} \quad \text{[EQ6A]}$$

$$\frac{x'_B}{f} = \frac{X_0}{Z_B - Z_0} \quad \text{[EQ6B]}$$

$$\frac{x'_e}{f} = \frac{X_0}{Z_e - Z_0} \quad \text{[EQ6C]}$$

In consideration of $$Z_e = t \cdot Z_1 + (1-t) \cdot Z_2 \quad \text{[EQ6D]}$$

when f is eliminated from equations EQ6, $$\frac{1}{x'_e} = \frac{t}{x'_A} + \frac{1-t}{x'_B} \quad \text{[EQ7A]}$$

$$\frac{1}{y'_e} = \frac{t}{y'_A} + \frac{1-t}{y'_B} \quad \text{[EQ7B]}$$

Thereafter, equations EQ4 and EQ5 given above can be obtained. According to equations EQ7A and EQ7B, in "nonlinear proportional distribution processing" in this mode, the reciprocal ($1/x_e$ or $1/y_e$) of a coordinate value $x_e$ (or $y_e$) of the virtual image, the reciprocal ($1/x_A$ or $1/y_A$) of the coordinate value $x_A$ (or $y_A$) of the real image $RI_A$ in the image coordinate system, and the reciprocal ($1/x_B$ or $1/y_B$) of the coordinate value $x_B$ (or $y_B$) of the real image $RI_B$ in the image coordinate system are proportionally distributed at $t:(1-t)$.

Although the interpolation expressions represented by equations EQ4 and EQ5 are nonlinear, they are simple expressions. This is because the two axes coincide with each other. If the conversion expressions represented by equations EQ1 and EQ2 are used while a slight error between the optical axes is allowed, the distortion will increase in accordance with the degree of incoincidence.

The interpolated image at the user viewpoint position, which is obtained by equations EQ4 and EQ5, is the virtual image obtained when the user faces toward the base line connecting the points $P_{CA}$ and $P_{CB}$. In reality, in the case shown in FIG. 6, since the user rotates through an angle $\alpha_e$ with respect to the base line, the virtual image VR must be rotated by the angle $\alpha_e$. Letting $(x_e, y_e)$ be the coordinates of a pixel of the virtual image that is rotated by the angle $\alpha_e$, $$x_e = f\tan(\phi' - \alpha_e) \quad \text{[EQ8]}$$

$$y_e = \frac{\cos\phi'}{\cos(\phi' - \alpha_e)} \quad \text{[EQ9]}$$

for $$\phi' = \tan(x'_e/f) \quad \text{[EQ10A]}$$

$$f = \frac{W}{2}\tan\left(\frac{\beta}{2}\right) \quad \text{[EQ10B]}$$

With this operation, on the basis of the two real images from the cameras or viewpoint positions having the positional relationship in FIG. 6, an interpolated image viewed from the user having a viewpoint at an arbitrary position on the base line connecting the viewpoint positions can be generated without any distortion.

[First Embodiment]

According to the technique described in the above mode, as is obvious from FIG. 4 or 6, a virtual user viewpoint position is set on the line (i.e., the base line) connecting the camera viewpoint positions $P_{CA}$ and $P_{CB}$ of the real images. This means that the range in which the user can experience a virtual space is limited on the base line.

In the following virtual image interpolation method of this embodiment, the moving range in a virtual space is two-dimensionally expanded, and three real images are prepared for this purpose. More specifically, this method allows the user to freely move in a predetermined virtual space (two-dimensional space) defined by the viewpoint positions of the three real images. In order to two-dimensionally expand the space in which the user can move, the image sensing positions of the three images define a triangle, as shown in FIG. 12 or 13.

It is important for image interpolation in this embodiment to obtain three real images whose image sensing directions (camera viewpoint positions) are known. In the case shown in FIG. 12, two cameras I and II are used, and a plurality of images (real images) are acquired at different image sensing positions while the two cameras are simultaneously moved in the same direction. In the case shown in FIG. 13, three cameras I, II, and III are used to simultaneously perform image sensing to obtain three real images. The virtual space in which the user can move can be expanded to a certain degree by using at least these three real images. In the case shown in FIG. 13, when the three cameras are simultaneously moved, sets of three images can be sequentially obtained. In other words, the virtual space in which the user can move can be further expanded.

Figure 12:
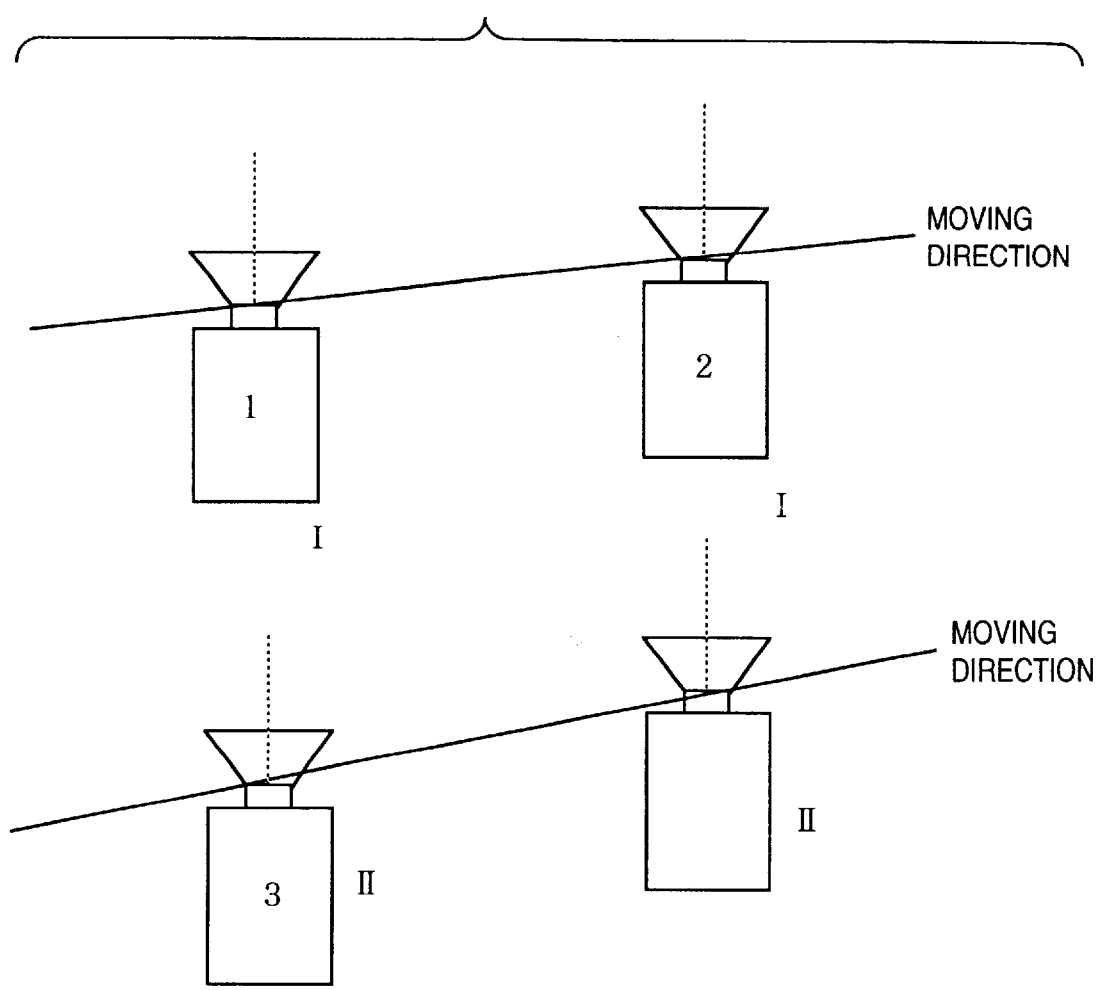
FIG. 12 is a view for explaining why three images are required in the first embodiment of the present invention.

In the case shown in FIG. 12, the two cameras are positioned under the condition that the fields of view of both the cameras I and II include an object, and the field of view of the camera I is included in the field of view of the camera II. In this case, when the camera I (or II) is moved, the optical axis of the camera I is kept in the same direction at least at viewpoint positions 1 and 2 (different times) unless the optical axis of the camera is rotated. As will be described later, two real images are obtained at viewpoint positions 1 and 2 such that one of the optical axes at the two viewpoint positions does not include the other. Therefore, linear interpolation can be performed without any distortion.

Figure 13:
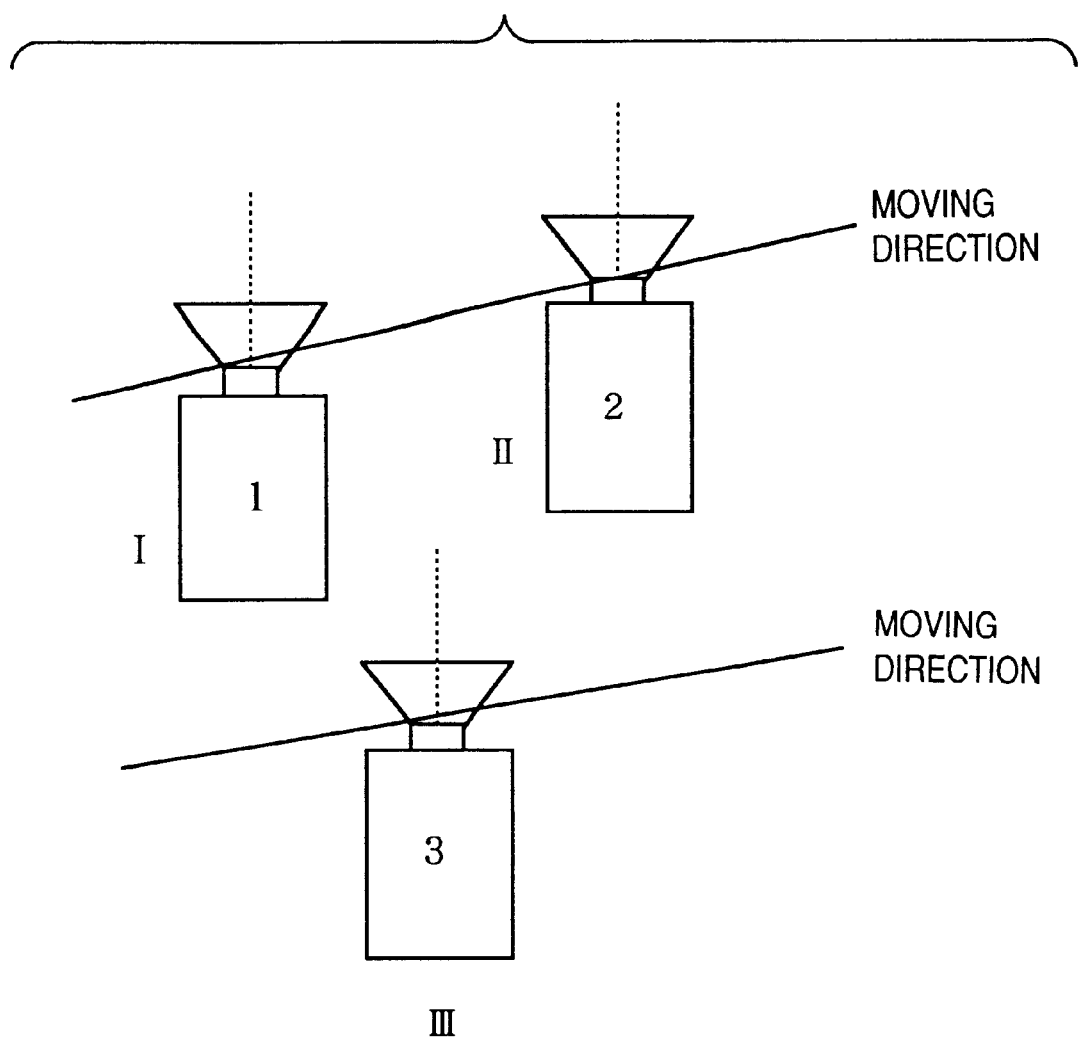
FIG. 13 is a view for explaining why three images are required in the first embodiment of the present invention.

In the case shown in FIG. 13, the two cameras I and II are positioned such that one optical axis does not include the other optical axis.

As described above, in the cases shown in FIGS. 12 and 13, when the cameras are moved, many real images can be obtained. Image interpolation in this embodiment is not performed by using only the images simultaneously taken as in the case shown in FIG. 13. In the case shown in FIG. 12, interpolation is performed by using at least two images sensed by the camera I at different time points (and one image sensed by the camera II). As will be obvious from the following description, either in the case shown in FIG. 12 or the case shown in FIG. 13, a virtual image can be interpolated by using three real images, even if they are not acquired by the same camera, or not simultaneously acquired by different cameras, as long as the three images satisfy predetermined conditions.

Figure 14:
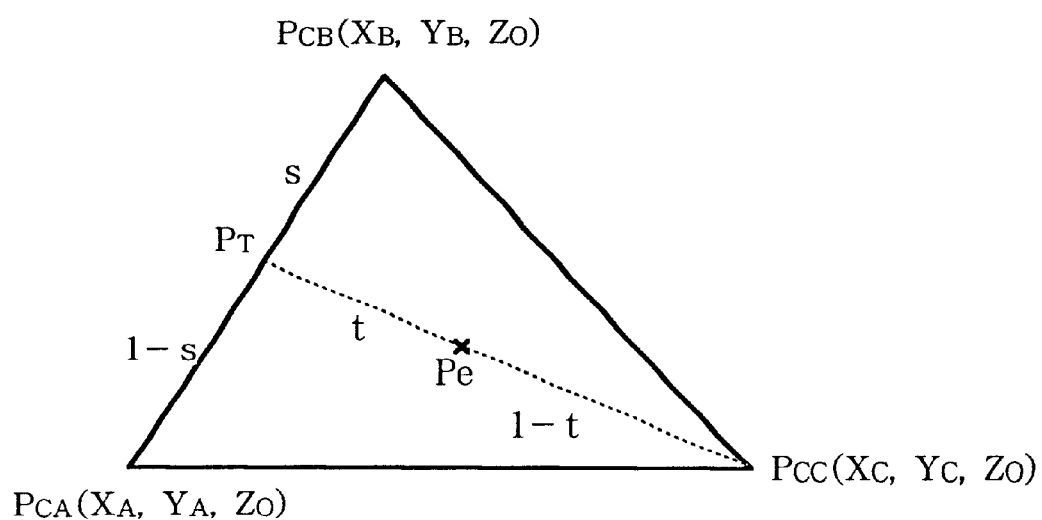
FIG. 14 is a view for explaining one method of setting two internal dividing points to make one internal dividing point coincide with the user viewpoint position.

In performing image interpolation in this embodiment, a user viewpoint position $P_e$ is set in consideration of the viewpoint positions of three real images. In generating an interpolated image, the viewpoint positions of the three real images are weighted. If real images $I_A$, $I_B$, and $I_C$ are located at three real viewpoint positions ($P_{CA}$, $P_{CB}$, $P_{CC}$) as shown in FIG. 14, weighting coefficients ($W_A$, $W_B$, $W_C$) to be considered for the respective three real image $I_A$, $I_B$, and $I_C$ are expressed as:

$$\begin{bmatrix} w_A \\ w_B \\ w_C \end{bmatrix} = \begin{bmatrix} X_A & X_B & X_C \\ Y_B & Y_B & Y_C \\ 1 & 1 & 1 \end{bmatrix}^{-1} \begin{bmatrix} X_e \\ Y_e \\ 1 \end{bmatrix} \quad [\text{EQ11}]$$

Figure 15:
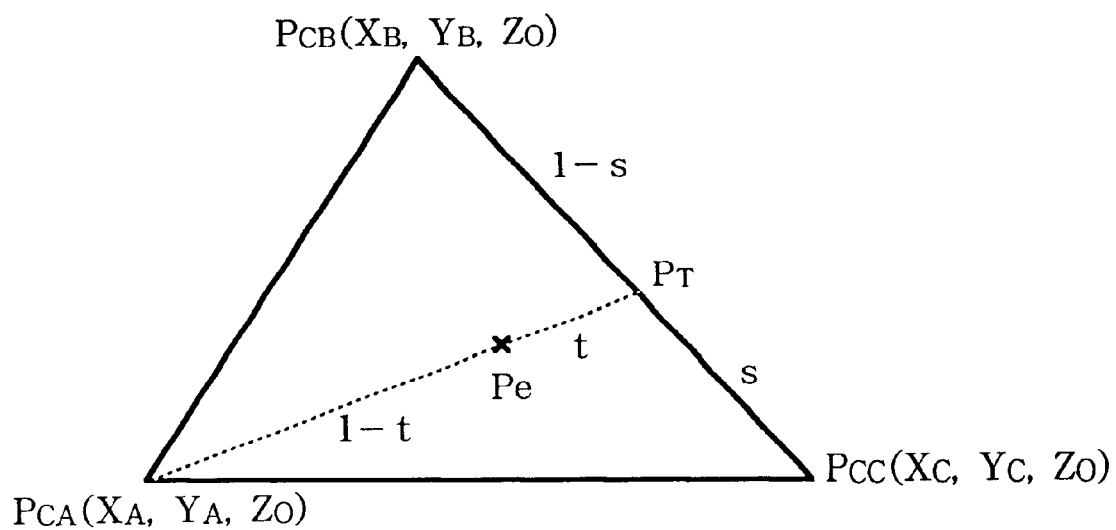
FIG. 15 is a view for explaining another method of setting two internal dividing points to make one internal dividing point coincide with the user viewpoint position.

If the real images $I_A$, $I_B$, and $I_C$ are positioned as shown in FIG. 15, the weighting coefficients are expressed as:

$$\begin{bmatrix} W_A \\ W_B \\ W_C \end{bmatrix} = \begin{bmatrix} X_B & X_C & X_A \\ Y_B & Y_C & Y_A \\ 1 & 1 & 1 \end{bmatrix}^{-1} \begin{bmatrix} X_e \\ Y_e \\ 1 \end{bmatrix} \quad [\text{EQ12}]$$

Figure 16:
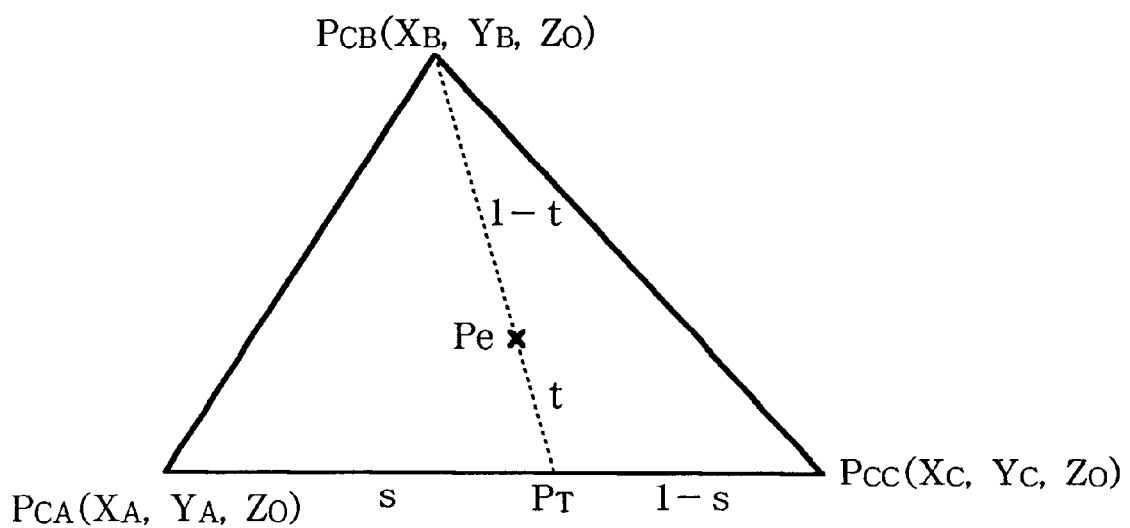
FIG. 16 is a view for explaining still another method of setting two internal dividing points to make one internal dividing point coincide with the user viewpoint position.

If the real images $I_A$, $I_B$, and $I_C$ are positioned as shown in FIG. 16, the weighting coefficients are expressed as:

$$\begin{bmatrix} W_A \\ W_B \\ W_C \end{bmatrix} = \begin{bmatrix} X_C & X_A & X_B \\ Y_C & Y_A & Y_B \\ 1 & 1 & 1 \end{bmatrix}^{-1} \begin{bmatrix} X_e \\ Y_e \\ 1 \end{bmatrix} \quad [\text{EQ13A}]$$

The internal ratio shown in FIGS. 14 to 16 is determined on the basis of the weighting coefficients obtained by one of equations EQ11 to EQ13A. That is, $$s = \frac{W_A}{1 - W_C} \quad [\text{EQ13B}]$$

$$t = W_C \quad [\text{EQ13C}]$$

The internal ratio shown in FIGS. 14 to 16 serves to set a temporary virtual viewpoint position $P_T$. The temporary viewpoint position $P_T$ is set on a base line AB in the arrangement shown in FIG. 14, on a base line BC in the arrangement shown in FIG. 15, and on a base line CA in the arrangement shown in FIG. 16, each at a ratio of 1–s:s.

Figure 11:
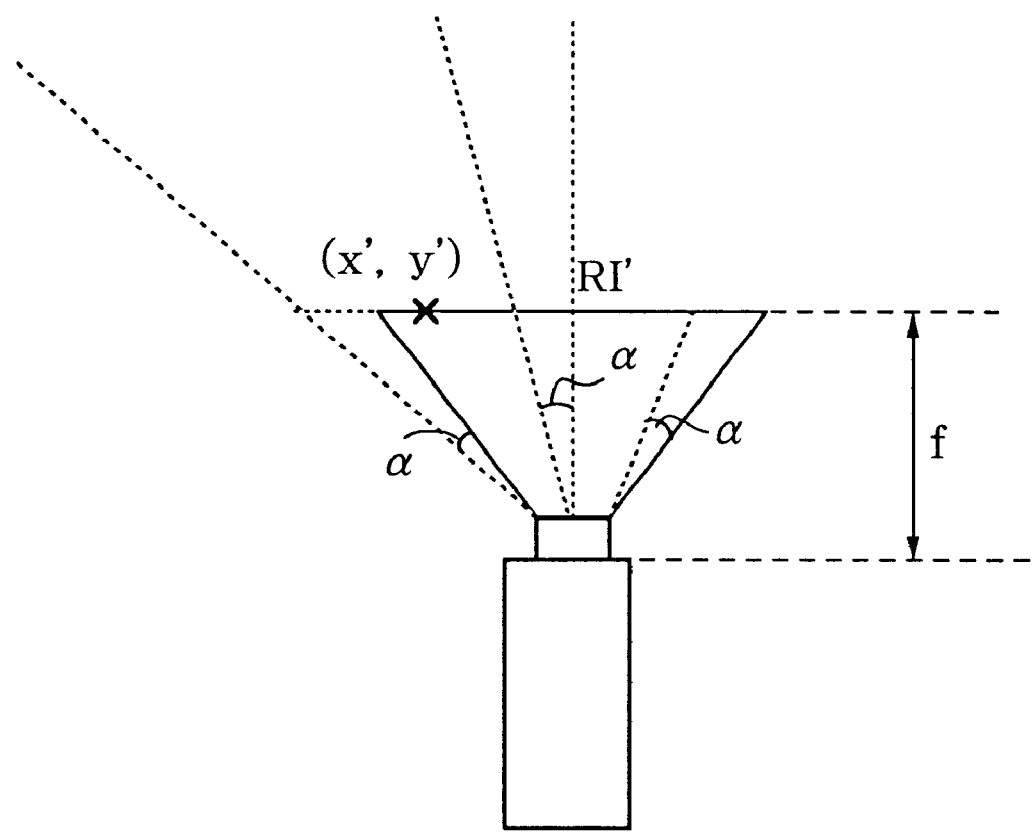
FIG. 11 is a view for explaining rotation processing for making an image coincide with the line of sight direction of the user after nonlinear interpolation processing.

If the viewpoint directions at the two end points (i.e., the image sensing positions of the two real images) of the base line on which the temporary virtual viewpoint position $P_T$ is present have the relationship shown in FIG. 6, i.e., if the field of view of one real image includes the field of view of the other real image (when two images have this relationship, this relationship will be referred to an inclusive relationship hereinafter), a virtual image at the temporary virtual viewpoint position $P_T$ can be obtained by the method described with reference to FIGS. 7 to 11 (i.e., the nonlinear interpolation method based on equations EQ4 and EQ5). FIG. 11 illustrates rotation processing for making an image coincide with the line of sight of the user after nonlinear interpolation processing. In this manner, the virtual image at the temporary virtual viewpoint position $P_T$ is obtained. In the following description, a virtual image at the temporary viewpoint position $P_T$ will be referred to as a "temporary virtual image $VI_T$".

When the temporary virtual image $VI_T$ is obtained, a virtual image $VI_e$ at the user viewpoint position is generated between the temporary virtual image $VI_T$ and a real viewpoint position (to be referred to as a "remaining viewpoint position", e.g., $P_{CC}$ in FIG. 14) other than the two real viewpoint positions, of the three real points positions ($P_{CA}$, $P_{CB}$, $P_{CC}$), which are used to generate this temporary virtual image $VI_T$. In this case, if the temporary virtual image $VI_T$ is in a an "inclusive relationship" with the real image at the "remaining viewpoint position", the virtual image $VI_e$ at the user viewpoint position can be obtained by the method described with reference to FIGS. 7 to 11.

"Nonlinear interpolation" represented by equations EQ4 and EQ5 is used to obtain a virtual image on the premise that an "inclusive relationship" is established. In the image arrangements shown in FIGS. 14 to 16, however, an "inclusive relationship" is not always established in obtaining the temporary virtual image $VI_T$ or the virtual image $VI_e$ at the user viewpoint position.

As described above, that two images have an inclusive relationship means that the lens center of the front camera is included in the field of view of the rear camera. If, therefore, the lens center is not present in the field of view, the two images do have an "inclusive relationship". In this embodiment, when two images have "no inclusive relationship", a virtual image (temporary virtual image or virtual image at the user viewpoint) is formed by a technique of "linear interpolation".

Linear interpolation to be used when two images do not have an inclusive relationship will be described.

Figure 17:
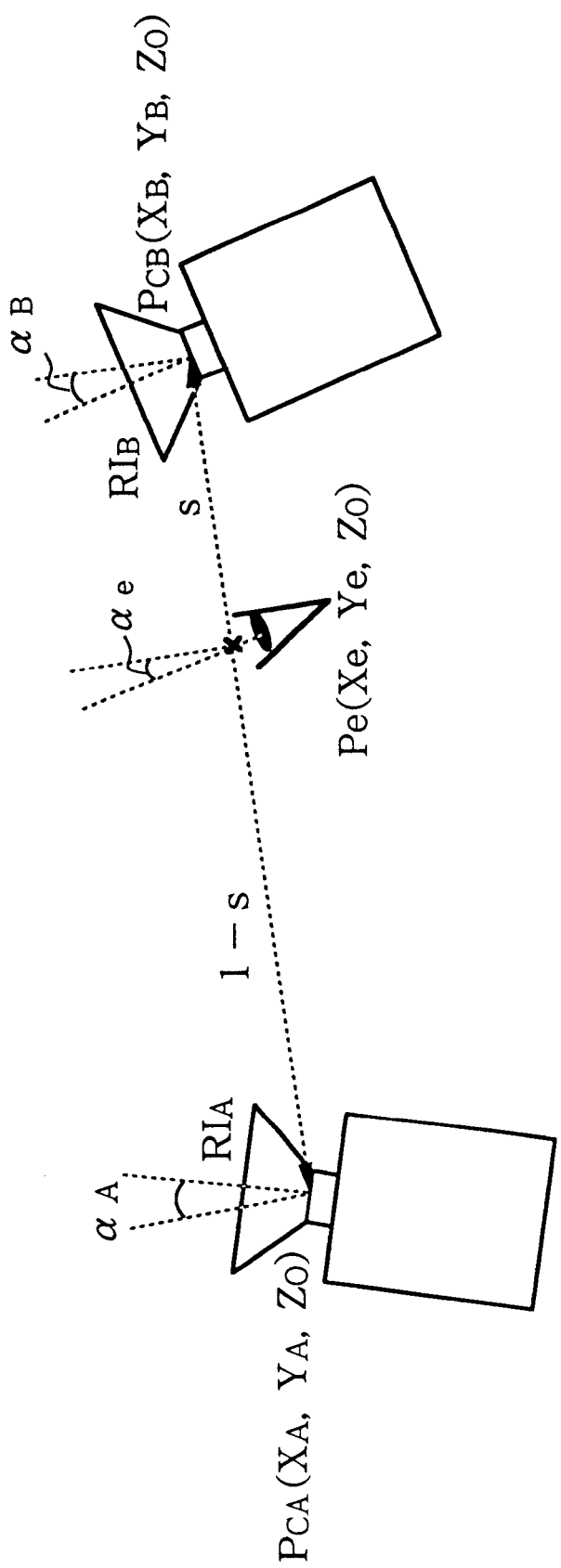
FIG. 17 is a view for explaining the principle of a linear interpolation in the first embodiment.
Figure 18:
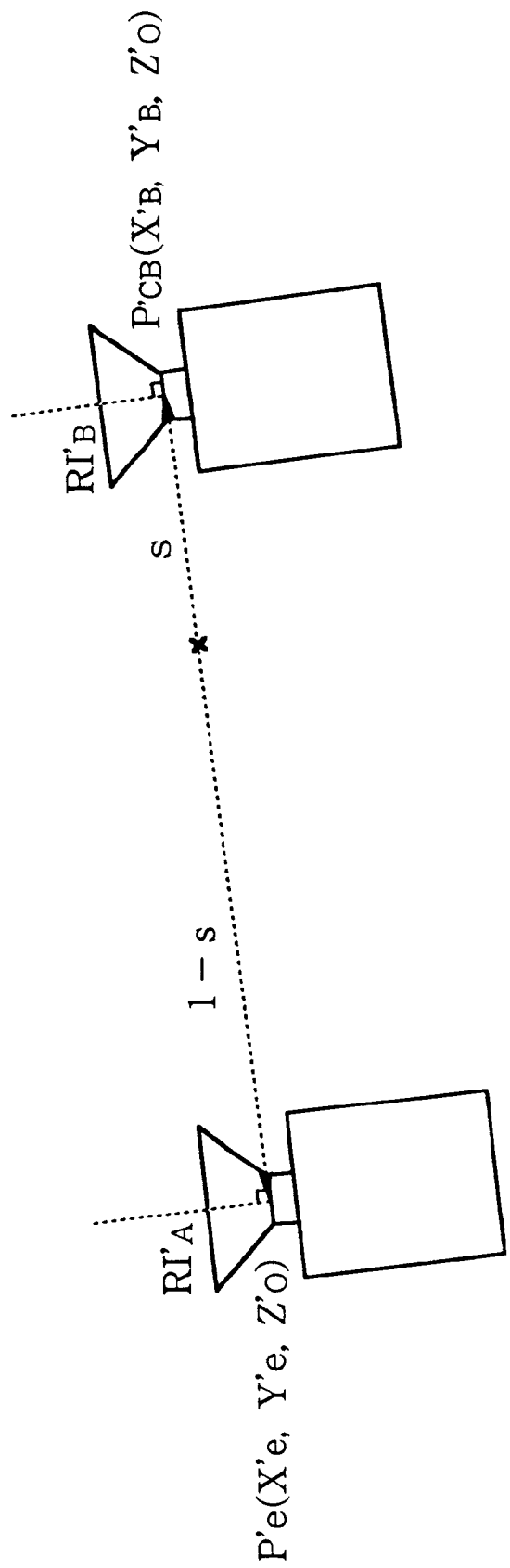
FIG. 18 is a view for explaining the principle of a linear interpolation in the first embodiment.

Referring to FIG. 17, real images $RI_A$ and $RI_B$ do not have an inclusive relationship and are offset from the base line by $\alpha_A$ and $\alpha_B$, respectively. In this case, the real images $RI_A$ and $RI_B$ are rotated about the respective lens centers to make both the real images $RI_A$ and $RI_B$ perpendicular to the base line. By this rotation, as shown in FIG. 18, arbitrary coordinates $(x_A, y_A)$ (or $(x_B, y_B)$) of the original image $RI_A$ (or $RI_B$) are rotated by the angle $\alpha_A$ (or $\alpha_B$) to become $(x'_A, y'_A)$ (or $(x'_B, y'_B)$) given by $$x'_A = f \cdot \tan(\phi_A - \alpha_A) \qquad [EQ14]$$

$$y'_A = \frac{\cos\phi_A}{\cos(\phi_A - \alpha_A)} \qquad [EQ15]$$

$$x'_B = f \cdot \tan(\phi_B - \alpha_B) \qquad [EQ16]$$

$$y'_B = \frac{\cos\phi_B}{\cos(\phi_B - \alpha_B)} \qquad [EQ17]$$

$$\phi_A = \tan(x_A/f) \qquad [EQ18A]$$

$$\phi_B = \tan(x_B/f) \qquad [EQ18B]$$

$$f = \frac{W}{2}\tan\left(\frac{\beta}{2}\right) \qquad [EQ18C]$$

Subsequently, a virtual image VI' at the user viewpoint position is generated on the basis of images $RI'_A$ and $RI'_B$ whose optical axes are made to coincide with each other after the above rotations in accordance with a known linear interpolation technique. If the user viewpoint position $P_e$ is located at a position at which the camera viewpoints $P_{CA}$ and $P_{CB}$ are internally divided at 1−s:s, the coordinates $(x'_e, y'_e)$ of the linearly interpolated virtual image $VI_e$ are given by $$x'_e = s \cdot x'_A + (1-s) \cdot x'_B \qquad [EQ19]$$

$$y'_e = s \cdot y'_A + (1-s) \cdot y'_B \qquad [EQ20]$$

Since the actual user viewpoint position is rotted by $\alpha_e$ with respect to the base line, the virtual image to be generated is obtained as an image $(x_e, y_e)$ obtained by rotating $(x'_e, y'_e)$ by $\alpha_e$ according to:

$$x_e = f \tan(\phi' - \alpha_e) \qquad [EQ21]$$

$$y_e = \frac{\cos\phi'}{\cos(\phi' - \alpha_e)} \qquad [EQ22]$$

for $$\phi' = \tan(x'_e/f) \qquad [EQ23]$$

$$f = \frac{W}{2}\tan\left(\frac{\beta}{2}\right) \qquad [EQ24]$$

A case characterized in that a virtual image at the user viewpoint position $P_e$ is generated when three real images are positioned in one of the arrangements shown in FIGS. 14 to 16 will be described.

In any of the arrangements shown in FIGS. 14 to 16, a "temporary virtual image" at the "temporary virtual viewpoint position $P_T$" must be obtained. A virtual image at the user viewpoint position $P_e$ is obtained on the basis of this "temporary virtual image" and the image at the "remaining viewpoint position" by "linear interpolation" (EQ19 and EQ20) or nonlinear interpolation (EQ4 and EQ5), as described above.

<Control Procedure>

Figure 20:
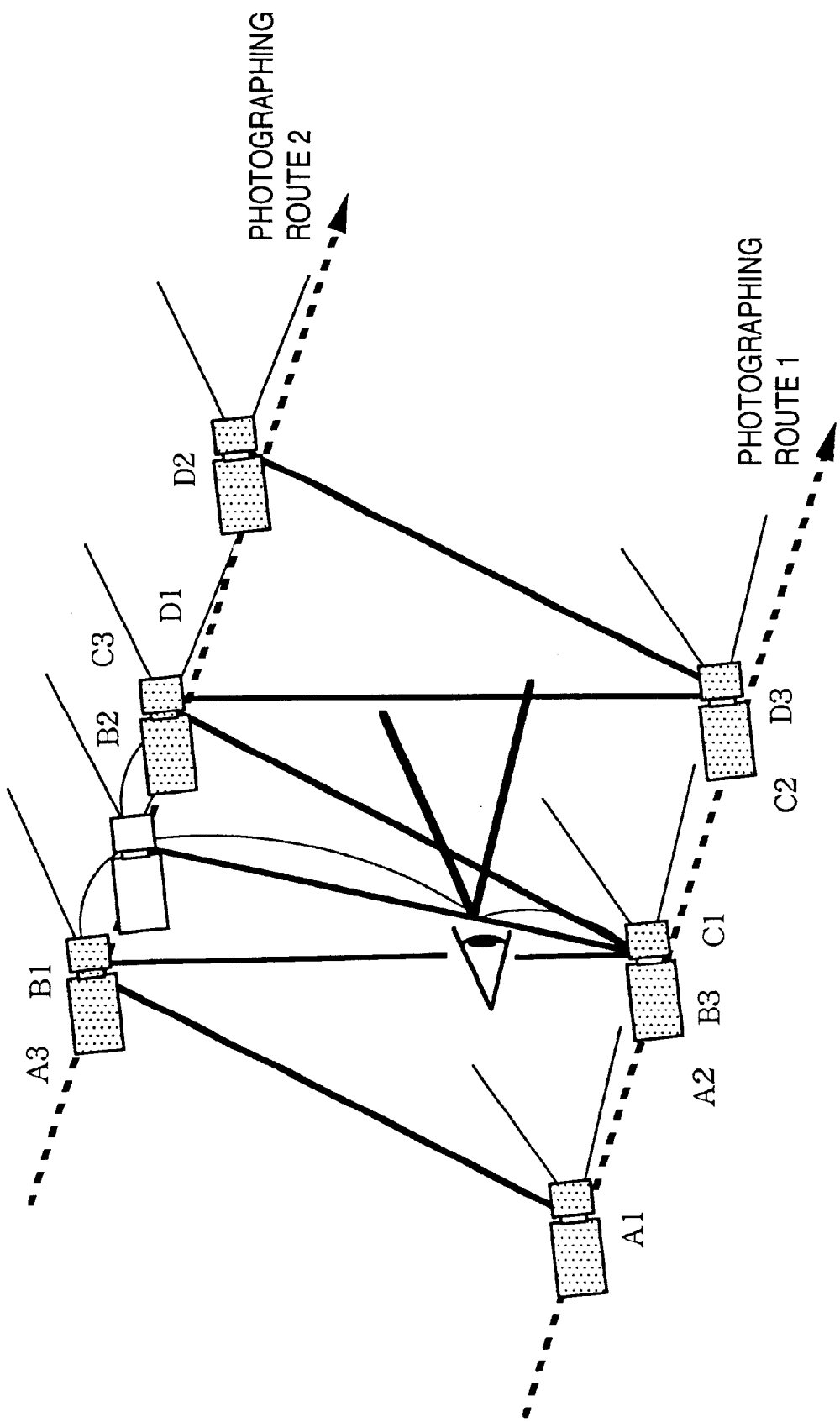
FIG. 20 is a view for explaining the reason why the moving range expands when images to be selected are switched.

As described above, in performing image interpolation in this embodiment, when two images have an inclusive relationship, nonlinear interpolation is applied, whereas when two images do not have an inclusive relationship, linear interpolation is applied. In addition, this embodiment uses three images to expand the user moving range. When either a temporary virtual image or a virtual image at the user viewpoint is generated, two or three original images must include image data about corresponding points of an object at the user viewpoint position and in the line of sight direction. That images include image data about an object will be referred to as "including the object". In other words, when an interpolated image at a given user viewpoint position is to be generated, all three real images must always "include the object". When the user moves his/her viewpoint position, a set of three images that have been used for image interpolation processing may "include no object". In this case, as shown in FIG. 20, another set of three images must be selected. That is, the user moving range can be expanded by changing the selected images. According to control in this embodiment, as will be described later, one of the weighting coefficient calculation methods shown in FIGS. 14 to 16 can be selected in accordance with a set of images. Furthermore, linear interpolation or nonlinear interpolation can be selected depending on whether an inclusive relationship is established between images. This greatly reduces the chance that no virtual image can be generated.

Figure 21:
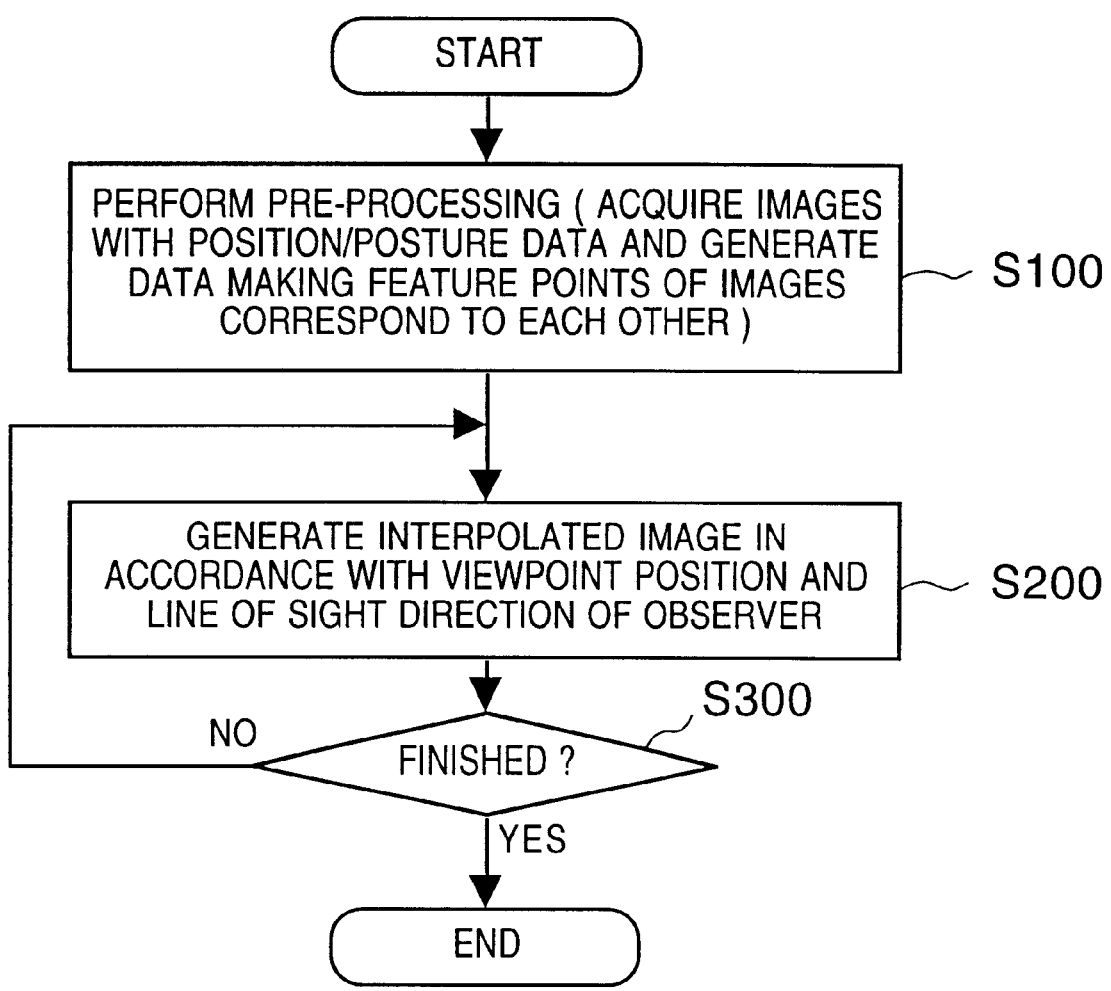
FIG. 21 is a flow chart showing an overall control procedure in the first embodiment.

FIG. 21 is a flow chart showing a control procedure for an image interpolation (panoramic image display) apparatus incorporating the interpolation method of this embodiment. The control procedure for this apparatus can be roughly divided into pre-processing (step S100) and generation/display of an interpolated image (step S200).

Figure 22:
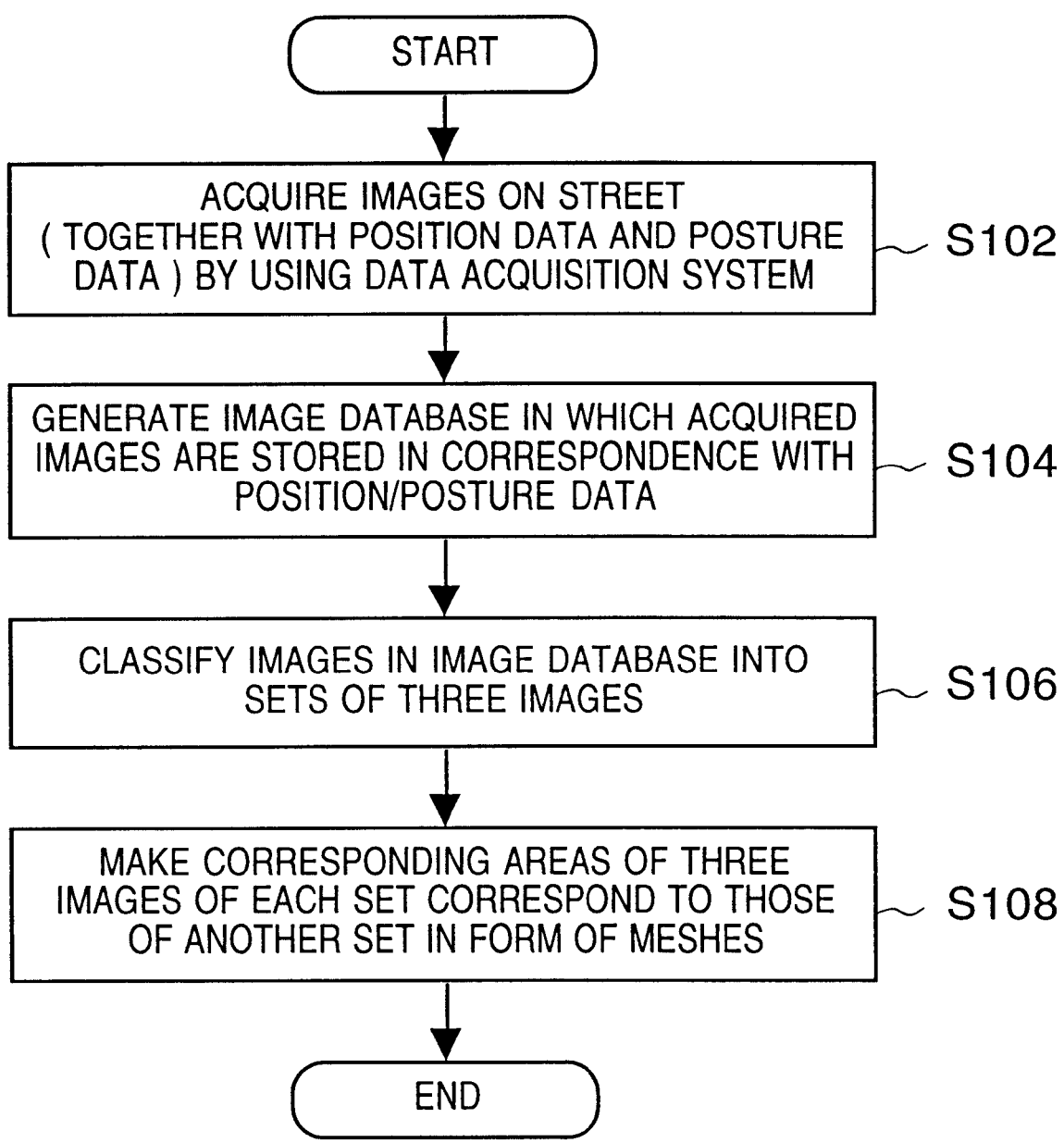
FIG. 22 is a flow chart for explaining the details of pre-processing in the control procedure.

FIG. 22 shows the details of step S100. In step S102, environment images are acquired in advance, and data about image sensing positions (viewpoint positions) and image sensing directions (the line of sight directions of the cameras) are also acquired at a plurality of acquisition positions. In step S104, the images are stored in a database in correspondence with the viewpoint positions and line of sight directions (which may be called viewpoint positions in all).

Figure 23:
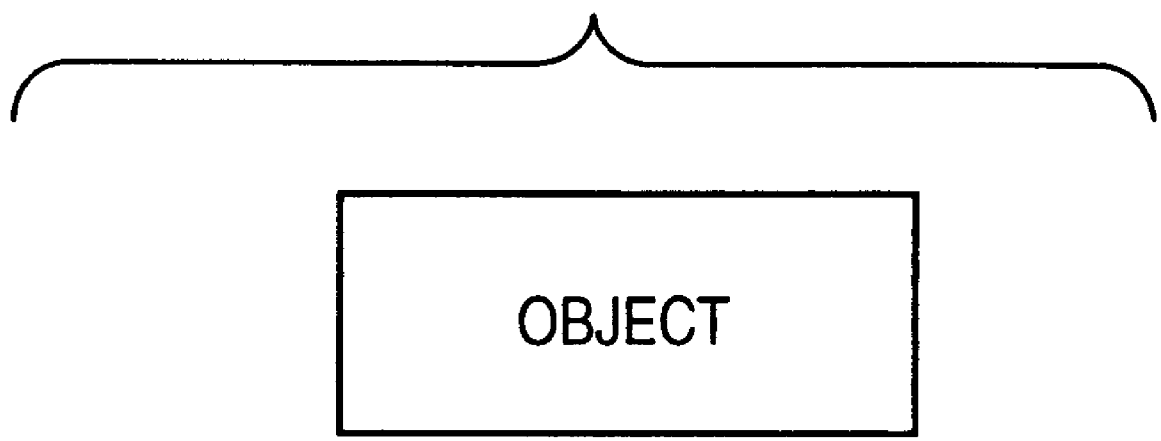
FIG. 23 is a view for explaining the reason why different image sets are allowed to include identical images.

In step S106, the plurality of images acquired in step S102 are classified into sets of three images including corresponding points of the same object. In step S108, the corresponding points of the three images in each set are made to correspond to each other in the form of triangular meshes. According to the above sets, identical images are allowed to be classified into different sets. In the case shown in FIG. 23, for example, when an object is sensed at camera viewpoint positions A to G, the following sets are allowed:

nth set: A, B, and C
(n+1)th set: B, C, and D
(n+2)th set: A, B, and D

With such sets, the number of sets like those shown in FIG. 20 can be increased, i.e., the moving range can be expanded.

The processing in step 200 will be described with reference to FIG. 24. In step S202, the current observer (user) viewpoint position $P_e(X_e, Y_e, Z_e)$ and line of sight direction $\alpha_e$ are acquired. In step S204, an optimal set of three images $I_A$, $I_B$, and $I_C$ is determined on the basis of the viewpoint position $P_e(X_e, Y_e, Z_e)$ and line of sight direction $\alpha_e$. In step S204, one of the internal division methods shown in FIGS. 14 to 16 is determined. In step S206, a first internal ratio (s:1–2) and second internal ratio (t:1–1) used for nonlinear interpolation processing are determined.

Figure 26:
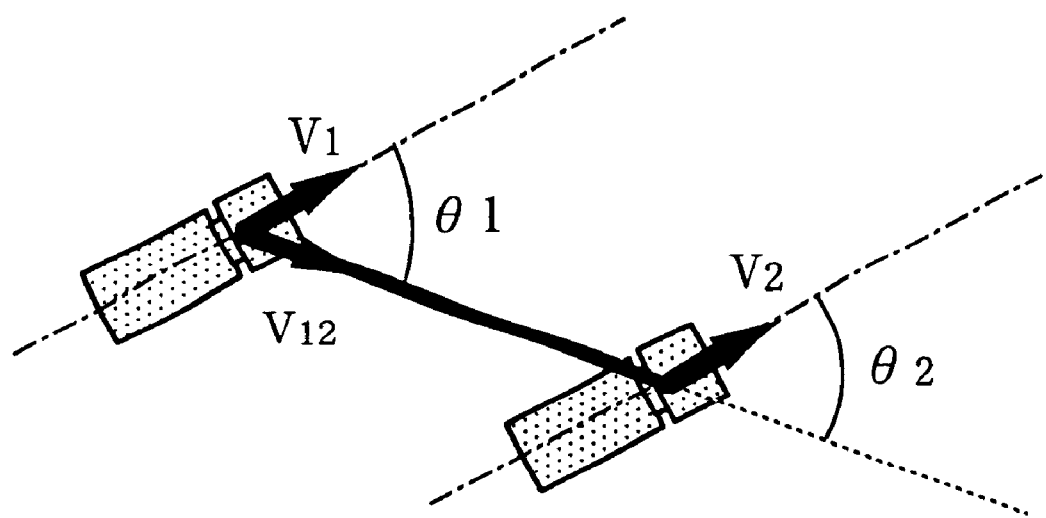
FIG. 26 is a view for explaining an inclusive relationship.

In step S208, it is checked whether the images $I_A$ and $I_B$ have an inclusive relationship. As described above, the inclusive relationship means that the field of view of one image includes the center of the other lens. This inclusive relationship will be described with reference to FIG. 26. Let $V_1$ and $V_2$ be the optical axis vectors of the two cameras, $V_{12}$ be the vector connecting the lens centers of the cameras, $\theta_1$ be the angle defined by the vectors $V_1$ and $V_{12}$, $\theta_2$ be the angle defined by the vectors $V_2$ and $V_{12}$, and $\theta_t$ be the angle ½ a field angle β of the camera. It is checked whether the following relation is satisfied:

$$(|\theta_1| \leq \theta_t \cap |\theta_2| \leq \theta_t) \cup (|\theta_1 - 180°| \leq \theta_t \cap |\theta_2 - 180°| \leq \theta_t) \quad [EQ25]$$

If the images have an inclusive relationship, the flow advances to step S210. In step S210, the images $I_A$ and $I_B$ are rotated to make their axes substantially coincide and become parallel to each other, as shown in FIG. 6. In step S212, a virtual image is generated by nonlinear interpolation, as shown in FIG. 7. In step S214, the virtual image is rotated in accordance with the line of sight direction of the user. In step S216, the generated virtual image is stored in the database, together with the viewpoint position. In this embodiment, a virtual image is handled in the same manner as a real image, and can be used as a basis for another virtual image.

Figure 19:
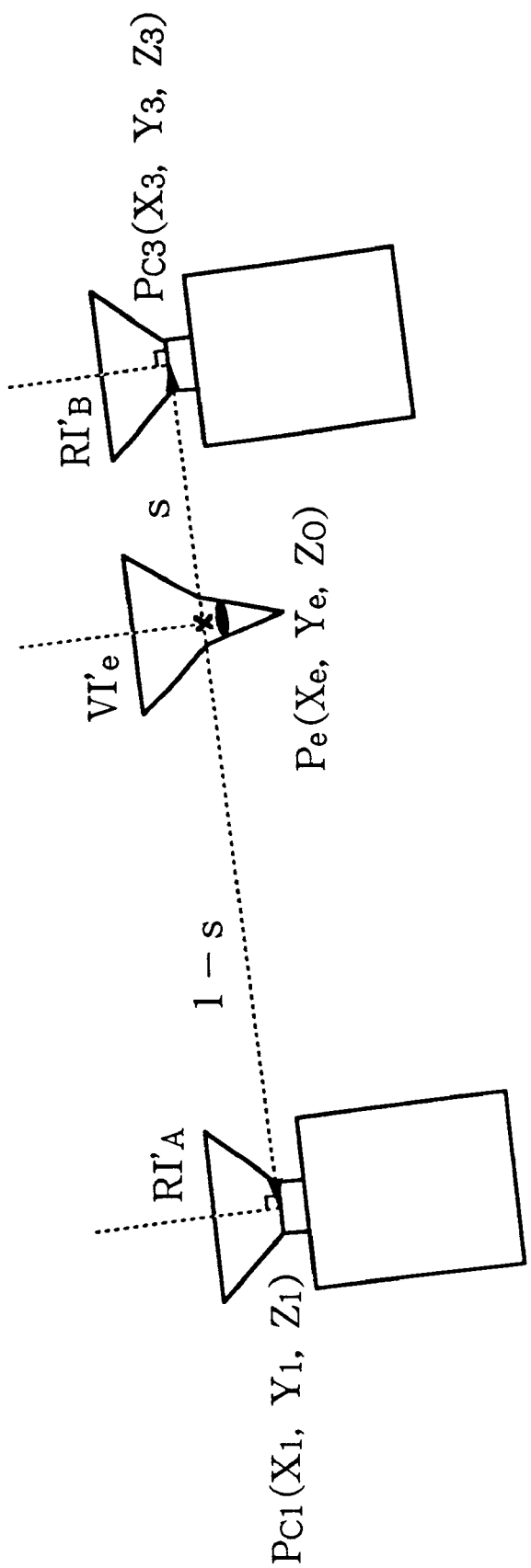
FIG. 19 is a view for explaining the principle of a linear interpolation in the first embodiment.

If the images $I_A$ and $I_B$ do not have an inclusive relationship, linear interpolation is performed in steps S218 to S222, as shown in FIGS. 17 to 19. In step S222, the interpolated image is rotated in accordance with the line of sight direction.

With this operation, a virtual image at the virtual viewpoint position $P_T$ (see FIGS. 14 to 16) is obtained in either of the case characterized in that the two images have an inclusive relationship and the case characterized in that the two images do not have an inclusive relationship.

Figure 24:
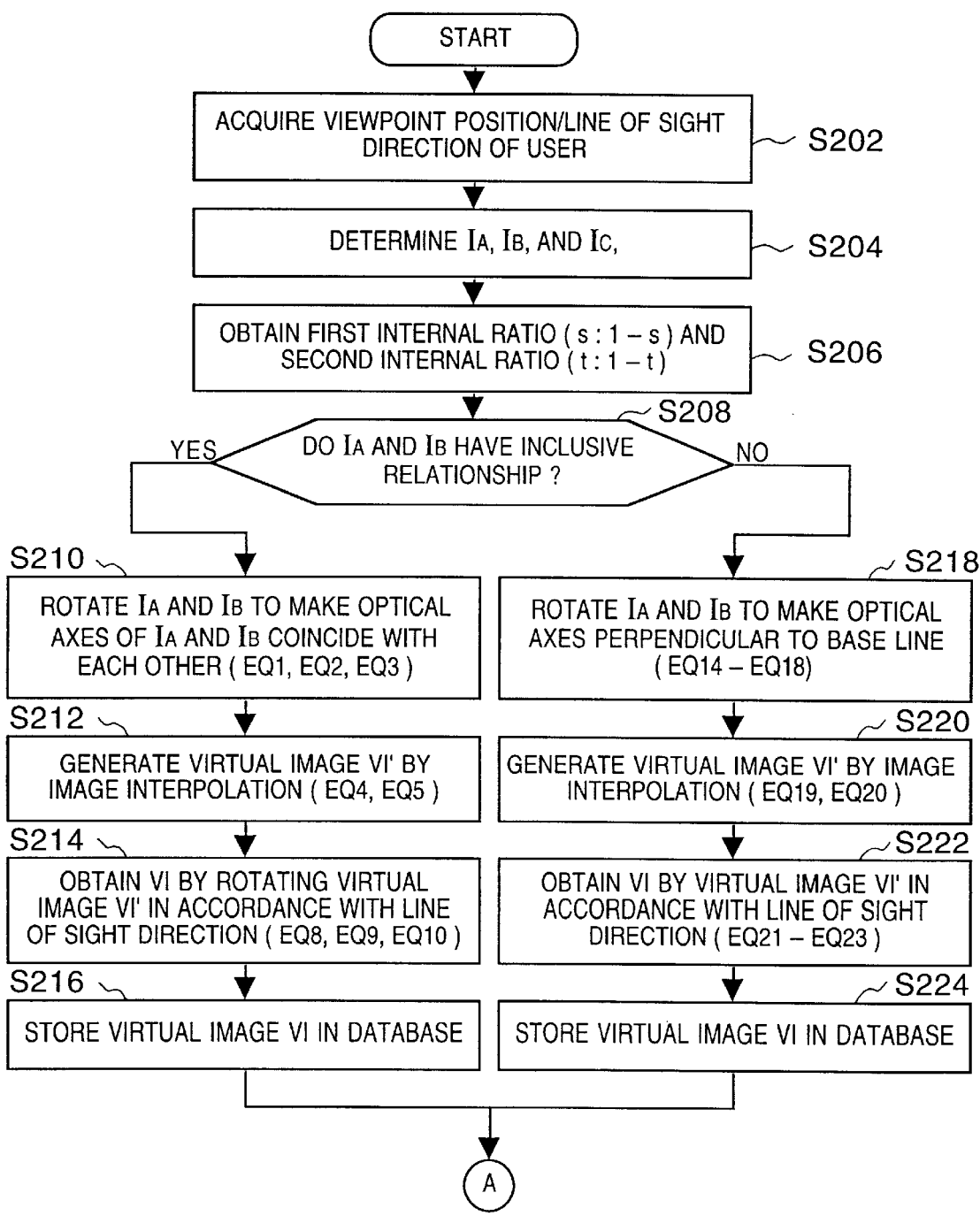
FIG. 24 is a flow chart showing a control procedure for interpolation processing in the first embodiment.
Figure 25:
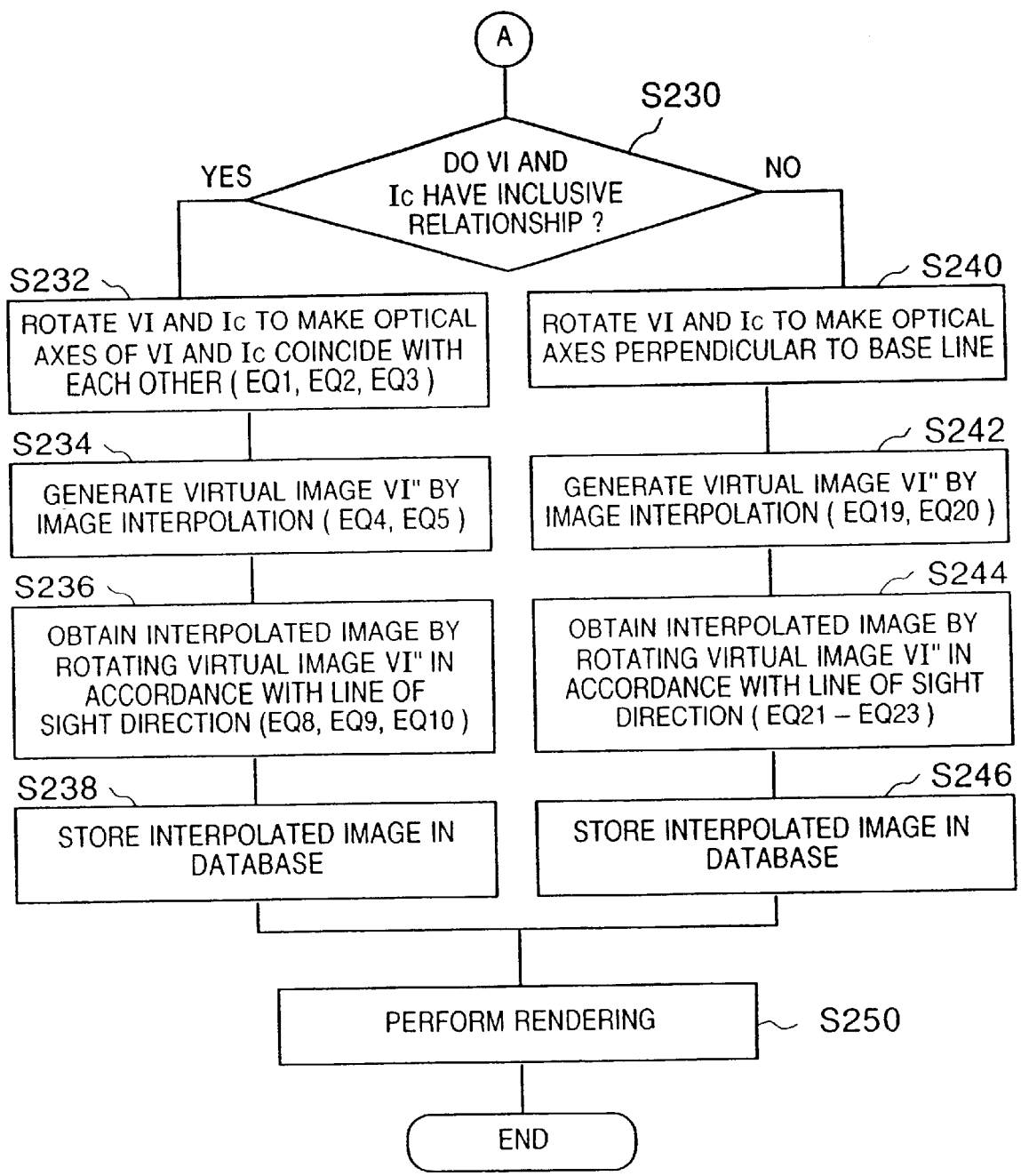
FIG. 25 is a flow chart showing a control procedure for interpolation processing in the first embodiment.

Referring to FIG. 25, it is checked whether there is an inclusive relationship between a virtual image VI obtained by the control procedure in FIG. 24 and a remaining image $I_C$. If the virtual image VI and the remaining image $I_C$ have an inclusive relationship, steps S232 to S236 are performed to perform the above nonlinear interpolation. If the virtual image VI and the remaining image $I_C$ do not have an inclusive relationship, steps S240 to S244 are performed to perform the above linear interpolation. In this manner, nonlinear interpolation or linear interpolation is performed for the virtual image VI and the remaining image $I_C$ in accordance with the inclusive relationship, thus generating a virtual image at the user viewpoint position in the line of sight direction of the user.

Figure 27:
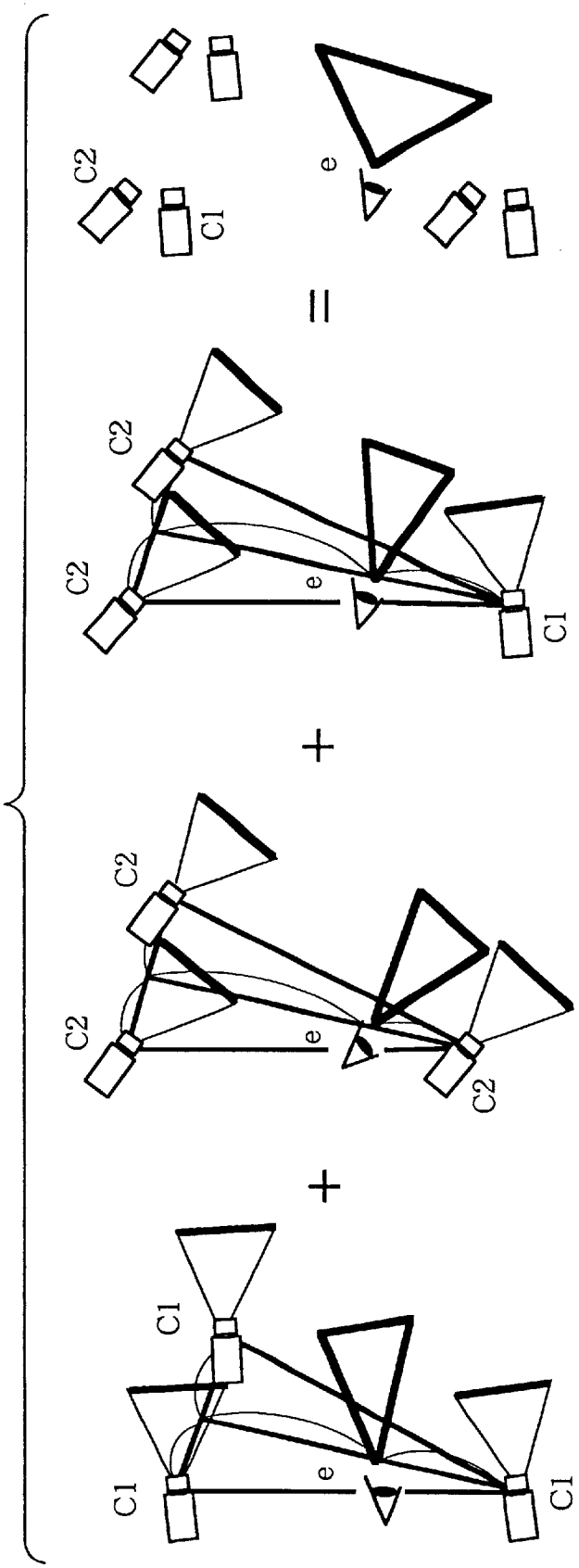
FIG. 27 is a view for explaining the reason why the technique in the first embodiment is further extended.

FIG. 27 explains further expansion of control in this embodiment.

More specifically, according to the control in FIG. 27, virtual images at user viewpoint positions are generated by a plurality of number of times of linear interpolation (or nonlinear interpolation), and the field of view range in which the user can move can be expanded by combining these virtual images.

Figure 28:
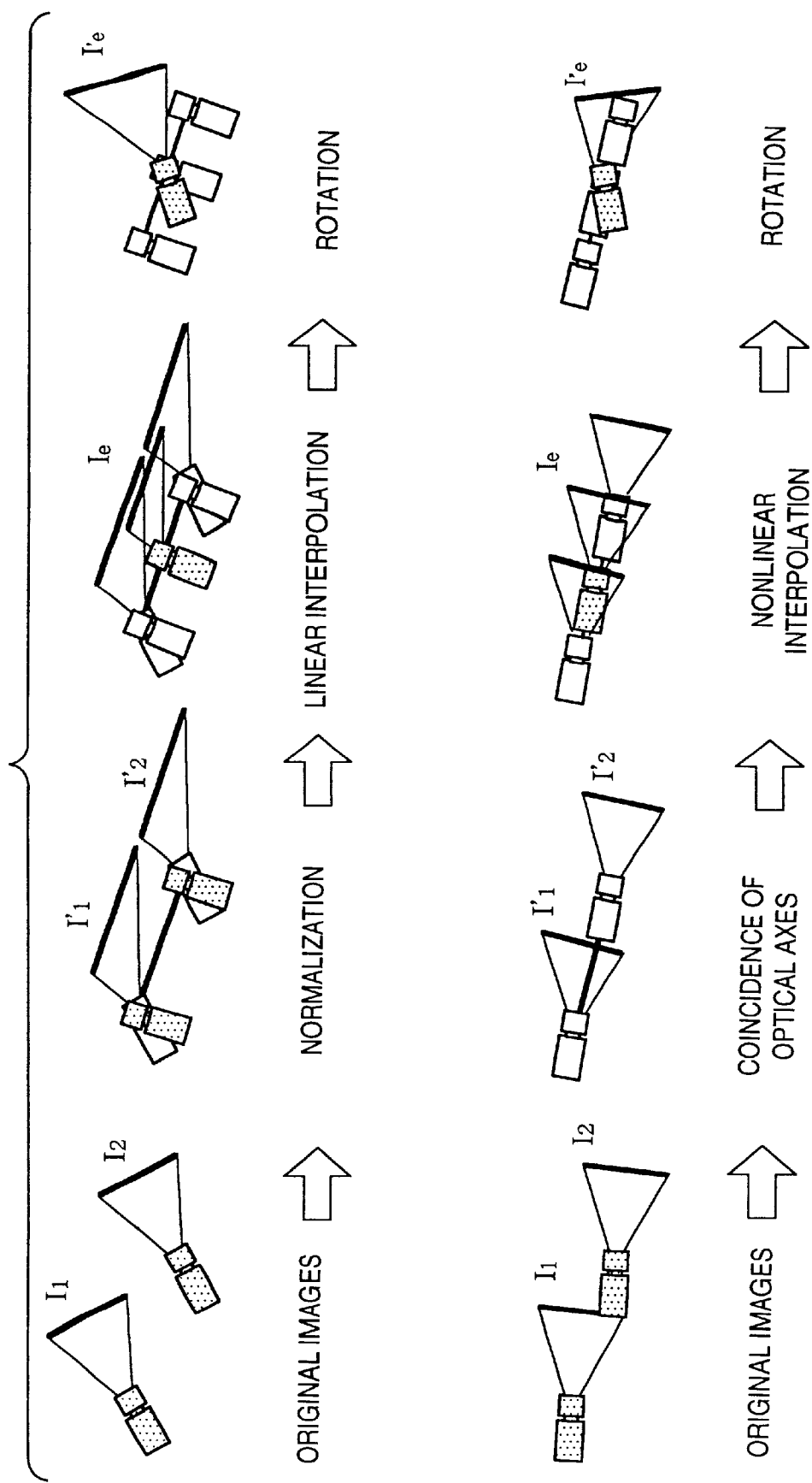
FIG. 28 is a schematic view for explaining the principle of interpolation in the first embodiment.

As described above, according to the mode and embodiment of the present invention, as shown in FIG. 28, the user moving range can be expanded by two types of interpolation, and limitations on the generation of panoramic images can be reduced.

[Second Embodiment]

In morphing (to be referred to as general morphing hereinafter) described in relation to the mode or the first embodiment, a virtual interpolated image which should be obtained by performing image-picking up from an arbitrary viewpoint between the two (or three) viewpoints of two or three real images (or computer images) is generated by morphing processing. In the above mode and the first embodiment, when an object (either a real image of a real object or a virtual image of a virtual object) has few uneven portions (uneven portions in the depth direction, in particular), since it can be expected that the portion which cannot be seen from the viewpoint position is small even if the viewpoint position changes, this morphing technique is considered to be effective.

However, some actual objects (hence virtual objects as well) have large uneven portions. If the above general morphing processing is performed while such an object is moved to the viewpoint position, an interpolated image is generated such that a portion which should not be seen from a given viewpoint position can be seen, or a portion which should be seen cannot be seen.

In the second embodiment, "hierarchical morphing" processing to be described later is used. More specifically, when an object included in an image has few uneven portions (or uneven portions can be neglected), the above "general morphing processing" is performed, whereas when an object included in an image has large uneven portions (or uneven portions cannot be neglected), "hierarchical morphing processing" is executed. That is, "general morphing processing" and "hierarchical morphing processing" are adaptively switched.

Figure 29:
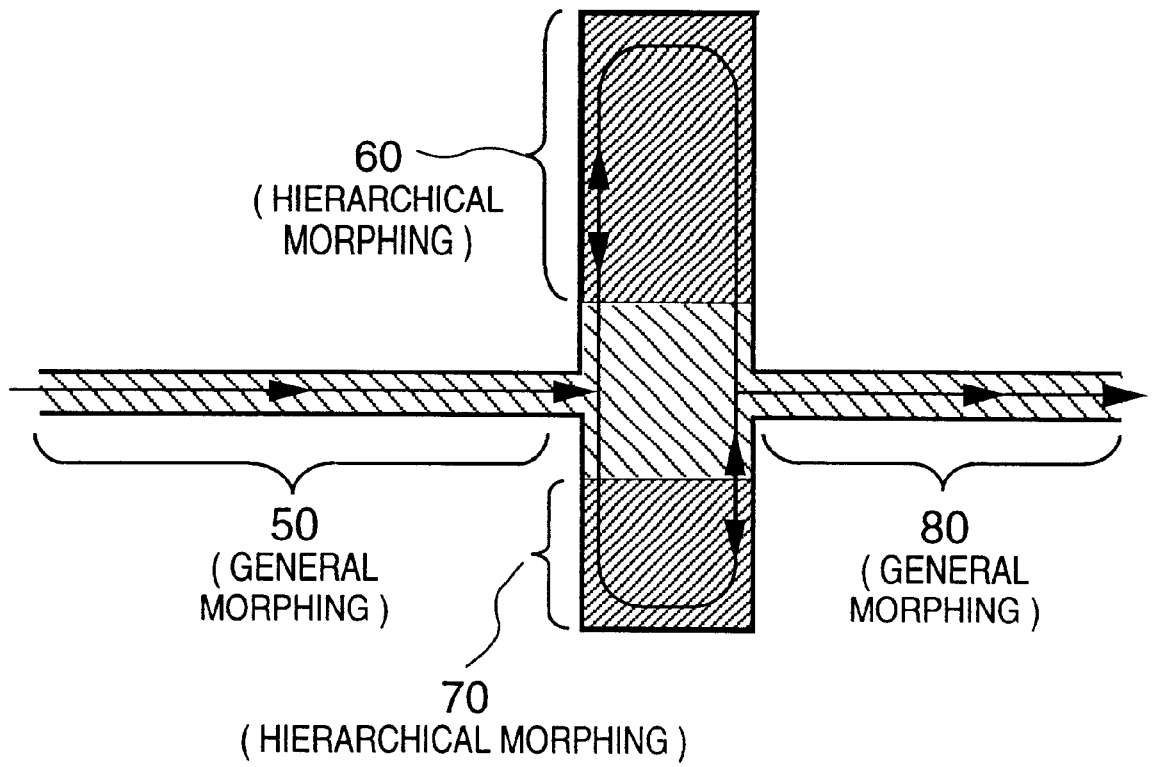
FIG. 29 is a view for explaining how morphing modes are switched in accordance with different viewpoint positions in the second embodiment in which the present invention is applied to walkthrough operation in a virtual space.

FIG. 29 explains a walkthrough virtual space considered to be particularly suitable for the image processing apparatus of the second embodiment. Referring to FIG. 29, the hatched portions indicate a route through which the user can virtually walk. Two roughly hatched paths 50 and 80 are narrow, and finely hatched areas 60 and 70 have two-dimensional spreads. While the user walks through the narrow path 50 or 80, the width that he/she can move laterally (vertically on the drawing) in the traveling direction is small. In contrast to this, in the areas 60 and 80, the user can widely move laterally (vertically on the drawing). For this reason, while the user walks through the areas 50 and 80, even if his/her line of sight is directed in a direction perpendicular to the traveling direction (i.e., the vertical direction on the drawing), since he/she does not approach backgrounds (distant background) on the right and left sides, uneven portions in the depth direction in a background image (panoramic image) pose no problem. In these areas 50 and 80, therefore, general morphing processing may be performed. However, while walking through the areas 60 and 70, the user may approach the backgrounds, uneven portions in a background image (including an object in a panoramic image) pose a problem. To the areas 60 and 70, therefore, "hierarchical morphing processing" is applied.

Figure 30:
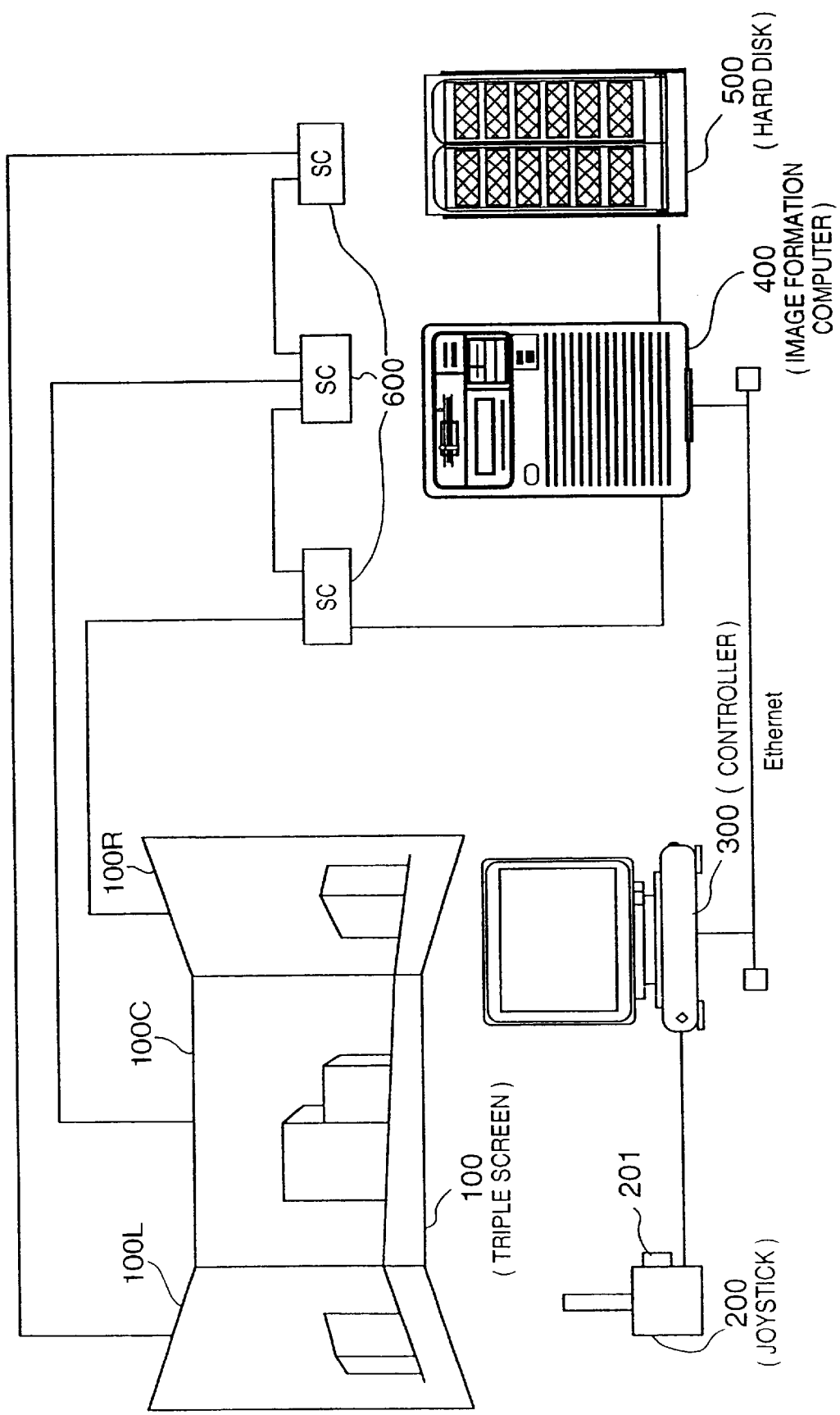
FIG. 30 is a view for explaining the arrangement of a walkthrough system according to the second embodiment.

FIG. 30 shows the arrangement of a virtual space walkthrough system according to the second embodiment, to which adaptive switching control using the above general morphing and hierarchical morphing is applied.

Referring to FIG. 30, reference numeral 100 denotes a triple screen having left and right screens 100L and 100R arranged on the left and right sides of a center screen 100C. Three images to be displayed on these screens are formed by an image formation computer 400. The computer 400 sequentially sends three images to three scan converters (SCs) 600 in the serial form. Real images to which the image formation computer 400 refers are stored in a hard disk 500. A joystick 200 is connected to a controller 300. The controller 300 processes data in the walkthrough direction (the direction in which the user wants to walk through), which is input by the user upon operating the joystick 200. More specifically, the controller 300 sends data about the state of the joystick 200 at given time t to the image formation computer 400 through Ethernet. The image formation computer 400 calculates data about the viewpoint position and line of sight direction of the user at time t on the basis of this data. The computer 400 then extracts three or two panoramic images corresponding to the viewpoint and line of sight direction from the hard disk 500, performs predetermined processing for them, and sends the resultant data to the scan converters 600.

Figure 31:
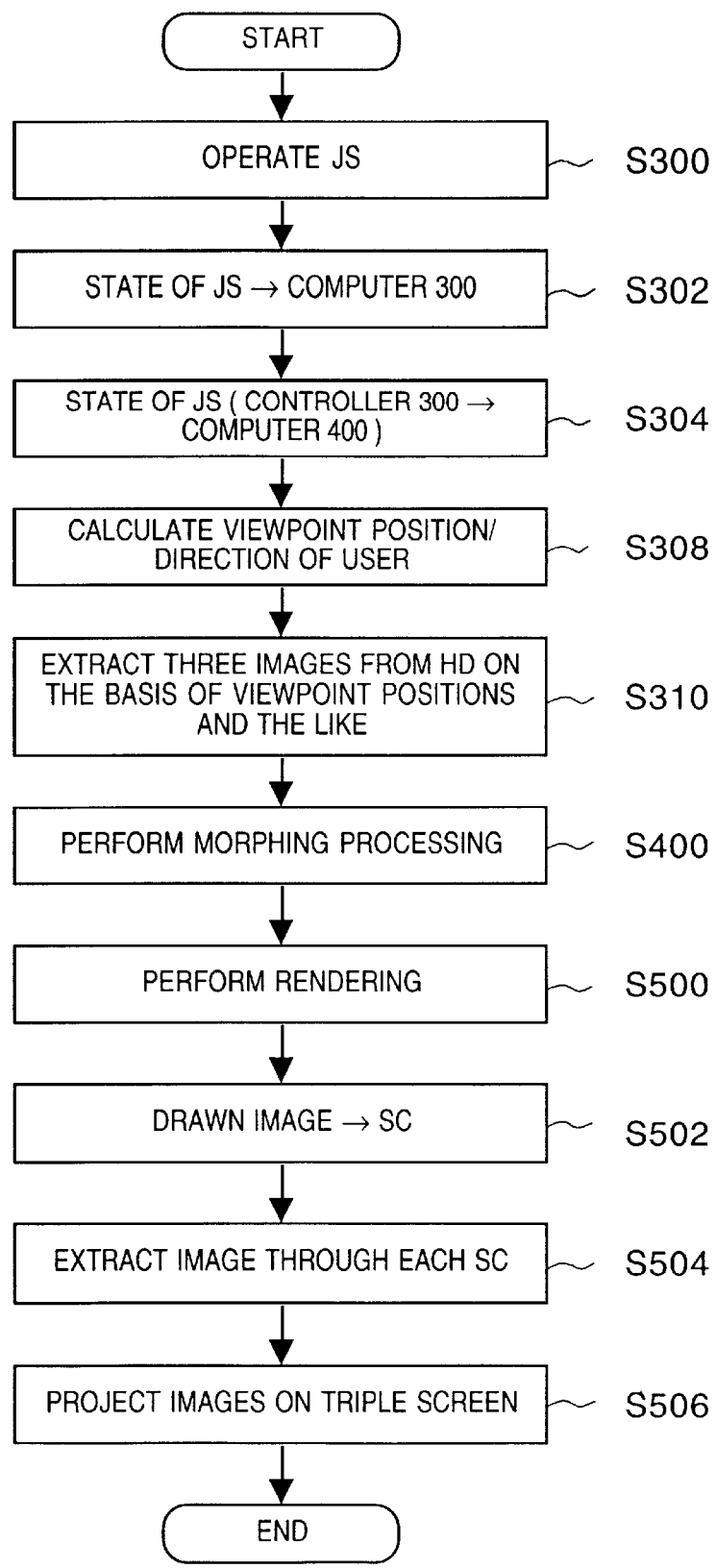
FIG. 31 is a flow chart for explaining a prerequisite procedure for a walkthrough application program in the second embodiment.

FIG. 31 is a flow chart showing an overall control procedure for walkthrough operation using the controller 300 and image formation computer 400. Note that step S400 in FIG. 31, i.e., the morphing switching step, will be described in detail with reference to FIG. 32.

In step S300, the user is prompted to operate the joystick (to be abbreviated as JS hereinafter) 200. In steps S302 and S304, the information about the operation state of the JS is sent to the image formation computer 400 through the controller 300. In step S308, the computer 400 calculates the current viewpoint position and line of sight direction set after the operation of the JS. In step S310, the computer 400 extracts optimal three or two images to the position and posture on the basis of the current viewpoint position and line of sight direction. In step S400, the computer 400 selects optimal morphing processing (general morphing processing or hierarchical morphing processing), switches to the selected processing, and executes the selected morphing processing. In step S500, the images obtained as a result of the morphing processing are bitmapped in the frame memory. In steps S502, S504, and S506, the bitmapped images are displayed on the screen.

Figure 32:
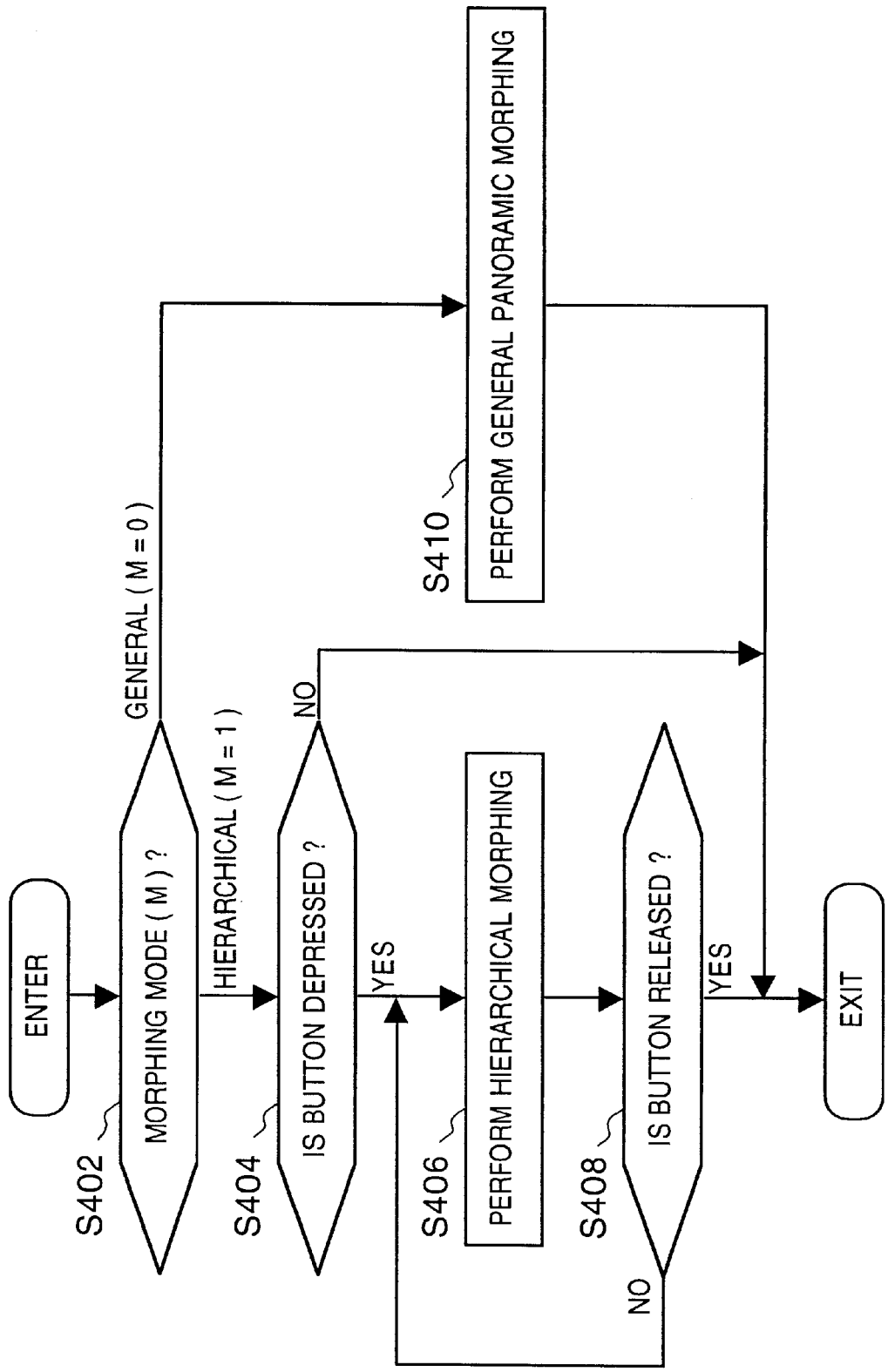
FIG. 32 is a flow chart for explaining the details of step S400 in FIG. 31.

FIG. 32 shows the detailed procedure for step S400 in FIG. 31. In step S402, the morphing mode assigned to the current position in walkthrough operation is checked. This mode can be identified by 1-bit data for discriminating between "general morphing processing" and "hierarchical morphing processing". Assume that a 1-bit flag M is assigned to every position (x, y) in FIG. 29 which allows walkthrough operation. More specifically, M=0 is assigned to arbitrary coordinates in the roughly hatched areas (i.e., the areas in which general morphing should be performed), whereas M=1 is assigned to arbitrary coordinates in the finely hatched areas (i.e., the areas in which hierarchical morphing should be performed).

If the current walkthrough location is in a roughly hatched area (i.e., the area 50 or 80 to which M=0 is assigned), the flow advances to step S410 to perform "general morphing processing". The "general morphing processing" is the processing shown in FIGS. 24 and 25 or known panoramic image switching processing. A detailed description of "general morphing processing" will therefore be omitted.

If the current walkthrough location is in a finely hatched area (i.e., the area 60 or 70 to which M=1 is assigned), the flow advances to step S404 to check whether a button 201 (FIG. 30) of the joystick 200 is depressed. If NO in step S404, the flow exits to the main routine. That is, even if the current viewpoint position is in the area 60 or 70, hierarchical morphing processing is not performed unless the joystick 200 is operated while the button 201 is simultaneously depressed. If the button 201 is depressed, hierarchical morphing processing (to be described later) is performed in step S406. The hierarchical morphing processing in step S406 is enabled unless the button 201 is released.

The hierarchical morphing processing in step S406 will be further described below.

This hierarchical morphing processing demands hierarchical processing for background images (panoramic images) as pre-processing. In this pre-processing, images of a plurality of objects (real objects) in real images are segmented into a plurality of areas in accordance with depths. In actual hierarchical morphing processing, an area that falls within a certain depth range is regarded as one layer, and general morphing is performed with respect to each layer. More specifically, background images (panoramic images) prepared for a case characterized in that the viewpoint position is located in the area 60 or 70 are "hierarchically processed" in advance.

"Hierarchical processing" as pre-processing will be described below.

Figure 34:
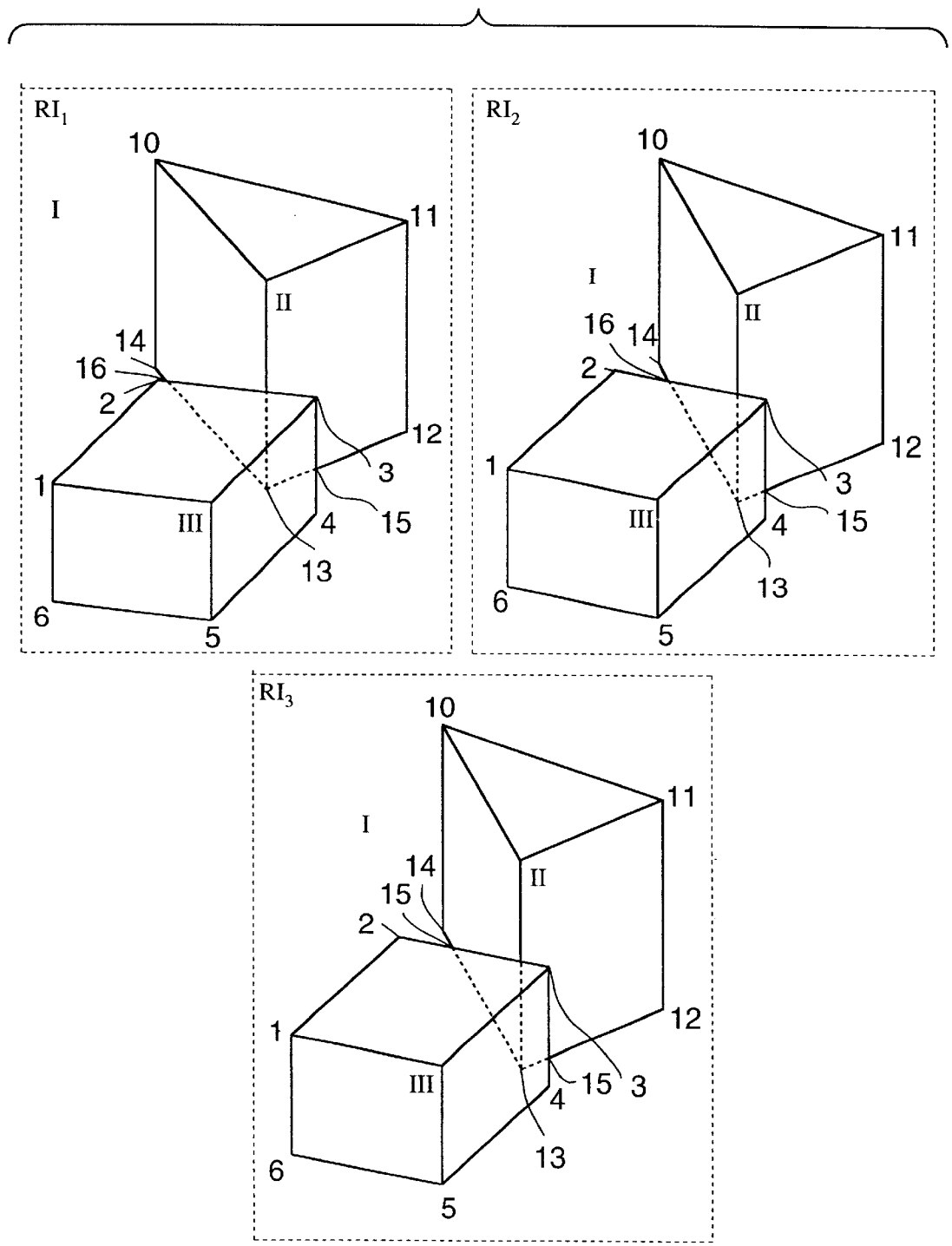
FIG. 34 is a view showing a picture on the CRT screen of a controller 300 when three original images obtained by sensing objects in FIG. 33 are displayed on the screen.

For convenience in describing "hierarchical processing", assume that the three images shown in FIG. 34 are obtained by sensing a real space constituted by a quadrangular prism 1000 and triangular prism 2000 at viewpoint positions E1, E2, and E3, as shown in FIG. 33. FIG. 34 shows the three real images ($RI_1$, $RI_2$, $RI_3$) obtained by performing image sensing at the respective viewpoint positions. Referring to FIG. 34, the Arabic numerals indicate corresponding feature points among the three images.

When hierarchical processing as pre-processing is executed, the controller 300 displays the three real images ($RI_1$, $RI_2$, $RI_3$) on the monitor screen of the controller 300, as shown in FIG. 34.

FIG. 35 explains the principle of hierarchical processing. The user designates a specific layer to which a specific image portion belongs while watching the display screen of the monitor in FIG. 34. The user can estimate the depth relationship between the objects displayed on the screen. If, for example, the real image $RI_1$ in FIG. 34 is displayed on the monitor unit of the controller 300, the user can estimate from the displayed contents that the triangular prism 2000 is located behind the quadrangular prism 1000, and a background is present behind the triangular prism 2000 and quadrangular prism 1000. First of all, the user assigns layer I to the background. The user then assigns layer II to the image portion defined by five vertexes (10, 11, 12, 13, 14) on the outermost sides of the triangular prism 2000 in the image $RI_1$ in FIG. 34. The user also assigns layer III to the image portion defined by six vertexes (1, 2, 3, 4, 5, 6) on the outermost sides of the quadrangular prism 1000. In the case shown in FIG. 35 (i.e., FIG. 31), the background is located on the rearmost side, the triangular prism 2000 is located at an intermediate position, and the quadrangular prism 1000 is located on the front side, and hence the above image segmentation results in the layer segmentation shown in FIG. 35. When a real image undergoes this hierarchical processing, the image is hierarchically segmented into image portions on layer 1 to layer III. In hierarchical morphing in the second embodiment, two-dimensional images on the same layer are regarded as images in the same depth range, and interpolation morphing is performed for them. The hierarchical morphing in the second embodiment uses the technique of making plurality of image portions that are similar in depth belong to the same layer. With this technique, even if the viewpoint position moves, the degrees of occlusion of the image portions belonging to the same layer can be made uniform. That is, as in the first embodiment, in the second embodiment, interpolated images are generated in accordance with the movement of the viewpoint position. In the second embodiment, however, portions that are occluded in a real image but need to be seen at virtual viewpoint positions can be reliably visualized to the user while portions in different depths appear and disappear in accordance with the movement of the viewpoint position. By allowing the user to see portions (ranges) occluded in a real image, halftone data or color data of the pixels of the occluded portions can be added by retouch operation (to be described later).

Figure 36:
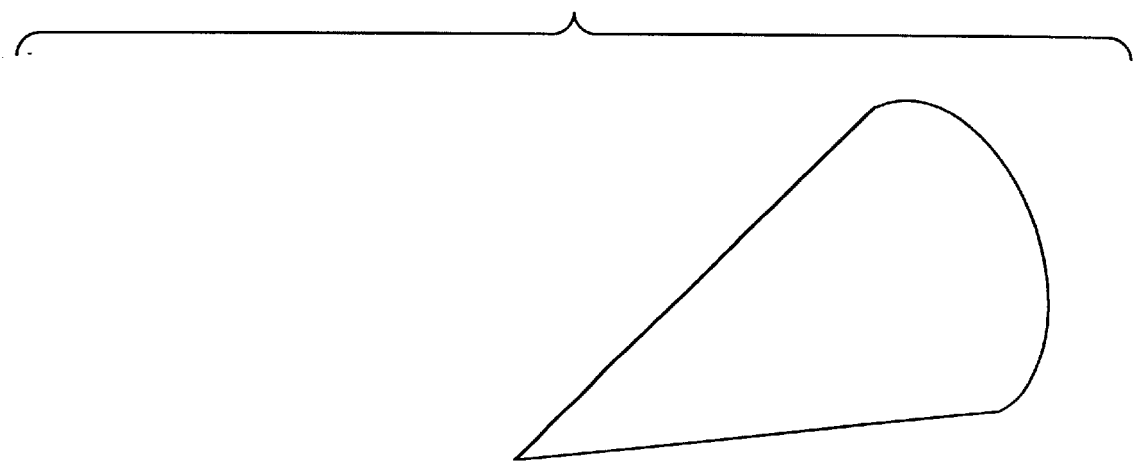
FIG. 36 is a view for explaining the relationship between an object pointed in the line of sight direction and the viewpoint position.
Figure 37:
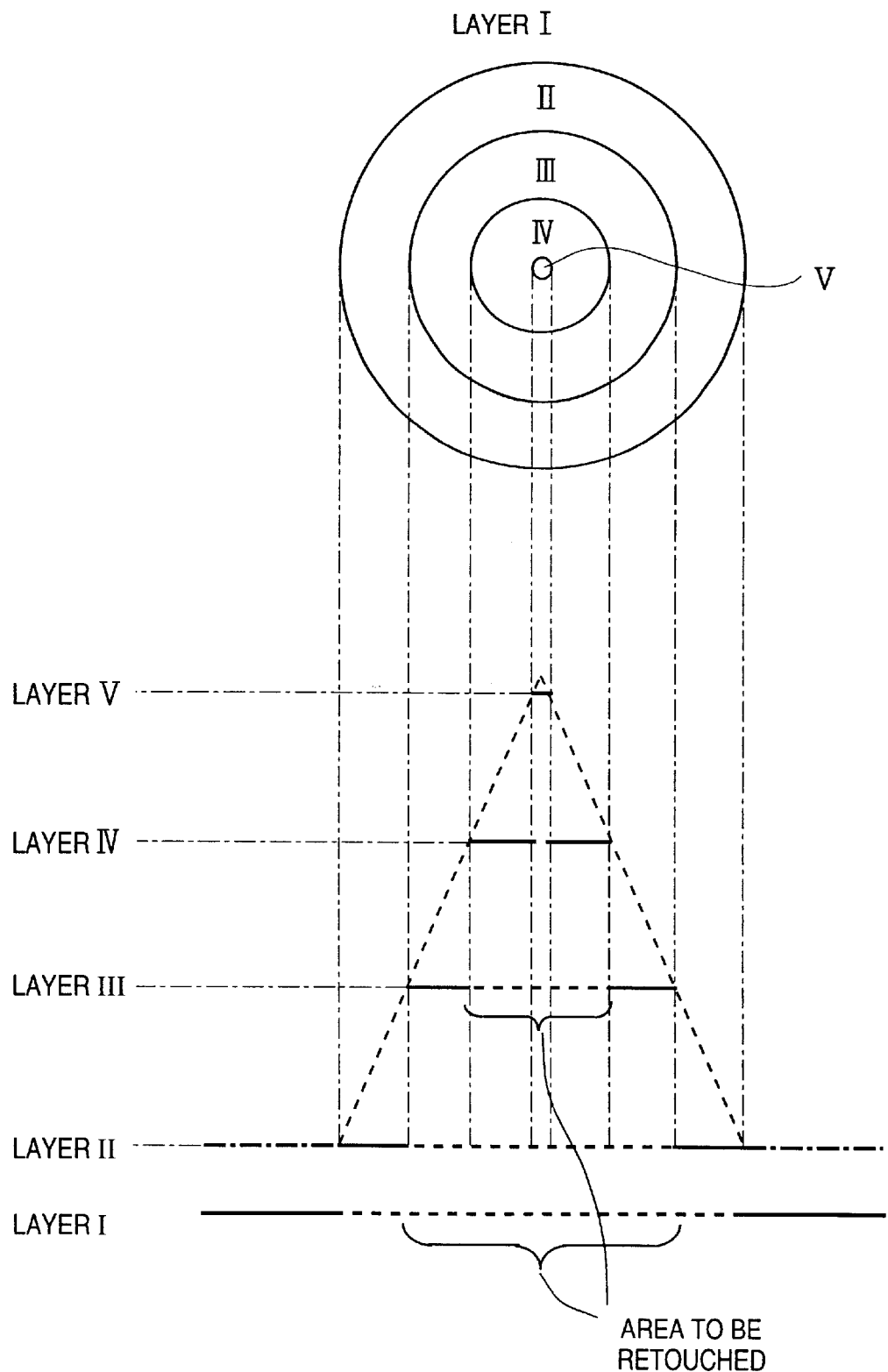
FIG. 37 is a view for explaining how partial images are generated by segmenting the object in FIG. 36 according to hierarchical segmentation in the second embodiment.

When the hierarchical morphing in the second embodiment is to be applied to an object that greatly undulates in the depth direction (e.g., a cone whose vertex is directed to the user, as shown in FIG. 36), many layers are set, as shown in FIG. 37. In the case shown in FIG. 37, the object is segmented into four concentric, annular layers, i.e., layer I as a background layer, layer II, layer III, and layer V.

Figure 38:
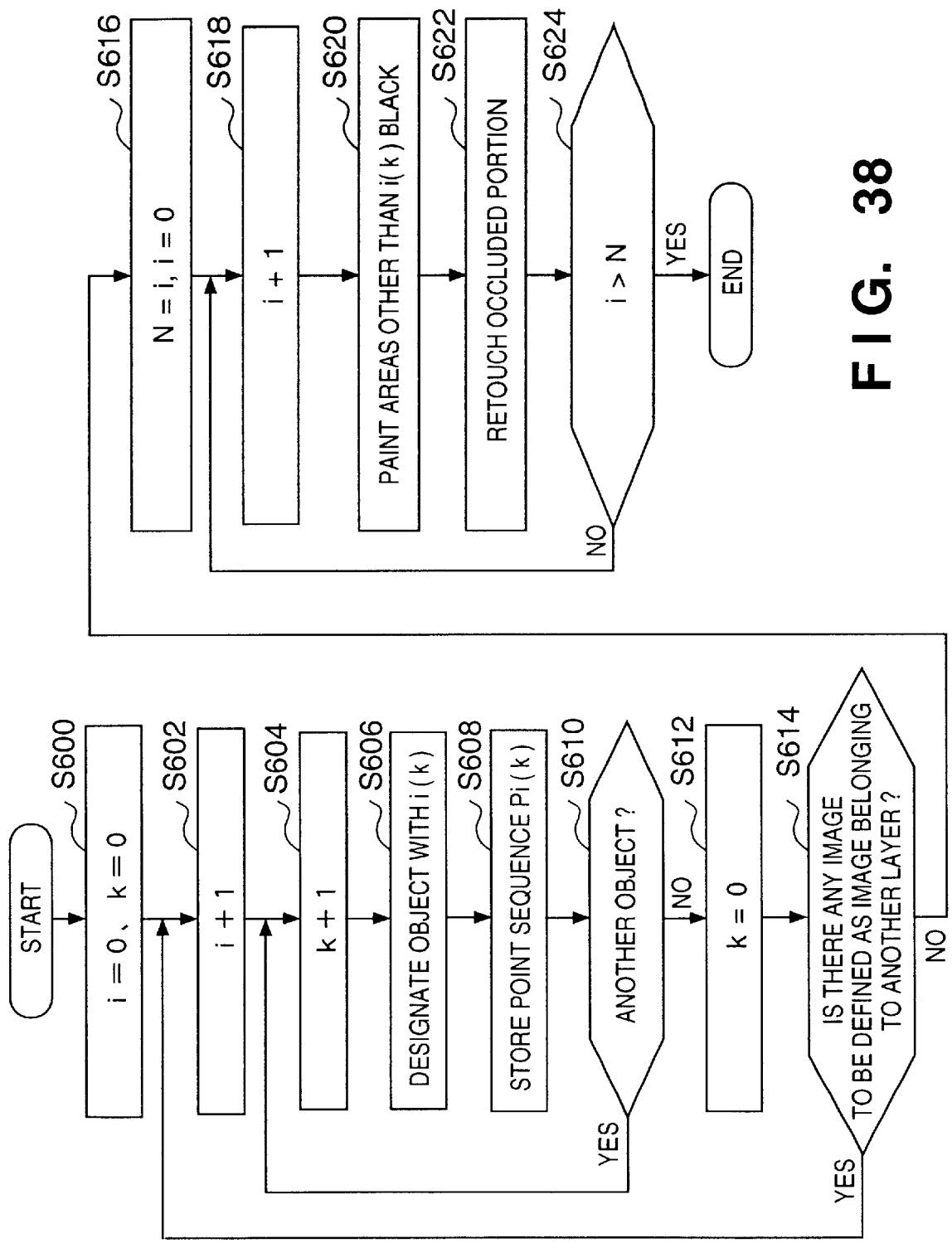
FIG. 38 is a flow chart for explaining a control procedure for pre-processing (hierarchical processing) for the generation of images suited to morphing in the second embodiment.

FIG. 38 shows a control procedure for hierarchical processing in detail. The hierarchical processing will be described with reference to FIGS. 39 to 41. FIG. 42 shows a hierarchical structure image obtained as a result of hierarchical processing.

A case characterized in that hierarchical processing is performed for the image $RI_1$ in FIG. 34 will be described in detail with reference to FIGS. 39 to 42.

In the second embodiment, layers were designated by designating feature points (vertexes of contour lines, in general) of two-dimensional images. In addition, "retouch processing" and blackening processing in the second embodiment were performed by using PhotoShop (available from Adobe in USA), which is commercially available general-purpose image authoring tool software.

Hierarchical processing in the second embodiment ends in assigning a layer value i to a point sequence $P_i(k)$ of feature points of the contour lines of a partial image. In this case, reference symbol i denotes a value representing a layer (a smaller value indicates that the partial image is at a deeper position in the depth direction); and k, a partial image belonging to the same layer i.

When the user performs hierarchical processing for the image $RI_1$ in FIG. 34, the following data are sequentially obtained in the order of the layers located farther from the viewpoint position:

layer I (i=II):
  entire background image
layer II (i=II):
  point sequence $P_I(1)=10\rightarrow11\rightarrow12\rightarrow13\rightarrow14$
layer III (i=III):
  point sequence $P_{II}(1)=1\rightarrow2\rightarrow3\rightarrow4\rightarrow5\rightarrow6$ Note that although the vertex 13 of the triangular prism 2000 cannot be seen by the user, since he/she knows that the vertex 13 of the triangular prism 2000 is occluded by the quadrangular prism 1000, he/she assigns the virtual vertex 13.

The closed area indicated by the point sequence $P_i(k)$ represents an object, and all the pixel values in the closed area can be referred to by referring to the object.

If the quadrangular prism 1000 and triangular prism 2000 are located in almost the same depth range when viewed from the viewpoint position, the user will assign the same layer value to the quadrangular prism 1000 and triangular prism 2000. In this case, layer II (i=II):
  point sequence $P_{II}(1)=10\rightarrow11\rightarrow12\rightarrow13\rightarrow14$
  point sequence $P_{II}(1)=1\rightarrow2\rightarrow3\rightarrow4\rightarrow5\rightarrow6$ By this formation of objects, a table of point sequences $P_i(k)$ as objects in units of three images and layers, like the one shown in FIG. 42, is generated in a predetermined area in the hard disk 500. The image formation computer 400 refers to this table to perform hierarchical morphing.

FIG. 38 is a flow chart for explaining a control procedure for hierarchical processing. The loop of steps S600 to S614 in FIG. 38 explains the process of generating the object table shown in FIG. 42. More specifically, in steps S604 to S610, the user designates objects (partial images) (argument k) that seem to belong to the layer indicated by a given layer value i as the point sequences $P_i(k)$ by using the mouse of the controller 300 or the like in step S606. In step S608, the resultant data is stored in the memory.

When all the objects belonging to the given layer (value i) are completely designated (NO in step S610), a counter k is initialized in step S612. In step S614, the user is prompted to check whether any partial image to be processed as an image belonging to another layer is present in the target image (the image in FIG. 34). If the user determines that there is a partial image to be processed, the process from step S602 to step S614 is repeated.

When all the partial images are processed, the accumulated layer value is stored in a counter i. In step S616, this value is stored in a register N.

The process from step S618 to step S624 is performed to store the pixel values of the valid portions of the partial images on the respective layers, set the pixel values of the invalid portions to FF (i.e., black), and perform retouch processing for "occluded portions".

Figure 39:
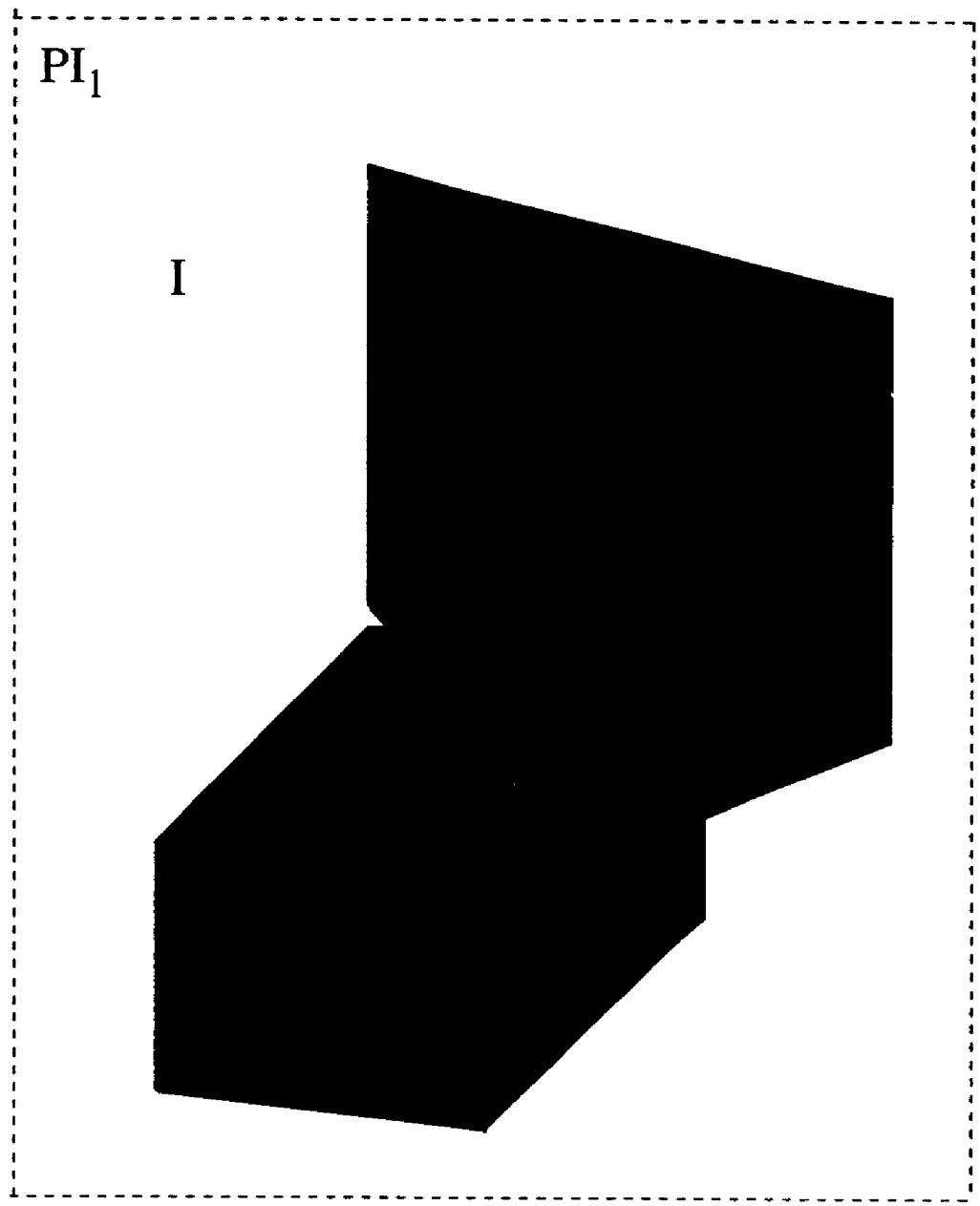
FIG. 39 is a view for explaining the operation in steps S616 to S624 in the pre-processing in the second embodiment by using a concrete example (layer I)
Figure 40:
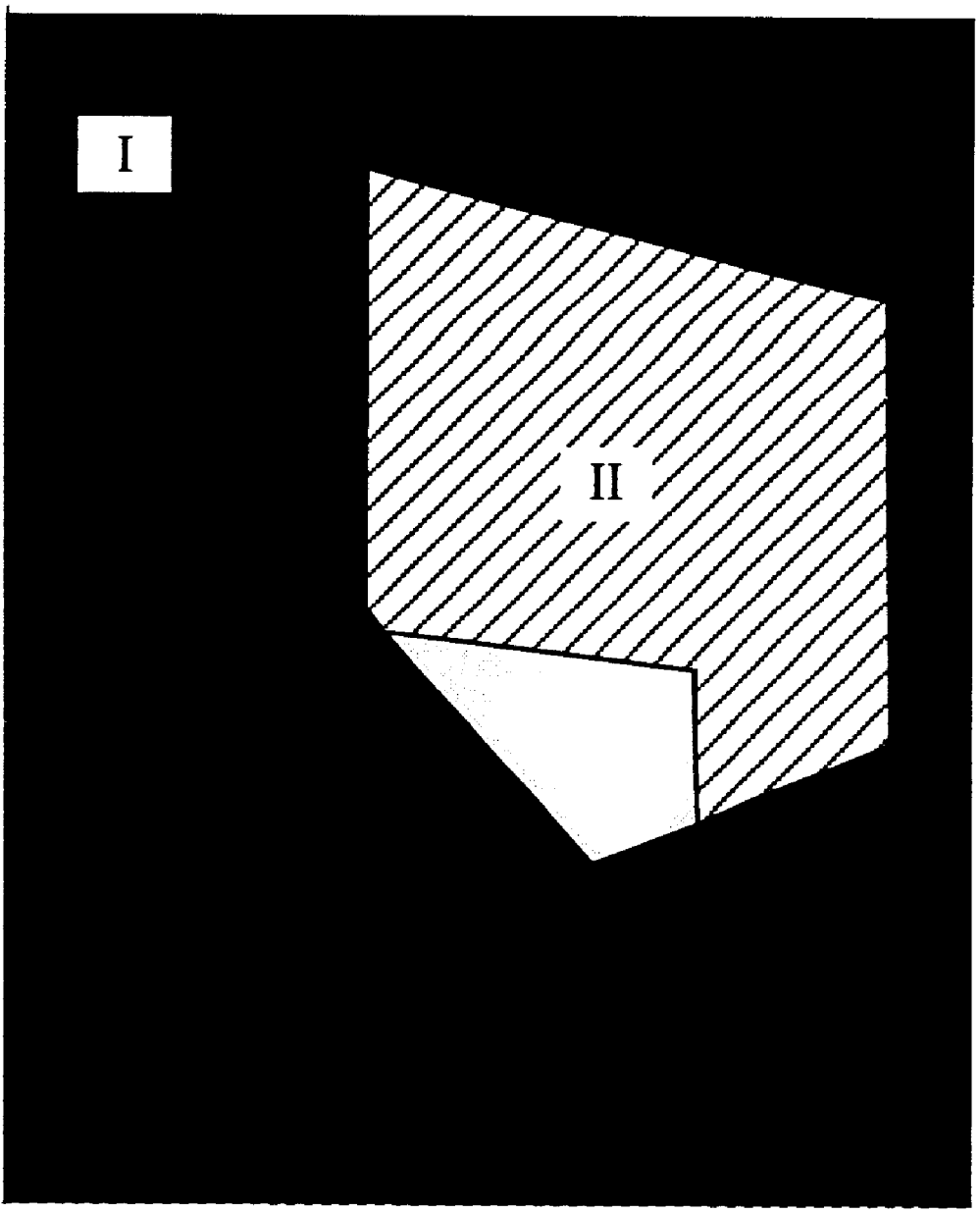
FIG. 40 is a view for explaining the operation in steps S616 to S624 in the pre-processing in the second embodiment by using a concrete example (layer II)
Figure 41:
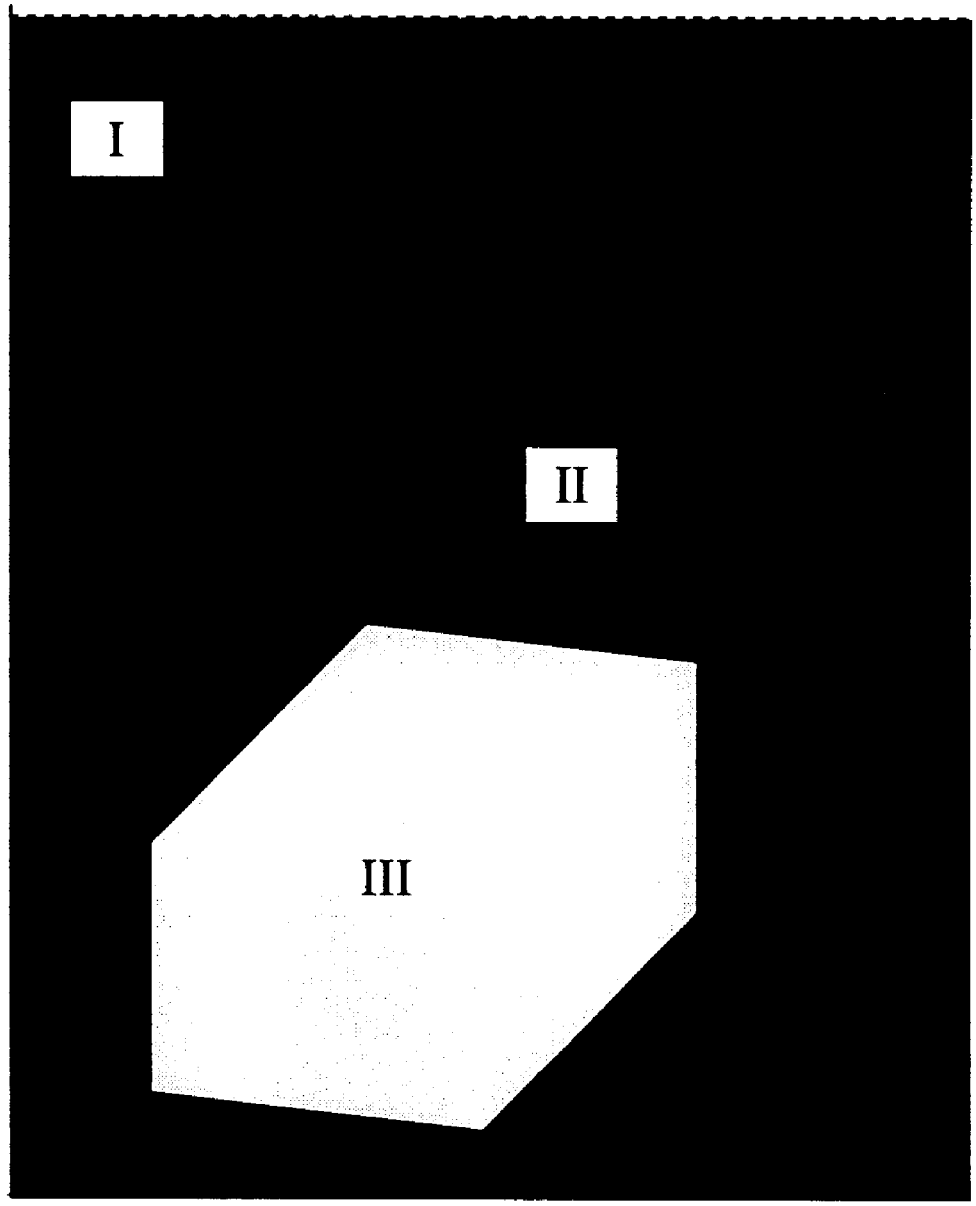
FIG. 41 is a view for explaining the operation in steps S616 to S624 in the pre-processing in the second embodiment by using a concrete example (layer III)

FIGS. 39 to 41 explain the processing in steps S618 to S624 in detail. FIG. 44 shows a pull-down menu for an application program for hierarchical processing. FIG. 45 shows a layer number and object number indicating a currently processed object during the execution of the hierarchical processing application program.

The operation for layer segmentation performed by the user will be described with reference to FIG. 44.

As described above, the lowermost layer (layer I) is assigned to the entire original image. When "Create" on the file menu is selected, a dialog for selection of an original image to be segmented is displayed on the CRT of the controller 300. The user inputs the file name of the original image. The corresponding image is then displayed on the CRT. The user designates the boundary (closed curve) between layer I and layer II with the mouse. In the case shown in FIG. 34, the boundary is designated by a point sequence of 1, 2, 16, 14, 10, 11, 12, 15, 4, 5, and 6. Obviously, the boundary can be designated by a rectangular area designation icon, i.e., a so-called "lasso" icon, or a free curve drawn with the mouse as well as a point sequence. In this state, when the user clicks "set layer" on the edit menu, layer I is assigned to the area outside the boundary defined by the point sequence $P_I(1)=1, 2, 16, 14, 10, 11, 12, 15, 4, 5,$ and 6 inside the original image. At this time, LL=01 and OB=01 are respectively displayed as the current layer number and object number on the CRT screen, as shown in FIG. 45.

Assume that the user is to set layer II formed by the triangular prism 2000. In this case, as described above, when the user selects a point sequence $P_{II}(1)=10\rightarrow11\rightarrow12\rightarrow13\rightarrow14$ with the mouse or the like and selects the "set layer" menu, the inside of the triangular prism 2000 is formed as layer I. At this time, LL=02 and OB=01 are respectively displayed, as the current layer number and object number, on the CRT screen.

If there is another object belonging to the same layer (YES in step S610), the user selects a boundary on the object with the mouse or the like (step S608), and selects the submenu "set object" submenu on the "edit menu". As a consequence, the corresponding portion is formed as another object. At this time, OB=02 is displayed as the current object number on the CRT screen.

Layer setting and object setting can be implemented by using various functions presented on the edit menu in the above manner. As a result, the image $RI_1$ in FIG. 34 is segmented into three layers, i.e., layer I to layer III.

A layer or object which has been set can be deleted by clicking the inside of the object on the layer with the mouse and selecting the submenu "cancel layer" or "cancel objet" on the edit menu. When the layer or object is deleted with this menu, all the layer numbers and object numbers are sequentially decremented.

The processing in steps S616 to S624 in the control procedure in FIG. 38 is executed after all layers and objects are set (NO in step S614). In this processing, objects on the remaining layers are painted black.

In step S616, the value of the counter i is saved in the register N in which the total number of layers is stored. In addition, the counter i is initialized to 0. In step S618, the counter i is incremented by one to select the lowermost layer (background layer).

In step S620, the pixels of the objects on all the layers other than layer i are pasted black. Take the image $RI_1$ in FIG. 34 as an example. With regard to layer I, the inside of the portion defined by the point sequence $P_I(1)$=1, 2, 16, 14, 10, 11, 12, 15, 4, 5, and 6 is painted black, as shown in FIG. 39.

In step S622, the user is prompted to retouch an occluded portion. The "occluded portion" indicates a portion occluded by an object on a layer other than layer i. The user can recognize such an occluded portion by seeing the CRT screen. The user can "retouch" the "occluded portion". "Retouch processing" is performed to provide, for example, color, pattern, and texture data to prevent an image having undergone morphing from producing any unattractive portion, thereby preparing for a case characterized in that an "occluded portion" is visualized by morphing.

To make the user select an occluded portion, the message "select texture of retouch source" is displayed on the CRT. In the case shown in FIG. 39, the user thought that "retouch processing" was unnecessary, and hence did not set an "occluded portion".

The flow returns from step S624 to step S618 to select an object on the next layer (layer II in the case shown in FIG. 34). When the processing in step S620 is performed for layer II, the areas of layers I and III are painted black, and a picture like the one shown in FIG. 40 is displayed on the CRT.

In step S622, the message "select texture of retouch source" is displayed on the CRT. At this time, the user knows that part of the triangular prism 2000 on layer II is occluded by part of the quadrangular prism 1000 on layer III. The area of this occluded portion is given by point sequence: 16, 3, 15, 13

The pixel value of this portion corresponds to the pixel value of the corresponding area of the quadrangular prism 1000 on layer III. To retouch the occluded partial area with the texture of the triangular prism 2000, the user selects the desired area of the triangular prism 2000 with the mouse and also selects the submenu "retouch source" on the "edit menu". The user then clicks the area enclosed with the point sequence: 16, 3, 15, 13 with the mouse and selects the submenu "retouch destination" on the "edit menu". As a consequence, the texture selected by the "retouch source" menu is repeatedly pasted on the above occluded partial area.

In this manner, to prepare for morphing, the occluded partial area is "retouched" with the texture determined as optimal texture by the user. This prevents an image having undergone morphing from producing an unnatural area.

When the processing in steps S618 to S622 is performed for layer III, a picture like the one shown in FIG. 41 is obtained.

In this manner, the original image is segmented in units of layers by the control procedure (FIG. 38) based on the application program for "hierarchical processing" in the second embodiment. Each layer is segmented in units of objects, and new hierarchical image data are formed in a table form like the one shown in FIG. 42. As a result, in hierarchical morphing processing (control procedure in FIG. 43), preparations for the execution of morphing in units of layers are complete.

In hierarchical processing according to the present invention, a photographed image of a three-dimensional object that continuously changes is segmented in units of layers (hierarchically) to allow the user to see an image portion that is occluded with the movement of the viewpoint position. When this hierarchical processing (procedure in FIG. 38) is applied to the object in FIG. 36, a stepwise object image like the one shown in FIG. 37 can be obtained.

Figure 43:
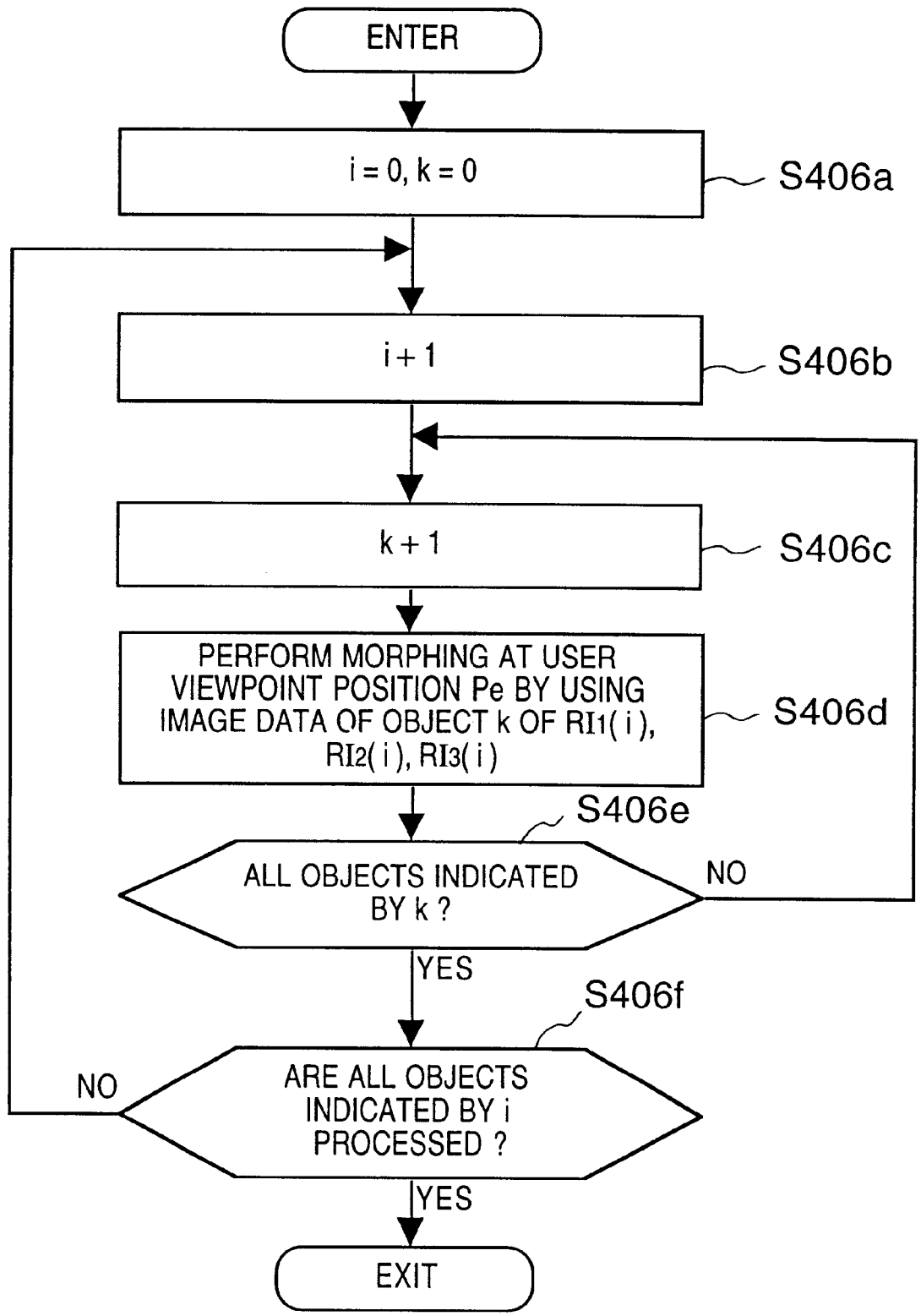
FIG. 43 is a flow chart for explaining a detailed procedure for step S406 in FIG. 32.

The processing based on the walkthrough application program in FIG. 31 will be described again. The image data to be extracted from the hard disk 500 in step S310 change depending on whether hierarchical processing or general morphing is to be performed, which is determined, for example, in step S402 in FIG. 32. If it is determined in step S402 or S404 that the viewpoint position of the user has reached an area where hierarchical morphing processing should be performed as a result of walkthrough, the image data to be extracted will be hierarchically arranged image data like those shown in FIG. 42. In step S406 in FIG. 32, hierarchical morphing processing is performed. FIG. 43 shows the details of step S406.

In step S406a in FIG. 43, the counters i and k are initialized. In step S406b, the counter i is incremented by one to select the next layer. In step S406c, an object k+1 is selected. In step S406d, morphing processing in the first embodiment is performed for the image data of an object (i, k) designated by the counters i and k, of the three images ($RI_1$, $RI_2$, and $RI_3$ in the case shown in FIG. 34). The processing in steps S406c to S406e is performed for all the objects, and the processing in steps S406b to S406f is performed for all the objects on all the layers. In this manner, the hierarchical morphing processing is complete.

When the interpolation morphing processing (see FIG. 32 for the details) is complete in step S400 in FIG. 31, rendering (drawing) is performed in step S500. When rendering (drawing) is to be performed for hierarchical image data having undergone hierarchical morphing, the hierarchical image data obtained by performing morphing for all the objects belonging to a given layer i are synthesized, and hierarchical image data on all the layers are also synthesized. The image obtained by this synthesis is displayed on the screen 100 in steps S504 and S506.

The second embodiments can be variously modified.

More specifically, in the second embodiment, both general morphing processing and hierarchical morphing processing are performed on the basis of three images. However, the present invention can be applied to a modification based on two images as in the technique of the mode of the present invention.

In addition, as general morphing processing, known simple switching processing for panoramic images may be used.

Although the image processing of the present invention is applied to a walkthrough application program, the application range of the present invention is not limited to walkthrough operation. The present invention can be applied to any field in which interpolation morphing is performed on the basis of the images sensed from a plurality of (two or more) viewpoints.

As has been described above, according to the present invention, the constraint imposed on the generation of interpolated images can be eliminated, and virtual images can be generated even at arbitrary viewpoint positions by interpolation.

As many apparently widely different embodiments of the present invention can be made without departing from the spirit and scope thereof, it is to be understood that the invention is not limited to the specific embodiments thereof except as defined in the appended claims.

What is claimed is:

1. A method of generating an interpolated image at a predetermined viewpoint position on the basis of first and second images obtained at first and second viewpoint positions different from the predetermined viewpoint position, comprising:

an inputting step of inputting the first and second images;

a determination step of determining whether a field of view of the first image includes a lens center of the second image; and an image generation step of generating an interpolated image by performing steps (A) to (C) when the field of view of the first image includes the lens center of the second image in said determination step and performing steps (D) to (F) when the field of view of the first image does not include the lens center of the second image in said determination step;

(A) a first correcting step of correcting the first and second images, respectively, such that optical axes of cameras which respectively sensed the first and second images coincide with a first direction substantially coinciding with a direction of a base line connecting the first and second viewpoint positions;

(B) a first interpolation step of calculating coordinates of a corresponding point of an interpolated image having the first direction as a line of sight direction at the predetermined viewpoint position by performing nonlinear proportional distribution for coordinates of a first corresponding point in the first image with respect to a predetermined feature point and coordinates of a second corresponding point in the second image with respect to the feature point;

(C) a second correcting step of correcting the interpolated image from the first direction to the line of sight direction at the predetermined viewpoint position;

(D) a third correcting step of correcting the first and second images, respectively, such that optical axes of the image become substantially perpendicular to the direction of the base line;

(E) a second interpolation step of calculating coordinates of a corresponding point of an interpolated image having the second direction perpendicular to the direction of the base line at the predetermined viewpoint position as a line of sight direction by performing linear proportional distribution for coordinates of a first corresponding point of the first image and coordinates of a second corresponding point of the second image;

(F) a fourth correcting step of correcting the interpolated image from the second direction to the line of sight direction at the predetermined viewpoint position, and outputting the image after the fourth correction as an interpolated image.

2. The method according to claim 1, wherein when the predetermined viewpoint position internally divides an interval between the first and second viewpoint positions at t:1−t, the nonlinear proportional distribution processing in the first interpolation step is executed by making a reciprocal value $1/x_e$ of a coordinate of the interpolated image divide an interval between a reciprocal value $1/x_A$ of the coordinate of the first corresponding point and a reciprocal value $1/x_B$ of the coordinate of the second corresponding point at t:1−t.

3. The method according to claim 1, wherein when the predetermined viewpoint position internally divides an interval between the first and second viewpoint positions at t:1−t, the linear proportional distribution processing in the second interpolation processing is executed by making a coordinate value $x_e$ of the interpolated image divide an interval between a coordinate value $x_A$ of the first corresponding point and a coordinate value $x_B$ of the second corresponding point at t:1−t.

4. The method according to claim 1, further comprising a step of determining whether the first and second images have at least corresponding points derived from the same object.

5. The method according to claim 4, further comprising a step of searching an image database for another image having at least a corresponding point when the first and second images do not have at least corresponding points derived from the same object.

6. The method according to claim 1, wherein the first and second viewpoint positions are defined by viewpoint positions and optical axis directions of the cameras in image sensing operation, and the predetermined viewpoint position is defined by a viewpoint position and line of sight direction of a user.

7. The method according to claim 1, wherein the interpolated image output in said outputting step is presented as a panoramic image to a user.

8. A computer program storage medium that stores a program executed by a computer, storing a program code that implements the interpolation method defined in claim 1.

9. A method of generating an interpolated image at a predetermined viewpoint position on the basis of first, second, and third images respectively obtained at first, second, and third viewpoint positions different from the predetermined viewpoint position, comprising:

an inputting step of inputting the first, second and third images;

an internal ratio calculation step of obtaining first and second internal ratios on the basis of a relationship between the predetermined viewpoint position and the first to third viewpoint positions;

a first interpolation step of performing nonlinear proportional distribution processing for two arbitrary images having viewpoint positions having an inclusive relationship to interpolate/generate a temporary virtual image having a base line direction as a line of sight direction at an internal dividing point position between the two viewpoint positions;

a second interpolation step of performing linear proportional distribution processing for two arbitrary images having viewpoint positions having no inclusive relationship to interpolate/generate a temporary virtual image having a line of sight direction perpendicular to the base line direction at an internal dividing point position between the two viewpoint positions;

a first image interpolation step of generating a temporary virtual image at an internal dividing point position corresponding to the first internal ratio by performing one of the first interpolation step and the second interpolation step for the first and second images by using the first internal ratio depending on whether the first and second images have an inclusive relationship determined by determining if a field of view of one of the first image and the second image includes a lens center of the other;

a second image interpolation step of generating an interpolated image at the user viewpoint position corresponding to the second internal ratio by performing one of the first interpolation step and the second interpolation step for the temporary virtual image and third image by using the second internal ratio depending on whether the temporary virtual image and third image have an inclusive relationship determined by determining if a field of view of one of the temporary virtual image and the third image includes a lens center of the other;

a rotation step of rotating the interpolated image, obtained in said second image interpolation step, in a line of sight direction at the predetermined viewpoint position; and an outputting step of outputting the image after the rotation as an interpolated image.

10. The method according to claim 9, wherein said first interpolation step comprises a step of rotating the two arbitrary images at viewpoint positions in the base line direction to make optical axes of the images coincide with each other, and the interpolation processing is performed for the two rotated images.

11. The method according to claim 9, wherein said second interpolation step comprises a step of rotating the two arbitrary images at viewpoint positions in a direction perpendicular to the base line direction to make the two arbitrary images become parallel to each other, and the interpolation processing is performed for the two rotated images.

12. The method according to claim 9, wherein a viewpoint position which divides, at a second internal ratio, an interval between the third viewpoint position and a temporary virtual position $P_T$ which divides an interval between the first and second viewpoint positions at a first internal ratio coincides with the predetermined viewpoint position.

13. The method according to claim 9, wherein said first interpolation step comprises obtaining a reciprocal value $1/x_e$ of a coordinate of the temporary virtual image by internally dividing an interval between a reciprocal value $1/x_A$ of a coordinate of a first corresponding point of one of the two images and a reciprocal value $1/x_B$ of a coordinate of a second corresponding point of the other image at the first internal ratio.

14. The method according to claim 9, wherein said second interpolation step comprises obtaining a coordinate value $x_e$ of the temporary virtual image by internally dividing an interval between a coordinate value $x_A$ of a first corresponding point of one of the two images and a coordinate value $x_B$ of a second corresponding point of the other image at the second internal ratio.

15. The method according to claim 9, further comprising a step of determining whether the first to third images have at least corresponding points derived from the same object.

16. The method according to claim 15, further comprising a step of searching an image database for another image having at least a corresponding point when the first to third images do not have at least corresponding points derived from the same object.

17. The method according to claim 9, wherein the first to third viewpoint positions are defined by viewpoint positions and optical axis directions of the cameras in image sensing operation, and the predetermined viewpoint position is defined by a viewpoint position and line of sight direction of a user.

18. The method according to claim 9, wherein the interpolated image output in said outputting step is presented as a panoramic image to the user.

19. An image processing apparatus comprising:

image storing means for storing a plurality of images together with viewpoint position information corresponding thereto;

detecting means for detecting both a line of sight direction and viewpoint position of a user;

searching means for searching, in said image storing means for the first to third images including corresponding points in the line of sight direction of the user;

calculation means for obtaining first and second internal ratios on the basis of a relationship between the user viewpoint position and the first to third viewpoint positions;

first interpolation means for performing nonlinear proportional distribution processing for two arbitrary images having viewpoint positions having an inclusive relationship to interpolate/generate a temporary virtual image having a base line direction as a line of sight direction at an internal dividing point position between the two viewpoint positions;

second interpolation means for performing linear proportional distribution processing for two arbitrary images having viewpoint positions having no inclusive relationship to interpolate/generate a temporary virtual image having a line of sight direction perpendicular to the base line direction at an internal dividing point position between the two viewpoint positions;

first image interpolation means for generating a temporary virtual image at an internal dividing point position corresponding to the first internal ratio by performing one of the nonlinear proportional distribution processing and the linear proportional distribution processing for the first and second images by using the first internal ratio depending on whether the first and second images have an inclusive relationship determined by determining if a field of view of one of the first image and the second image includes a lens center of the other;

second image interpolation means for generating an interpolated image at the user viewpoint position corresponding to the second internal ratio by performing one of the nonlinear proportional distribution processing and the linear proportional distribution processing for the temporary virtual image and third image by using the second internal ratio depending on whether the temporary virtual image and third image have an inclusive relationship determined by determining if a field of view of one of the temporary virtual image and the third image includes a lens center of the other, image rotation means for rotating the interpolated image, obtained in the second image interpolation means, in a line of sight direction at the user viewpoint position; and outputting means for outputting the image after the rotation as an interpolated image.

20. The apparatus according to claim 19, wherein said first interpolation means comprises means for rotating the two arbitrary images at viewpoint positions in the base line direction to make optical axes of the images coincide with each other, and the interpolation processing is performed for the two rotated images.

21. The apparatus according to claim 19, wherein said second interpolation means comprises means for rotating the two arbitrary images at viewpoint positions in a direction perpendicular to the base line direction to make the two arbitrary images become parallel to each other, and the interpolation processing is performed for the two rotated images.

22. The apparatus according to claim 19, wherein a viewpoint position which divides an interval between the third viewpoint position and a temporary virtual position $P_T$ which divides, at a second internal ratio, an interval between the first and second viewpoint positions at a first internal ratio coincides with the user viewpoint position.

23. The apparatus according to claim 19, wherein said first interpolation means obtains a reciprocal value $1/x_e$ of a coordinate of the temporary virtual image by internally dividing an interval between a reciprocal value $1/x_A$ of a coordinate of a first corresponding point of one of the two images and a reciprocal value $1/x_B$ of a coordinate of a second corresponding point of the other image at the first internal ratio.

24. The apparatus according to claim 19, wherein said second interpolation means obtains a coordinate value $x_e$ of the temporary virtual image by internally dividing an interval between a coordinate value $x_A$ of a first corresponding point of one of the two images and a coordinate value $x_B$ of a second corresponding point of the other image at the second internal ratio.

25. The apparatus according to claim 19, further comprising second determination means for determining whether the first to third images have at least corresponding points derived from the same object.

26. The apparatus according to claim 25, further comprising second searching means for searching an image database for another image having at least a corresponding point when the first to third images do not have at least corresponding points derived from the same object.

27. The apparatus according to claim 19, wherein the first to third viewpoint positions are defined by viewpoint positions and optical axis directions of the cameras in image sensing operation, and the user viewpoint position is defined by a viewpoint position and line of sight direction of the user.

28. The apparatus according to claim 19, wherein the interpolated image output in said outputting means is presented as a panoramic image to a user.

29. The apparatus according to claim 19, further comprising second image storing means for storing a temporary virtual image generated by said first image interpolation means in said image storing means, together with corresponding viewpoint position information.

30. The apparatus according to claim 19, further comprising second image storing means for storing a temporary virtual image generated by said second image interpolation means in said image storing means, together with corresponding viewpoint position information.

31. An image processing apparatus for generating a morphed image by processing first and second images respectively obtained by sensing an object at first and second viewpoint positions, comprising:

segmentation means for segmenting the first image into a plurality of first partial images in accordance with a plurality of depths from the first viewpoint position, and also segmenting the second image into a plurality of second partial images in accordance with a plurality of depths from the second viewpoint position; and processing means for performing a morphing process on the first and second images on the basis of the depths and a change of a viewpoint position.

32. The apparatus according to claim 31, wherein said first and second images are two-dimensional images; and said segmentation means further comprises:

display means for displaying the first and second images; and first designation means for designating partial areas in the displayed first and second images as a pair of two-dimensional partial images by adding hierarchical information corresponding to a depth to each of the partial images.

33. The apparatus according to claim 32, wherein said first designation means comprises:

second designation means for designating, on said display means, an occluded partial area in which a two-dimensional partial image belonging to a layer farther from the arbitrary viewpoint position is occluded by a two-dimensional partial image belonging to a layer nearer to the arbitrary viewpoint position; and retouch means for allowing a user to retouch a pixel value of the occluded partial area.

34. The apparatus according to claim 32, wherein said first designation means comprises rewrite means for rewriting pixel values of one or a plurality of pairs of two-dimensional partial images having a second hierarchical information value other than a first hierarchical information value into a predetermined fixed value with respect to one pair of two-dimensional partial images having the first hierarchical information value.

35. The apparatus according to claim 34, wherein the predetermined fixed value is a pixel value representing black.

36. The apparatus according to claim 32, wherein said segmentation means comprises third designation means for designating a plurality of partial areas in one pair of first and second two-dimensional partial images corresponding to a given layer.

37. The apparatus according to claim 32, wherein said segmentation means stores the first and second original two-dimensional images and a plurality of pairs of two-dimensional partial images, together with hierarchical information.

38. An image display apparatus for reading out a plurality of pairs of two-dimensional partial images generated and stored by said image processing apparatus defined in claim 35, and performing morphing processing to generate an image from an arbitrary viewpoint position comprising:

first morphing processing means for generating, for pairs of two-dimensional partial images corresponding to all depths, a partial morphed image from an arbitrary viewpoint position on the basis of one pair of first and second two-dimensional partial images corresponding to each depth; and display means for synthesizing partial morphed images corresponding to the respective depths and generated by said first morphing processing means, and displaying a synthesized image on a predetermined display unit.

39. The apparatus according to claim 38, wherein said apparatus is applied to a walkthrough application.

40. The apparatus according to claim 39, further comprising input means for inputting information about the arbitrary viewpoint position.

41. The apparatus according to claim 40, wherein said input means virtually changes a viewpoint position value.

42. The apparatus according to claim 38, further comprising:
   second morphing processing means for generating a morphed image directly based on the first and second two-dimensional images; and
   switching means for selectively switching said first morphing processing means and said second morphing processing means.

43. The apparatus according to claim 42, wherein said apparatus further comprises:
   input means for inputting information about the arbitrary viewpoint position; and
   a memory for determining that one of the first morphing processing and the second morphing processing is to be applied to an arbitrary walkthrough route in a walkthrough virtual space when a viewpoint position of the user exists in the walkthrough route, and storing information indicating a determination result together with a position of the walkthrough route, and
   said switching means extracts determination result information corresponding to viewpoint position information input by said input means from said memory, and selects and operates one of said first morphing processing means and said second morphing processing means on the basis of the information.

44. The apparatus according to claim 38, wherein said first morphing means comprises:
   an image storing means for storing a plurality of images together with viewpoint position information corresponding thereto;
   detecting means for detecting both a line of sight direction and viewpoint position of a user;
   searching means for searching in said image storing means for the first to third images including corresponding points in the line of sight direction of the user;
   determination means for determining whether any two of the first to third images have an inclusive relationship;
   calculation means for obtaining first and second internal ratios on the basis of a relationship between the user viewpoint position and the first to third viewpoint positions;
   first interpolation means for performing nonlinear proportional distribution processing for two arbitrary images having viewpoint positions having an inclusive relationship to interpolate/generate a temporary virtual image having a base line direction as a line of sight direction at an internal dividing point position between the two viewpoint positions;
   second interpolation means for performing linear proportional distribution processing for two arbitrary images having viewpoint positions having no inclusive relationship to interpolate/generate a temporary virtual image having a line of sight direction perpendicular to the base line direction at an internal dividing point position between the two viewpoint positions;
   first image interpolation means for generating a temporary virtual image at an internal dividing point position corresponding to the first internal ratio by performing one of first morphing processing and second morphing processing for the first and second images by using the first internal ratio depending on whether the first and second images have an inclusive relationship;
   second image interpolation means for generating an interpolated image at the user viewpoint position corresponding to the second internal ratio by performing one of the first morphing processing and second morphing processing for the temporary virtual image and third image by using the second internal ratio depending on whether the temporary virtual image and third image have an inclusive relationship;
   image rotation means for rotating the interpolated image, obtained in the second image interpolation means, in a line of sight direction at the user viewpoint position; and
   outputting means for outputting the image after the rotation as an interpolated image.

45. An image processing method of generating a morphed image by processing first and second images respectively obtained by sensing an object at first and second viewpoint positions to obtain a morphed image comprising:
   a segmentation step of segmenting the first image into a plurality of first partial images in accordance with a plurality of depths from the first viewpoint position, and also segmenting the second image into a plurality of second partial images in accordance with a plurality of depths from the second viewpoint position; and
   a processing step of performing a morphing process on the first and second images on the basis of the depths and a change of a viewpoint position.

46. The method according to claim 45, wherein said first and second images are two-dimensional images; and said segmentation step further comprises:
   a display step of displaying the first and second images; and
   a first designation step of designating partial areas in the displayed first and second images as a pair of two-dimensional partial images by adding hierarchical information corresponding to a depth to each of the partial images.

47. The method according to claim 46, wherein the first designation step comprises:
   a second designation step of designating, in the display step, an occluded partial area in which a two-dimensional partial image belonging to a layer farther from the arbitrary viewpoint position is occluded by a two-dimensional partial image belonging to a layer nearer to the arbitrary viewpoint position; and
   a retouch step of allowing a user to retouch a pixel value of the occluded partial area.

48. The method according to claim 46, wherein said first designation step comprises a rewrite step of rewriting pixel values of one or a plurality of pairs of two-dimensional partial images having a second hierarchical information value other than a first hierarchical information value into a predetermined fixed value with respect to one pair of two-dimensional partial images having the first hierarchical information value.

49. The method according to claim 48, wherein the predetermined fixed value is a pixel value representing black.

50. The method according to claim 46, wherein said segmentation step comprises a third designation step of designating a plurality of partial areas in one pair of first and second two-dimensional partial images corresponding to a given layer.

51. The method according to claim 46, wherein said segmentation step comprises storing the first and second original images and a plurality of pairs of two-dimensional partial images, together with hierarchical information.

52. An image display method of reading out a plurality of pairs of two-dimensional partial images generated and stored by the image processing method defined in claim 49, and performing morphing processing to generate an image from an arbitrary viewpoint position comprising:

a first morphing processing step of performing, for pairs of two-dimensional partial images corresponding to all depths, processing of generating a partial morphed image from an arbitrary viewpoint position on the basis of one pair of first and second two-dimensional partial images corresponding to each depth; and a display step of synthesizing partial morphed images corresponding to the respective depths and generated in the first morphing processing step, and displaying a synthesized image on a predetermined display unit.

53. The method according to claim 52, wherein the method is applied to a walkthrough application.

54. The method according to claim 53, further comprising an input step of inputting information about the arbitrary viewpoint position.

55. The method according to claim 54, wherein said input step comprises virtually changing a viewpoint position value.

56. The method according to claim 52, further comprising:

a second morphing processing step of generating a morphed image directly based on the first and second two-dimensional images; and a switching step of selectively switching the first morphing processing step and the second morphing processing step.

57. The method according to claim 56, wherein the method further comprises:

an input step of inputting information about the arbitrary viewpoint position; and a step of preparing a memory for determining that one of the first morphing processing and the second morphing processing is to be applied to an arbitrary walkthrough route in a walkthrough virtual space when a viewpoint position of the user exists in the walkthrough route, and storing information indicating a determination result together with a position of the walkthrough route; and said switching step comprises extracting determination result information corresponding to viewpoint position information input in the input step from the memory, and selecting and operating one of the first morphing processing step and the second morphing processing step on the basis of the information.

58. The method according to claim 52, wherein the first morphing step comprises:

a step of preparing an image storing means storing a plurality of images together with viewpoint position information corresponding thereto;

a step of detecting both a line of sight direction and viewpoint position of a user;

a step of searching in the image storing means for the first to third images including corresponding points in the line of sight direction of the user;

a determination step of determining whether any two of the first to third images have an inclusive relationship;

a calculation step of obtaining first and second internal ratios on the basis of a relationship between the user viewpoint position and the first to third viewpoint positions;

a first interpolation step of performing nonlinear proportional distribution processing for two arbitrary images having viewpoint positions having an inclusive relationship to interpolate/generate a temporary virtual image having a base line direction as a line of sight direction at an internal dividing point position between the two viewpoint positions;

a second interpolation step of performing linear proportional distribution processing for two arbitrary images having viewpoint positions having no inclusive relationship to interpolate/generate a temporary virtual image having a line of sight direction perpendicular to the base line direction at an internal dividing point position between the two viewpoint positions;

a first image interpolation step of generating a temporary virtual image at an internal dividing point position corresponding to the first internal ratio by performing one of first morphing processing and second morphing processing for the first and second images by using the first internal ratio depending on whether the first and second images have an inclusive relationship;

a second image interpolation step of generating an interpolated image at the user viewpoint position corresponding to the second internal ratio by performing one of the first morphing processing and second morphing processing for the temporary virtual image and third image by using the second internal ratio depending on whether the temporary virtual image and third image have an inclusive relationship, an image rotation step of rotating the interpolated image, obtained in the second image interpolation step, in a line of sight direction at the user viewpoint position; and an outputting step of outputting the image after the rotation as an interpolated image.

59. A computer program storage medium that stores a program executed by a computer, storing a program code that implements the method defined in claim 45.

60. An image processing apparatus for interpolating a plurality of images sensed at a plurality of different positions to generate an image at a viewpoint position different from the plurality of positions, comprising:

discrimination means for discriminating presence/absence of an inclusive relationship, in which one image is included in the other image, between the plurality of images; and image processing means for interpolating the plurality of images on the basis of a discrimination result obtained by said discrimination means, wherein said image processing means is designed to use different interpolation methods depending on whether said discrimination means discriminates the presence or absence of an inclusive relationship between the plurality of images.

61. The apparatus according to claim 60, wherein said image processing means linearly interpolates coordinates of corresponding points of the plurality of images when said discrimination means discriminates the absence of the inclusive relationship between the images, and nonlinearly interpolates the coordinates of the corresponding points of the plurality of images when said discrimination means discriminate the presence of the inclusive relationship between the images.

62. The apparatus according to claim 61, wherein said discrimination means discriminates whether lens centers of cameras are included in another image when the plurality of images are sensed at the plurality of positions.

63. The apparatus according to claim 60, wherein said image processing means performs morphing processing for the plurality of images.

64. An image processing method of interpolating a plurality of images sensed at a plurality of different positions to generate an image at a viewpoint position different from the plurality of positions, comprising:

a discrimination step of discriminating presence/absence of an inclusive relationship, in which one image is included in the other image, between the plurality of images; and a image processing step of interpolating the plurality of images on the basis of a discrimination result obtained in said discrimination step, wherein said image processing step comprises using different interpolation methods depending on whether the presence or absence of an inclusive relationship between the plurality of images is discriminated in said discrimination step.

65. The method according to claim 64, wherein said image processing step comprises linearly interpolating coordinates of corresponding points of the plurality of images when the absence of the inclusive relationship between the images is discriminated in said discrimination step, and nonlinearly interpolating the coordinates of the corresponding points of the plurality of images when the presence of the inclusive relationship between the images is discriminated in said discrimination step.

66. The method according to claim 65, wherein said discrimination step comprises discriminating whether lens centers of cameras are included in another image when the plurality of images are sensed at the plurality of positions.

67. The method according to claim 64, wherein said image processing step comprises performing morphing processing for the plurality of images.

* * * * *

UNITED STATES PATENT AND TRADEMARK OFFICE
CERTIFICATE OF CORRECTION

PATENT NO. : 6,636,234 B2
DATED : October 21, 2003
INVENTOR(S) : Endo et al.

It is certified that error appears in the above-identified patent and that said Letters Patent is hereby corrected as shown below:

<u>Title page, Item [54] and Column 1, lines 3-4,</u>
Title, "VIEW POINT" should read -- VIEWPOINT --;

<u>Title page,</u>
Item [*] Notice, please insert -- This patent issued on a continued prosecution application filed under 37 CFR 1.53(d), and is subject to the twenty year patent term provisions of 35 U.S.C. 154(a)(2). --.

<u>Column 10,</u>
Line 24, "of" should read -- of the --; and
Line 26, "image" should read -- images --.

<u>Column 14,</u>
Line 30, "$x_e = f\tan(\phi'-\alpha_e)$" should read -- $x_e = f \cdot \tan(\phi'-\alpha_e)$ --.

<u>Column 16,</u>
Line 28, "to" should read -- to as --; and
Line 48, "a an" should read -- an --.

<u>Column 17,</u>
Line 49, "$x_e = f\tan(\phi'-\alpha_e)$" should read -- $x_e = f \cdot \tan(\phi'-\alpha_e)$ --.

<u>Column 19,</u>
Line 38, "case" should read -- cases --.

<u>Column 25,</u>
Line 9, "objet" should read -- object --.

<u>Column 32,</u>
Line 8, "images;" should read -- images --.

<u>Column 33,</u>
Line 24, "route, and" should read -- route, --; and
Line 25, "said" should read -- wherein said --.

UNITED STATES PATENT AND TRADEMARK OFFICE
CERTIFICATE OF CORRECTION

PATENT NO. : 6,636,234 B2
DATED : October 21, 2003
INVENTOR(S) : Endo et al.

It is certified that error appears in the above-identified patent and that said Letters Patent is hereby corrected as shown below:

Column 34,
Line 30, "images;" should read -- images --.

Column 36,
Line 28, "relationship," should read -- relationship; --; and
Line 62, "criminate" should read -- criminates --.

Signed and Sealed this

Sixth Day of July, 2004

JON W. DUDAS
*Acting Director of the United States Patent and Trademark Office*